(12) United States Patent
Moussavi et al.

(10) Patent No.: US 9,542,591 B2
(45) Date of Patent: Jan. 10, 2017

(54) APPARATUS, METHOD, AND SYSTEM FOR AUTOMATED, NON-INVASIVE CELL ACTIVITY TRACKING

(71) Applicant: Auxogyn, Inc., Menlo Park, CA (US)

(72) Inventors: Farshid Moussavi, Menlo Park, CA (US); Yu Wang, Menlo Park, CA (US); Peter Lorenzen, Menlo Park, CA (US); Stephen Gould, Menlo Park, CA (US)

(73) Assignee: PROGYNY, INC., Menlo Park, CA (US)

( * ) Notice: Subject to any disclaimer, the term of this patent is extended or adjusted under 35 U.S.C. 154(b) by 50 days.

(21) Appl. No.: 14/194,391

(22) Filed: Feb. 28, 2014

(65) Prior Publication Data

US 2014/0247973 A1    Sep. 4, 2014

Related U.S. Application Data

(60) Provisional application No. 61/785,179, filed on Mar. 14, 2013, provisional application No. 61/785,199, filed on Mar. 14, 2013, provisional application No. 61/770,998, filed on Feb. 28, 2013, provisional application No. 61/785,170, filed on Mar. 14, 2013, provisional application No. 61/785,216, filed on Mar. 14, 2013, provisional application No. 61/771,000, filed on Feb. 28, 2013.

(51) Int. Cl.
*G06K 9/00* (2006.01)
*G06K 9/62* (2006.01)

(52) U.S. Cl.
CPC ......... *G06K 9/00147* (2013.01); *G06K 9/6227* (2013.01); *G06K 9/6256* (2013.01); *G06K 9/6277* (2013.01)

(58) Field of Classification Search
None
See application file for complete search history.

(56) References Cited

U.S. PATENT DOCUMENTS 6,757,423 B1   6/2004 Amini
8,265,357 B2   9/2012 Ramsing et al.
(Continued)

FOREIGN PATENT DOCUMENTS

WO   2007/144001 A2   12/2007
WO   2009/137866 A1   11/2009
(Continued)

OTHER PUBLICATIONS

Alfarawati et al., "Session 30: The Blastocyst," Human Reprod., (Jun. 2010), 25(S1):i41-i44. DOI:10.1093/humrepjde.25.s1.300-111.
(Continued)

*Primary Examiner* — Siamak Harandi
(74) *Attorney, Agent, or Firm* — Kilpatrick Townsend & Stockton LLP

(57) ABSTRACT

Apparatuses, methods, and systems for automated, non-invasive evaluation of cell activity are provided. In one embodiment, an apparatus includes a hypothesis selection module configured to select a hypothesis from a plurality of hypotheses characterizing one or more cells shown in an image. Each of the plurality of hypotheses includes an inferred characteristic of the one or more cells based on geometric features of the one or more cells shown in the image. The hypothesis selection module is implemented in at least one of a memory or a processing device.

19 Claims, 31 Drawing Sheets

(56) References Cited

U.S. PATENT DOCUMENTS

| | | |
|---|---|---|
| 2010/0002929 A1 | 1/2010 | Sammak |
| 2010/0055039 A1 | 3/2010 | Doyonnas et al. |
| 2011/0092762 A1 | 4/2011 | Wong |
| 2011/0105834 A1 | 5/2011 | Wong et al. |
| 2011/0125719 A1 | 5/2011 | Jayaraman |
| 2011/0207112 A1 | 8/2011 | Burbank et al. |
| 2012/0244567 A1 | 9/2012 | Zeng |
| 2014/0107991 A1 | 4/2014 | Elashoff |

FOREIGN PATENT DOCUMENTS

| | | |
|---|---|---|
| WO | 2012/047678 A2 | 4/2012 |
| WO | 2012/116185 A1 | 8/2012 |
| WO | 2012/163363 A1 | 12/2012 |
| WO | 2013/178785 A1 | 12/2013 |
| WO | 2014/121200 | 8/2014 |
| WO | 2014/121205 | 8/2014 |
| WO | 2014/134527 A1 | 9/2014 |
| WO | 2014/134550 A1 | 9/2014 |

OTHER PUBLICATIONS

Alikani, M., et al., "Noviable human pre-implantation embryos as a source of stem cells for research and potential therapy", Mol. Hum. Reprod., (2005): 11:335-344.

Campbell et al., "Modelling a risk classification of aneuploidy in human embryos using non-invasive morphokinetics," Reproductive Biomedicine Online, (Feb. 2013), 26(5):477-485.

Capalbo et al., "Correlation between standard blastocyst morphology. euploidy and implantation: an observational study in two centers involving 956 screened blastocysts,". Human Reprod., (Feb. 2014) 29(6):1173-1181.

De Kock et al, "0-121", Fertil. Steril., (2006), 86(3):S51-S52.

Dobson, T. et al., "The unique transcriptome through day 3 of human preimplantation development", Human Molecular Genetics, (2004): 13(14):1461-1470.

El-Toukhy et al., (2009) "A multi-centre randomised controlled study of pre-IVF outpatient hysteroscopy in women with recurrent IVF implantation failure: Trial of Outpatient Hysteroscopy—[TROPHY] in IVF," Reprod. Health, 6:20 (7 pages). doi: 10.1186/1742-4755-6-20. Epub Dec. 3, 2009.

Fenwick, et al., (2002) "Time from insemination to first cleavage predicts developmental competence of human preimplantation embryos in vitro," Human Reproduction, 17(2):407-412.

Filho et al, "A method for semi-automatic grading of human blastocyst microscope images," Human Reprod., (2012) 27(9):2641-2648.

Filho et al, "A review on automatic analysis of human embryo microscope images," The Open Biomedical Engineering Journal, (Jan. 2010), pp. 170-177, XP055192640, Netherlands, OOI: 10.2174/1874120701004010170, Retrieved from the Internet: www.ncbi.nlm.nih.govjpubmed/21379391.

Fragouli, E. et al., "Comprehensive chromosome screening of polar bodies and blastocysts from couples experiencing repeated implantation failure," Fertil. Steril., 94(3):875-887 (2010) Epub Jun. 21, 2009.

Keltz MD, et al., (2006) "Predictors of embryo fragmentation and outcome after fragment removal in in vitro fertilization." Fertil Steril, 86:321-324.

Lundin, et al., (2001) "Early embryo cleavage is a strong indicator of embryo quality in human IVF," Human Reproduction, 16(12):2652-2657.

Magnusson et al. A batch algorithm using iterative application of the Viterbi algorithm to track 17, 18 cells and construct cell lineages. 2012 9th IEEE International Symposium on Biomedical Imaging (ISBI) May 5, 2012 pp. 382-385. [retrieved from http://ieeexplore.ieee.org/xpl/articleDetails.jsp?reload=true&arnumber=6235564 on May 2, 2014] Abstract.

Manipalviratn et al., "Imprinting disorders and assisted reproductive technology," Fertil Steril., Feb. 2009, 91(2):305-315.

Mastenbroek, S. et al., "In Vitro Fertilization with Preimplantation Genetic Screening," N. Engl. J. Med., 357(1):9-17 (2007).

Meng et al. Histology Image Classification Using Supervised Classification and 23 Multimodal Fusion. ISM '1 0 Proceedings of the 2010 IEEE International Symposium on Multimedia. 2010 pp. 145-152.

Milki, A. A. et al., "Accuracy of day 3 criteria for selecting the best embryos," Fertility and Sterility, 77(6):1191-1195 (2002).

Milki, A. A. et al., "Comparison of blastocyst transfer with day 3 embryo transfer in similar patient populations," Fertility and Sterility, 73(1):126-129 (2000).

Mtango, N. R., et al., "Oocyte quality and maternal control of development.", Int. Rev. Cell. Mol. Biol. 2008;268:223-290.

Nagy, Z. P. et al., "Time-course of oocyte activation, pronucleus formation and cleavage in human oocytes fertilized by intracytoplasmic sperm injection," Human Reproduction, 9(9):1743-1748 (1994).

Paternot et al., "Semi-automated morphometric analysis of human embryos can reveal correlations between total embryo volume and clinical pregnancy", Human Reprod., (2013), 28(3):627-633.

Payne, D. et al., "Preliminary observations on polar body extrusion and pronuclear formation in human oocytes using time-lapse video cinematography," Human Reproduction, 12(3):532-541 (1997).

Rienzi, L. et al., "Significance of morphological attributes of the early embryo.", Reprod. Biomed. Online May 2005; 10(5):669-681.

Rijinders, P. M. et al., "The predictive value of day 3 embryo morphology regarding blastocyst formation, pregnancy, and implantation rate after day 5 transfer following in vitro fertilization or intracytoplasmic sperm injection," Human Reproduction, 13(10):2869-2873 (1998).

Scotti. Automatic Morphological Analysis for Acute Leukemia Identification in Peripheral Blood Microscope Images. CIMSA 2005? IEEE International Conference on Computational Intelligence for Measurement Systems and Applications Jul. 2005 p. 96-101.

Sepúlveda, S. et al., "In vitro development and pregnancy outcomes for human embryos cultured in either a single medium or in a sequential media system", Fertil Steril. May 2009; 91(5):1765-70.

Swain, "Could time-lapse embryo imaging reduce the need for biopsy and PGS?" J. Assisted Reprod. Genet., (Jul. 2013), 30(8):1081-1090.

Taft, R. E., "Virtues and limitations of the preimplantation mouse embryo as a model system," Theriogenology, 69:10-16 (2008) Epub Nov. 19, 2007.

Vanneste, E. et al., "Chromosome instability is common in human cleavage-stage embryos," Nature Medicine, 15(5):577-583 (2009).

Wells D., et al.,"Comprehensive chromosomal analysis of human preimplantation embryos using whole genome amplification and single cell comparative genomic hydridization." Mol Hum Reprod, Nov. 2000;6(11):1055-62.

Yee et al., "An Automatic Model-Based Approach for Measuring the Zona Pellucida Thickness in Day Five Human Blastocysts," Proceedings of The International Conference on Image Processing, Computer Vision, and Pattern Recognition (Ipcv), Jan. 1, 2013 (Jan. 1, 2013). p. 1. Xp055192636, Athens.

Zernicka-Goetz, M. "Patterning of the embryo: The first spatial decisions in the life of a mouse." Development Feb. 2002;129(4):815-829.

Zernicka-Goetz, M., "The first cell-fate decisions in the mouse embryo: destiny is a matter of both change and choice.", Curr. Opin. Genet. Dev., Aug. 2006;16(4):406-412.

| Image Identifier 910a | Regionprops 910b | GLCM 910c | LBP 910d | Hessian Features 910e | Gabor Features 910f | Boundary Features 910g | Bag of Features 910h |
|---|---|---|---|---|---|---|---|
| 11865 | 165 | 0.9897 | 0.4669 | 410.3300 | 10.3423 | 0.2399 | 0.1 |
| 11880 | 161 | 0.9905 | 0.4641 | 409.5046 | 10.2414 | 0.2331 | 0.2 |

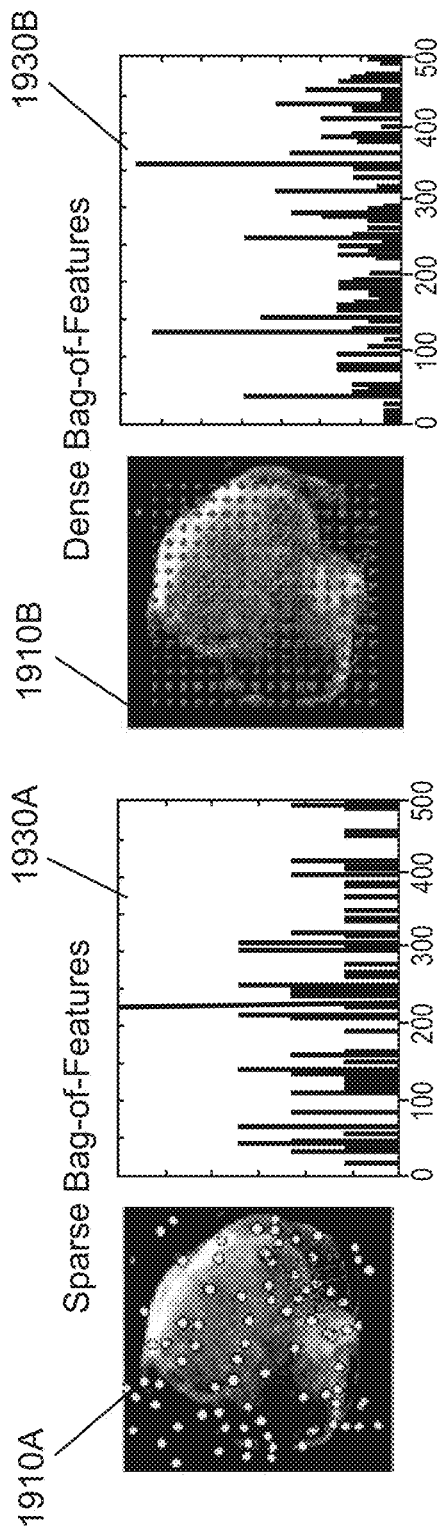
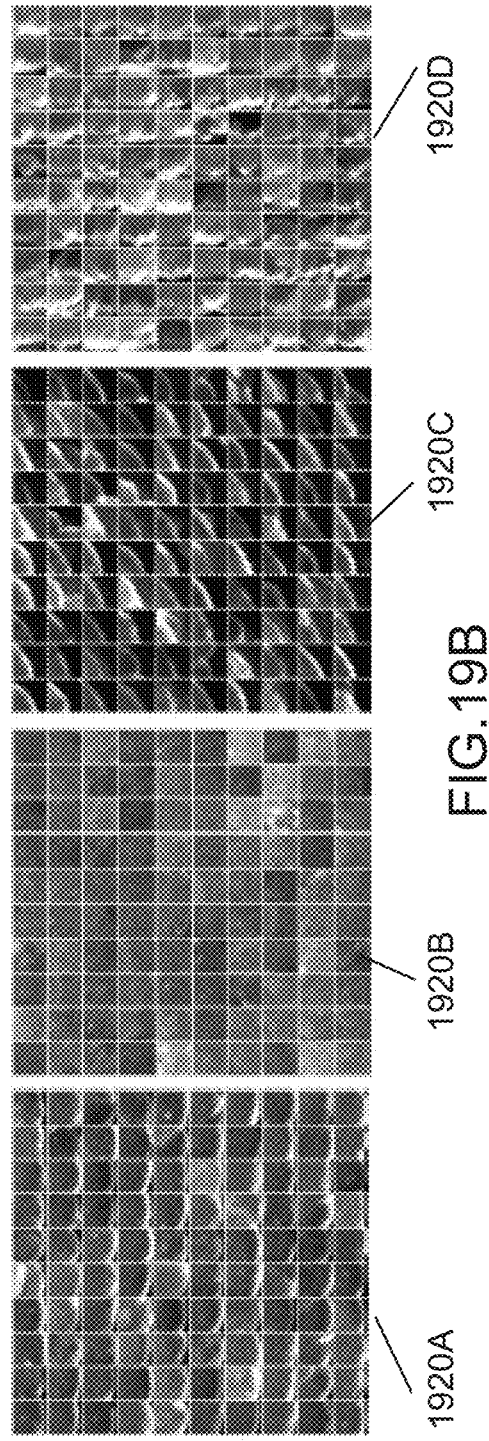
FIG. 19A
FIG. 19B

APPARATUS, METHOD, AND SYSTEM FOR AUTOMATED, NON-INVASIVE CELL ACTIVITY TRACKING

CROSS-REFERENCE TO RELATED APPLICATIONS

This application claims priority to: U.S. Provisional Application No. 61/785,179, "APPARATUS, METHOD, AND SYSTEM FOR AUTOMATED, NON-INVASIVE CELL ACTIVITY TRACKING", filed on Mar. 14, 2013; U.S. Provisional Application No. 61/785,199, "APPARATUS, METHOD, AND SYSTEM FOR HUMAN EMBRYO VIABILITY SCREENING BASED ON AUTOMATED CONFIDENCE ESTIMATION OF ASSESSMENT OF CELL ACTIVITY, filed on Mar. 14, 2013; U.S. Provisional Application No. 61/770,998, "UNIFIED FRAMEWORK FOR AUTOMATED HUMAN EMBRYO TRACKING", filed on Feb. 28, 2013; U.S. Provisional Application No. 61/785,170, "APPARATUS, METHOD, AND SYSTEM FOR IMAGE-BASED HUMAN EMBRYO CELL CLASSIFICATION", filed on Mar. 14, 2013; U.S. Provisional Application No. 61/785,216, "APPARATUS, METHOD, AND SYSTEM FOR IMAGE-BASED HUMAN EMBRYO OUTCOME DETERMINATION", filed on Mar. 14, 2013; and U.S. Provisional Application No. 61/771,000, "AUTOMATED EMBRYO STAGE CLASSIFICATION IN TIME-LAPSE MICROSCOPY VIDEO OF EARLY HUMAN EMBRYO DEVELOPMENT", filed on Feb. 28, 2013. The contents of each of the above applications are incorporated by reference in their entirety.

This application is related to copending U.S. patent application Ser. No. 14/194,386, "APPARATUS, METHOD, AND SYSTEM FOR IMAGE-BASED HUMAN EMBRYO CELL CLASSIFICATION", filed on Feb. 28, 2014, the content of which is incorporated by reference in its entirety.

FIELD OF THE INVENTION

The present invention relates generally to image-based cell activity evaluation and/or human embryo viability screening. More particularly, this invention relates to cell activity tracking to determine characteristics associated with pluripotent cells such as, but not limited to, embryos, oocytes, and/or the like. Additionally or alternatively, this invention relates to confidence estimation of assessment of cell activity, which in turn can be employed for human embryo viability screening.

BACKGROUND OF THE INVENTION

Infertility is a common health problem that affects 10-15% of couples of reproductive-age. In the United States alone in the year 2006, approximately 140,000 cycles of in vitro fertilization (IVF) were performed (cdc.gov/art). This resulted in the culture of more than a million embryos annually with variable, and often ill-defined, potential for implantation and development to term. The live birth rate, per cycle, following IVF was just 29%, while on average 30% of live births resulted in multiple gestations (cdc.gov/art). Multiple gestations have well-documented adverse outcomes for both the mother and fetuses, such as miscarriage, pre-term birth, and low birth rate. Potential causes for failure of IVF are diverse; however, since the introduction of IVF in 1978, one of the major challenges has been to identify the embryos that are most suitable for transfer and most likely to result in term pregnancy. Traditionally in IVF clinics, human embryo viability has been assessed by simple morphologic observations such as the presence of uniformly-sized, mononucleate blastomeres and the degree of cellular fragmentation (Rijinders P M, Jansen C A M. (1998) Hum Reprod 13:2869-73; Milki A A, et al. (2002) Fertil Steril 77:1191-5). More recently, additional methods such as extended culture of embryos (to the blastocyst stage at day 5) and analysis of chromosomal status via preimplantation genetic diagnosis (PGD) have also been used to assess embryo quality (Milki A, et al. (2000) Fertil Steril 73:126-9; Fragouli E, (2009) Fertil Steril June 21 [EPub ahead of print]; El-Toukhy T, et al. (2009) Hum Reprod 6:20; Vanneste E, et al. (2009) Nat Med 15:577-83). However, potential risks of these methods also exist in that they prolong the culture period and disrupt embryo integrity (Manipalviratn S, et al. (2009) Fertil Steril 91:305-15; Mastenbroek S, et al. (2007) N Engl J. Med. 357:9-17).

Recently it has been shown that time-lapse imaging can be a useful tool to observe early embryo development and to correlate early development with potential embryonic viability. Some methods have used time-lapse imaging to monitor human embryo development following intracytoplasmic sperm injection (ICSI) (Nagy et al. (1994) Human Reproduction. 9(9):1743-1748; Payne et al. (1997) Human Reproduction. 12:532-541). Polar body extrusion and pro-nuclear formation were analyzed and correlated with good morphology on day 3. However, no parameters were correlated with blastocyst formation or pregnancy outcomes. Other methods have looked at the onset of first cleavage as an indicator to predict the viability of human embryos (Fenwick, et al. (2002) Human Reproduction, 17:407-412; Lundin, et al. (2001) Human Reproduction 16:2652-2657). However, these methods do not recognize the importance of the duration of cytokinesis or time intervals between early divisions.

Other methods have used time-lapse imaging to measure the timing and extent of cell divisions during early embryo development (WO/2007/144001). However, these methods disclose only a basic and general method for time-lapse imaging of bovine embryos, which are substantially different from human embryos in terms of developmental potential, morphological behavior, molecular and epigenetic programs, and timing and parameters surrounding transfer. For example, bovine embryos take substantially longer to implant compared to human embryos (30 days and 9 days, respectively). (Taft, (2008) Theriogenology 69(1):10-16. Moreover, no specific imaging parameters or time intervals are disclosed that might be predictive of human embryo viability.

While time-lapse imaging has shown promise in the context of automated analysis of early human embryo development, significant development and/or performance hurdles remain unaddressed by these preexisting methods. The nature, timing, and other benchmarks of early human embryo development provide challenges for predicting development behavior. Such challenges can include predicting and/or otherwise determining, via image processing, the number of cell divisions, the timing of cell divisions, and the health of the individual cells and/or zygote at various points during development. Specifically, automated tracking of individual cells, which forms the basis for each of these determinations, can be difficult due to the inherently noisy nature of biological images, as may arise due to lack of distinct visual features, missing and/or false cell boundaries, changing topology of the cell mass due to the cell division/and or cell movement, cell shape deformation, and so on.

Any further inference(s) from such automated tracking then can inherit the tracking error(s).

For example, individual cell tracking errors can be further propagated/magnified when the number of cells in each image obtained via automated tracking is the basis for estimating time(s) of cell division event(s). As another example, when the estimated number of cells and/or division timing information is used to determine likelihood of future embryo viability, this automated determination can also be erroneous, and can lead to erroneous decisions, such as whether to proceed with IVF using particular embryos.

It is against this background that a need arose to develop the apparatuses, methods, and systems for automated, non-invasive cell activity tracking and/or for confidence estimation of assessment of cell activity described herein.

SUMMARY OF THE INVENTION

Apparatuses, methods, and systems for automated, non-invasive evaluation of cell activity and/or confidence estimation of assessment of cell activity are provided.

In one embodiment, an apparatus includes a hypothesis selection module configured to select a hypothesis from a plurality of hypotheses characterizing one or more cells shown in an image. Each of the plurality of hypotheses includes an inferred characteristic of one or more of the cells based on geometric features of the one or more cells shown in the image. The hypothesis selection module is implemented in at least one of a memory or a processing device.

In one embodiment, a method for automated, non-invasive evaluation of cell activity includes generating a plurality of hypotheses characterizing one or more cells shown in an image. The generating the plurality of hypotheses includes determining an inferred characteristic of the one or more cells based on geometric features of the one or more cells shown in the image. The method further includes selecting a hypothesis from the plurality of hypotheses associated with the image.

In one embodiment, a system for automated, non-invasive evaluation of cell activity includes a computing apparatus configured for automated evaluation of cell activity. The computing apparatus is configured to generate a plurality of hypotheses characterizing one or more cells shown in an image, such that the plurality of hypotheses include an inferred characteristic of the one or more of the cells based on geometric features of the one or more cells shown in the image. The computing apparatus is further configured to select a hypothesis from the plurality of hypotheses associated with the image.

In one embodiment, an apparatus for automated confidence estimation includes a confidence module configured to determine a confidence measure associated with a plurality of hypotheses based on an estimate of a likelihood of one or more of the plurality of hypotheses. Each of the plurality of hypotheses characterizes one or more cells shown in an associated one or more of a plurality of images. The apparatus also includes a reliability determination module configured to determine reliability of at least one of the plurality of hypotheses based on the confidence measure. At least one of the confidence module and the reliability determination module is implemented in at least one of a memory or a processing device.

In one embodiment, a method for automated confidence estimation includes determining a confidence measure associated with a plurality of hypotheses based on an estimate of a likelihood of one or more of the plurality of hypotheses. Each of the plurality of hypotheses characterizes one or more cells shown in an associated one or more of a plurality of images. The method also includes determining reliability of at least one of the plurality of hypotheses based on the confidence measure.

In one embodiment, a system for automated evaluation of cell activity includes a computing apparatus configured for automated evaluation of cell activity. The computing apparatus is configured to determine a confidence measure associated with the plurality of hypotheses based on an estimate of a likelihood of the one or more of the plurality of hypotheses. Each of the plurality of hypotheses characterizes one or more cells shown in an associated one or more of a plurality of images. The computing apparatus is further configured to determine reliability of the plurality of hypotheses based on the confidence measure.

Other aspects and embodiments of the invention are also contemplated. The foregoing summary and the following detailed description are not meant to restrict the invention to any particular embodiment but are merely meant to describe some embodiments of the invention.

BRIEF DESCRIPTION OF THE DRAWINGS

For a better understanding of the nature and objects of the invention, reference should be made to the following detailed description taken in conjunction with the accompanying drawings, in which:

FIGS. 19A and 19B illustrate a bag of features in accordance with an example, showing (a) examples of dense and sparse occurrence histograms generated from sparsely detected descriptors and densely sampled descriptors with a learned codebook; and (b) four examples of clusters (appearance codewords) generated by k-means clustering;

DETAILED DESCRIPTION OF THE INVENTION

Figure 1A:
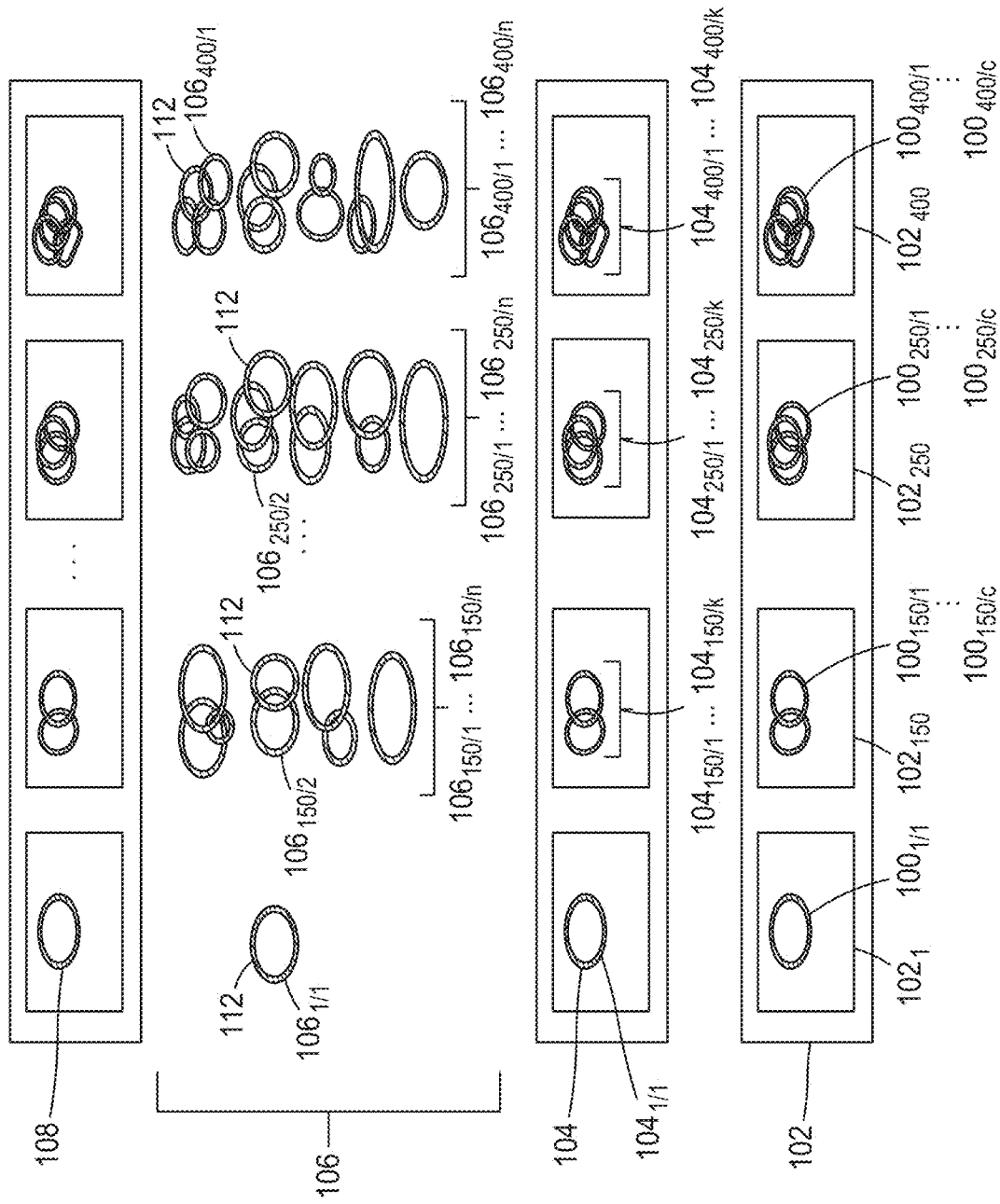
FIG. 1A illustrates a non-limiting example of an automated cell tracking approach applied to images of cell development such as embryo development, in accordance with an embodiment of the invention.

Before the present apparatuses, systems, and methods are described, it is to be understood that this invention is not limited to the particular apparatus, system, or method described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, some potential and preferred methods and materials are now described. All publications mentioned herein are incorporated herein by reference to disclose and describe the methods and/or materials in connection with which the publications are cited. It is understood that the present disclosure supersedes any disclosure of an incorporated publication to the extent there is a contradiction.

It must be noted that as used herein and in the appended claims, the singular forms "a", "an", and "the" include plural referents unless the context clearly dictates otherwise. Thus, for example, reference to "a computer" includes a plurality of such computers known to those skilled in the art, and so forth.

Any publications discussed herein are provided solely for their disclosure prior to the filing date of the present application. Nothing herein is to be construed as an admission that the present invention is not entitled to antedate such publication by virtue of prior invention. Further, the dates of publication provided may be different from the actual publication dates which may need to be independently confirmed.

DEFINITIONS

The terms "developmental potential" and "developmental competence" are used herein to refer to the ability or capacity of a healthy embryo or pluripotent cell to grow or develop.

The term "embryo" is used herein to refer both to the zygote that is formed when two haploid gametic cells, e.g., an unfertilized secondary oocyte and a sperm cell, unite to form a diploid totipotent cell, e.g., a fertilized ovum, and to the embryo that results from the immediately subsequent cell divisions, i.e. embryonic cleavage, up through the morula, i.e. 16-cell stage and the blastocyst stage (with differentiated trophoectoderm and inner cell mass).

The term "pluripotent cell" is used herein to mean any cell that has the ability to differentiate into multiple types of cells in an organism. Examples of pluripotent cells include stem cells oocytes, and 1-cell embryos (i.e. zygotes).

The term "stem cell" is used herein to refer to a cell or a population of cells which: (a) has the ability to self-renew, and (b) has the potential to give rise to diverse differentiated cell types. Frequently, a stem cell has the potential to give rise to multiple lineages of cells. As used herein, a stem cell may be a totipotent stem cell, e.g. a fertilized oocyte, which gives rise to all of the embryonic and extraembryonic tissues of an organism; a pluripotent stem cell, e.g. an embryonic stem (ES) cell, embryonic germ (EG) cell, or an induced pluripotent stem (iPS) cell, which gives rise to all of embryonic tissues of an organism, i.e. endoderm, mesoderm, and ectoderm lineages; a multipotent stem cell, e.g. a mesenchymal stem cell, which gives rise to at least two of the embryonic tissues of an organism, i.e. at least two of endoderm, mesoderm and ectoderm lineages, or it may be a tissue-specific stem cell, which gives rise to multiple types of differentiated cells of a particular tissue. Tissue-specific stem cells include tissue-specific embryonic cells, which give rise to the cells of a particular tissue, and somatic stem cells, which reside in adult tissues and can give rise to the cells of that tissue, e.g. neural stem cells, which give rise to all of the cells of the central nervous system, satellite cells, which give rise to skeletal muscle, and hematopoietic stem cells, which give rise to all of the cells of the hematopoietic system.

The term "oocyte" is used herein to refer to an unfertilized female germ cell, or gamete. Oocytes of the subject application may be primary oocytes, in which case they are positioned to go through or are going through meiosis I, or secondary oocytes, in which case they are positioned to go through or are going through meiosis II.

By "meiosis" it is meant the cell cycle events that result in the production of gametes. In the first meiotic cell cycle, or meiosis I, a cell's chromosomes are duplicated and partitioned into two daughter cells. These daughter cells then divide in a second meiotic cell cycle, or meiosis II, that is not accompanied by DNA synthesis, resulting in gametes with a haploid number of chromosomes.

By a "mitotic cell cycle", it is meant the events in a cell that result in the duplication of a cell's chromosomes and the division of those chromosomes and a cell's cytoplasmic matter into two daughter cells. The mitotic cell cycle is divided into two phases: interphase and mitosis. In interphase, the cell grows and replicates its DNA. In mitosis, the cell initiates and completes cell division, first partitioning its nuclear material, and then dividing its cytoplasmic material and its partitioned nuclear material (cytokinesis) into two separate cells.

By a "first mitotic cell cycle" or "cell cycle 1" it is meant the time interval from fertilization to the completion of the first cytokinesis event, i.e. the division of the fertilized oocyte into two daughter cells. In instances in which oocytes are fertilized in vitro, the time interval between the injection of human chorionic gonadotropin (HCG) (usually administered prior to oocyte retrieval) to the completion of the first cytokinesis event may be used as a surrogate time interval.

By a "second mitotic cell cycle" or "cell cycle 2" it is meant the second cell cycle event observed in an embryo, the time interval between the production of daughter cells from a fertilized oocyte by mitosis and the production of a first set of granddaughter cells from one of those daughter cells (the "leading daughter cell", or daughter cell A) by mitosis. Upon completion of cell cycle 2, the embryo consists of 3 cells. In other words, cell cycle 2 can be visually identified as the time between the embryo containing 2-cells and the embryo containing 3-cells.

By a "third mitotic cell cycle" or "cell cycle 3" it is meant the third cell cycle event observed in an embryo, typically the time interval from the production of daughter cells from a fertilized oocyte by mitosis and the production of a second set of granddaughter cells from the second daughter cell (the "lagging daughter cell" or daughter cell B) by mitosis. Upon completion of cell cycle 3, the embryo consists of 4 cells. In other words, cell cycle 3 can be visually identified as the time between the embryo containing 3-cells and the embryo containing 4-cells.

By "first cleavage event", it is meant the first division, i.e. the division of the oocyte into two daughter cells, i.e. cell cycle 1. Upon completion of the first cleavage event, the embryo consists of 2 cells.

By "second cleavage event", it is meant the second set of divisions, i.e. the division of leading daughter cell into two granddaughter cells and the division of the lagging daughter cell into two granddaughter cells. In other words, the second cleavage event consists of both cell cycle 2 and cell cycle 3. Upon completion of second cleavage, the embryo consists of 4 cells.

By "third cleavage event", it is meant the third set of divisions, i.e. the divisions of all of the granddaughter cells. Upon completion of the third cleavage event, the embryo typically consists of 8 cells.

By "cytokinesis" or "cell division" it is meant that phase of mitosis in which a cell undergoes cell division. In other words, it is the stage of mitosis in which a cell's partitioned nuclear material and its cytoplasmic material are divided to produce two daughter cells. The period of cytokinesis is identifiable as the period, or window, of time between when a constriction of the cell membrane (a "cleavage furrow") is first observed and the resolution of that constriction event, i.e. the generation of two daughter cells. The initiation of the cleavage furrow may be visually identified as the point in which the curvature of the cell membrane changes from convex (rounded outward) to concave (curved inward with a dent or indentation). The onset of cell elongation may also be used to mark the onset of cytokinesis, in which case the period of cytokinesis is defined as the period of time between the onset of cell elongation and the resolution of the cell division.

By "first cytokinesis" or "cytokinesis 1" it is meant the first cell division event after fertilization, i.e. the division of a fertilized oocyte to produce two daughter cells. First cytokinesis usually occurs about one day after fertilization.

By "second cytokinesis" or "cytokinesis 2", it is meant the second cell division event observed in an embryo, i.e. the division of a daughter cell of the fertilized oocyte (the "leading daughter cell", or daughter A) into a first set of two granddaughters.

By "third cytokinesis" or "cytokinesis 3", it is meant the third cell division event observed in an embryo, i.e. the division of the other daughter of the fertilized oocyte (the "lagging daughter cell", or daughter B) into a second set of two granddaughters.

After fertilization both gametes contribute one set of chromosomes, (haploid content), each contained in a structure referred to herein as a "pronucleus" (PN). After normal fertilization, each embryo shows two PN, one representing the paternal genetic material and one representing the maternal genetic material. "Syngamy" as used herein refers to the breakdown of the PN when the two sets of chromosomes unite, occurring within a couple of hours before the first cytokinesis.

DESCRIPTION OF EMBODIMENTS OF THE INVENTION

Aspects of the invention are operable for automated, non-invasive cell activity tracking. In some embodiments, automated, non-invasive cell activity tracking is for determining a characteristic of one or more cells without invasive methods, such as injection of dyes. The cell activity tracking can be applied to one or more images of one or more cells. The images can be a time-sequential series of images, such as a time-lapse series of images. The cell(s) shown in the plurality of images can be any cell(s) of interest. For example, the cells can be a human embryo that may have one or more cells. Other examples of such cells of interest include, but are not limited to, oocytes and pluripotent cells.

In some embodiments, a number of the cells in each image is of interest, and can be determined by an embodiment of the invention. For example, the number of cells can be representative of an embryo at one or more of the one cell stage, the two cell stage, the three cell stage, the four cell stage, and so on. In some embodiments, the four cell stage represents four or more cells. Alternatively or in addition, a geometry of the cells in each image is of interest, and can be determined by an embodiment of the invention. The geometry of the cells may include a shape of the cells and/or an arrangement of the cells.

In some embodiments, one or more of these characteristics of the cells may be determined by selecting one of multiple hypotheses per image. The selected hypotheses may be the most likely sequence of hypotheses across a time-sequential series of images, and may include a set of shapes that best fit observable geometric characteristics (geometric features shown in one or more of the images) of the cells. In one embodiment, the geometric features may include boundary information associated with each of the one or more cells, such as boundary points and/or boundary segments. Each boundary point and/or boundary segment may be mapped to a specific cell (or to no cells). This mapping may be explicit or implicit. Alternatively or in addition, shapes may be fit to the boundary points and/or boundary segments associated with each cell. These shapes may be ellipses, or other suitable shapes such as b-splines or other smooth shapes. It will be understood that in this specification, references to shapes being fit to boundary segments can also refer to shapes being fit to boundary points and/or other geometric features associated with each of the one or more cells. In one example, the hypotheses may be selected based on multiple hypothesis inference, such as a data driven approximate inference.

The multiple hypotheses per image each include an inferred characteristic of the cells, such as an inferred number of the cells and/or an inferred geometry of the cells. The multiple hypotheses per image can be based on geometric features of the cells shown in the image. There may be a mapping of a representation of each cell to one or more boundary points and/or boundary segments associated with each cell. This mapping may be explicit or implicit. Alternatively or in addition, shapes may be fit to the boundary points and/or boundary segments associated with each cell without generation of an explicit mapping between cells and boundary points and/or boundary segments associated with each cell. In this specification, references to boundary segments of cells and operations involving those segments (such as mapping, generation, merging, etc.) are examples of particular embodiments, and do not limit the scope of the invention to embodiments that involve boundary segments.

In one embodiment, the cell boundary segments are an example of observable geometric information that can be determined based on the images of the cells. Another example is cell boundary points. In one embodiment, each of the multiple hypotheses per image can be viewed as representing the inferred number and/or the inferred geometry of the cells through cell boundary feature labels that represent the mapping (inferred by each hypothesis) of the representation of each cell to the one or more boundary segments associated with each cell. The cell boundary feature labels may be cell boundary segment labels. Advantageously, the solution space across the multiple hypotheses per image is over the discrete set of cell boundary segment labels, which is a much smaller solution space than the continuous set of parameters representing all possible groups of shapes of a particular type that could represent the cells. For example, for tracking up to 4 cells with ellipses each defined by 5 continuous parameters (for example, major axis length, minor axis length, x-coordinate of the ellipse center, y-coordinate of the ellipse center, and yaw angle), the solution space has 20 continuous dimensions. In contrast, the label for each of K boundary segments may have one of five discrete values (for example, 0 for assignment to none of the cells, or 1-4 for assignment to a specific one of the four cells), for a total of only $5^K$ possible solutions. This significantly reduces the solution space by leveraging observable cell boundary segment information from the images, making hypothesis selection more tractable and reliable.

In one embodiment, once the cell boundary segments are labeled, the cell boundary segments can be grouped together and fit to shapes other than ellipses, such as more complex shapes represented by a larger number of continuous parameters. For example, blastomeres within embryos can deviate significantly from ellipses. Advantageously, the dimensionality of the solution space over the discrete set of cell boundary labels is unchanged (in the example above, still $5^K$ possible solutions, where there are K boundary segments). This is unlike the dimensionality of the solution space over the continuous set of parameters representing all possible groups of shapes of a particular type that could represent the cells, which increases if the number of continuous parameters defining the shape increases.

In one embodiment, by solving for cell boundary segment labels, cell boundary segments can be assigned to none of the cells. Advantageously, this can allow for a more robust treatment of outliers and false positive boundaries, which is a common problem associated with processing of cell boundary data.

In some embodiments, based on the characteristics of the cells determined based on hypothesis selection per image, parameters related to embryo health and or fate (outcome, such as whether an embryo is expected to reach blastocyst or arrest) can be determined. These parameters may include but are not limited to one or more of a duration of first cytokinesis, a time interval between cytokinesis 1 and cytokinesis 2, a time interval between cytokinesis 2 and cytokinesis 3, a time interval between a first and second mitosis, a time interval between a second and third mitosis, a time interval from fertilization to an embryo having five cells, and a time interval from syngamy to the first cytokinesis. From one or more of these parameters, an indicator of development competence of the embryo for implantation into a female human subject can be determined in an automated, non-invasive fashion.

Aspects of the invention are also operable for automated, non-invasive cell activity tracking in conjunction with tracking-free approaches such as classification and/or interframe similarity determination to enhance determination of cell/embryo characteristics related to embryo health and/or fate/outcome.

FIG. 1 illustrates a non-limiting example of an automated cell tracking approach applied to images of cell development such as embryo development, in accordance with an embodiment of the invention. A series of time-sequential images $102_1$ to $102_{400}$ ($102_1$, $102_{150}$, $102_{250}$, and $102_{400}$ shown) shows development of one or more cells $100_{1/1}$, $100_{150/1}$ to $100_{150/c}$, ... $100_{400/1}$ to $100_{400/c}$ shown in each of the images $102_1$, $102_{150}$, $102_{250}$, and $102_{400}$, respectively (where c is the number of cells shown in the image $102_i$, and c can be a different value for each image $102_i$). In this example, the one or more cells 100 are included in a human embryo. The subscript 1 to 400 is an identifier associated with each individual image $102_i$, where the identifier may be a time indicator, a frame number, or another suitable identifier for distinguishing the images 102 and their contents. In this example, for image $102_1$, one cell $100_{1/1}$ is shown. For image $102_{150}$, two cells $100_{150/1}$ to $100_{150/2}$ are shown. For image $102_{250}$, three cells $100_{250/n}$ to $100_{250/3}$ are shown. For image $102_{400}$, four cells $100_{400/1}$ to $100_{400/4}$ are shown.

After determination of cell boundary segments, the identified cell boundary segments $104_{1/1}$, $104_{150/1}$ to $104_{150/k}$, ... $104_{400/1}$ to $104_{400/k}$ are shown for each of the images $102_1$, $102_{150}$, $102_{250}$, and $102_{400}$, respectively (where k is the number of cell boundary segments determined to be in the image $102_i$, and k can be a different value for each image $102_i$). For clarity, the cell boundary segments 104 are not overlaid on the images 102, and adjacent cell boundary segments 104 are shown with different line types and thicknesses.

One or more hypotheses $106_{1/1}$, $106_{150/1}$ to $106_{150/n}$, $106_{400/1}$ to $106_{400/n}$ are shown per image for each of the images $102_1$, $102_{150}$, $102_{250}$, and $102_{400}$, respectively (where n is the number of hypotheses for the image $102_i$, and n can be a different value for each image $102_i$). In this example, each of the n hypotheses $106_{i/1}$ to $106_{i/n}$ per image $102_i$ is based on a mapping of a representation of each cell $100_{i/c}$ to one or more of the boundary segments $104_{i/1}$ to $104_{i/k}$ associated with each cell $100_{i/c}$ for that hypothesis. In other embodiments, each of the hypotheses 106 may be based on other types of observable geometric information such as boundary points. In other embodiments, an explicit mapping of cells to boundary points and/or boundary segments is not required. In this example, each hypothesis 106 includes inferred characteristics of the one or more cells 100 including an inferred number of one or more cells 102 and an inferred geometry of the one or more cells 100. For example, the inferred number of cells 100 associated with the hypothesis $106_{400/1}$ is four (the number of ellipses 110 associated with the hypothesis $106_{400/1}$), and the inferred geometry of the one or more cells 100 associated with the hypothesis $106_{400/1}$ is indicated by one or more of the shape and arrangement of the ellipses 110. In another example, the ellipses 110 may be another suitable shape, such as a b-spline or another smooth shape. Note that since there is only one cell $100_{1/1}$ and one cell boundary segment $104_{1/1}$ determined to be shown by the image $102_1$, there may be only one hypothesis associated with the image $102_1$: the hypothesis $106_{1/1}$, mapping the cell $100_{1/1}$ to the cell boundary segment $104_{1/1}$. Alternatively or in addition, there may be a second hypothesis associated with the image $102_1$: a hypothesis (not shown) mapping none of the cells to the cell boundary segment $104_{1/1}$.

In this example, the hypotheses $112_{i/n}$ (including hypotheses $106_{1/1}$, $106_{150/2}$, $106_{250/2}$, and $106_{400/1}$ in this example) are selected. Characteristics 108 of the cells 100 associated with the selected hypotheses $106_{1/1}$, $106_{150/2}$, $106_{250/2}$, and $106_{400/1}$, including the number of cells 100 and the geometry of the one or more cells 100 associated with each selected hypothesis $106_{1,1}$, $106_{150/2}$, $106_{250/2}$, and $106_{400/1}$, are shown for each of the images $102_1$, $102_{150}$, $102_{250}$, and $102_{400}$, respectively. For clarity, the cell characteristics 108 are not overlaid on the images 102.

Figure 1B:
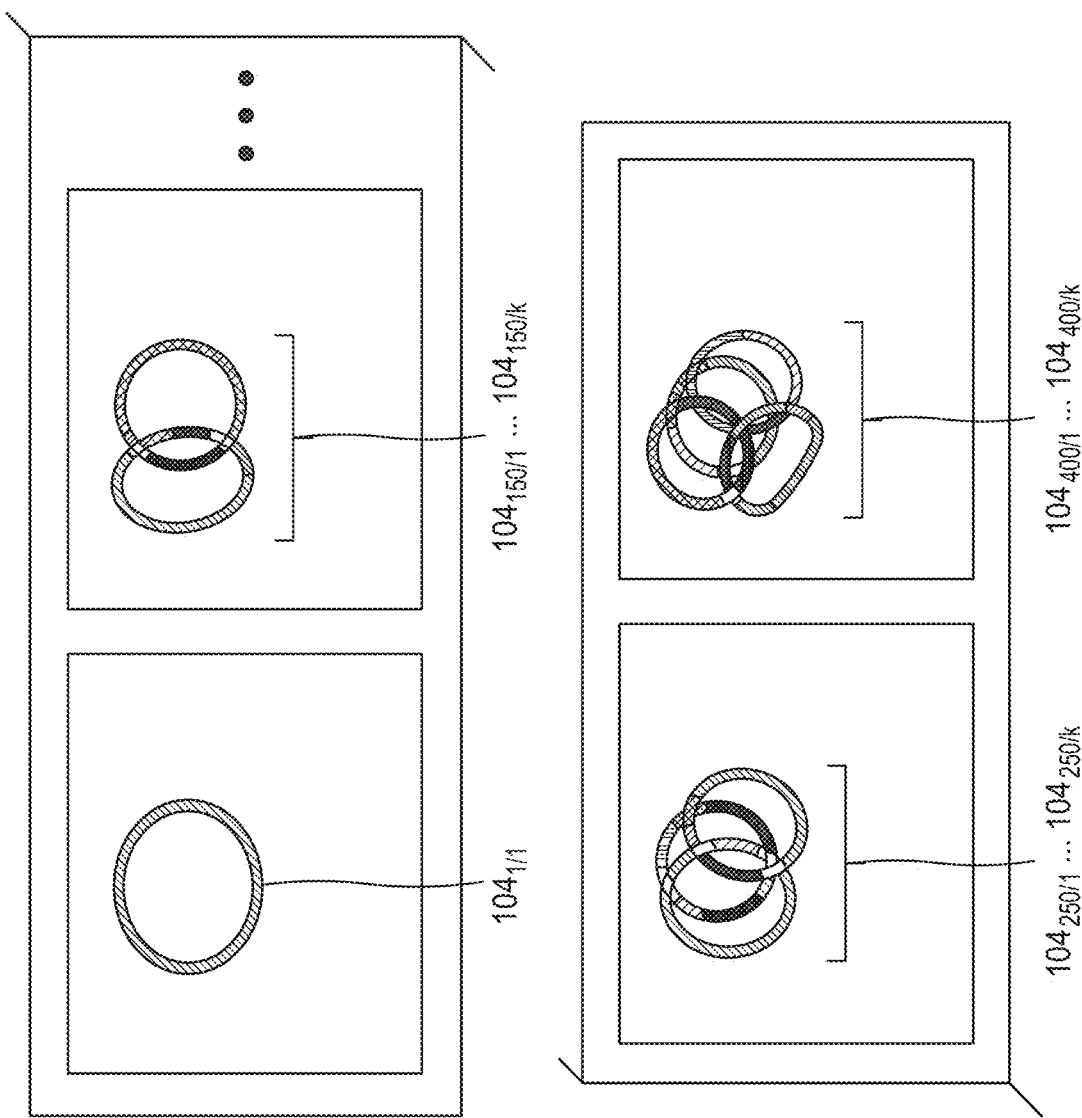
FIG. 1B illustrates an expanded view of cell boundary segments shown in FIG. 1A, in accordance with an embodiment of the invention.

FIG. 1B illustrates an expanded view of the cell boundary segments 104 shown in FIG. 1A, in accordance with an embodiment of the invention. The identified cell boundary segments $104_{1/1}$, $104_{150/1}$ to $104_{150/1}$, ... $104_{400/1}$ to $104_{400}$& are shown for each of the images $102_1$, $102_{150}$, $102_{250}$, and $102_{400}$, respectively. For clarity, adjacent cell boundary segments 104 are cross-hatched with different patterns. In this example, portions 110 of the cell boundaries shown with solid black fill are occluded portions of the cell boundaries that are not included in the cell boundary segments 104.

Figure 2A:
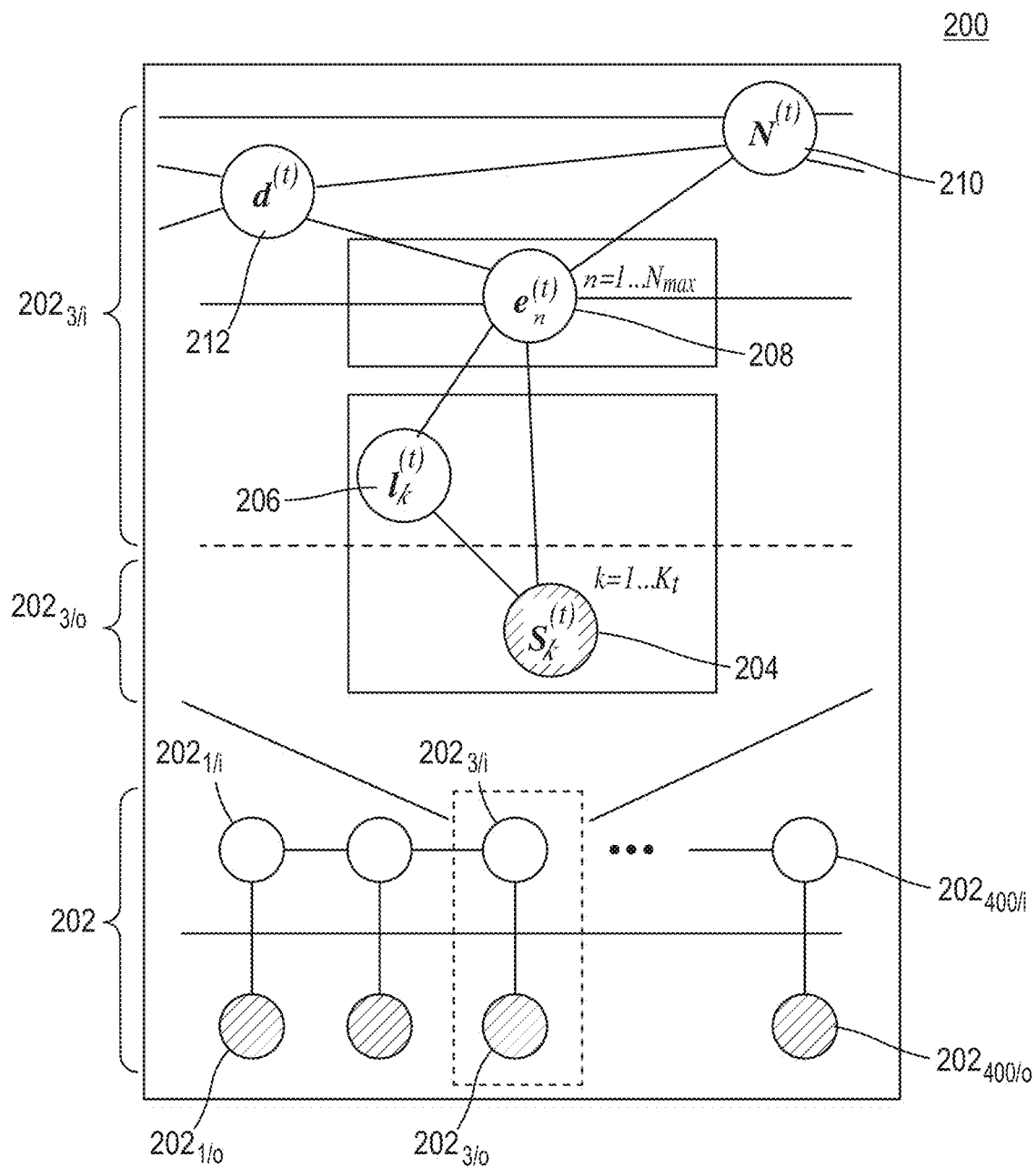
FIG. 2A illustrates a non-limiting example of a cell tracking framework, in accordance with an embodiment of the invention.

FIG. 2A illustrates a non-limiting example of a cell tracking framework 200, in accordance with an embodiment of the invention. The cell tracking framework 200 may be associated with human embryo development. The tracking framework 200 may be based on a probabilistic graphical model (PGM) 202 which captures relevant unknowns, such as cell boundary features, cell boundary feature labels that represent a mapping of the representation of each cell to the one or more boundary segments associated with each cell, cell geometry (such as cell shape), cell division events, and/or number of cells over time. In one embodiment, and referring to FIG. 1A, the PGM 202 is a chain graph that may span a time interval over which the images 102 are taken, and each node in the graph is a variable. The PGM 202 may be a conditional random field (CRF) that represents a stochastic evolution of elliptical cells. A link between two variables in the PGM 202 signifies a direct statistical dependence between them. The PGM 202 includes nodes $202_{1/o}$ to $202_{400/o}$ that represent information (evidence) observable from the images $102_1$ to $102_{400}$, respectively, and nodes $202_{1/i}$ to $202_{400/i}$ that represent variables associated with the images $102_1$ to $102_{400}$, respectively, to be inferred based on cell tracking. Representative nodes $202_{3/i}$ and $202_{3/o}$ of the PGM 202 are expanded to illustrate, for one time slice, exemplary underlying nodes that may be included in the PGM 202.

In one embodiment, observable evidence associated with the node $202_{3/i}$ may include cell boundary segment features observed from the image $102_3$, and represented by one or more segment nodes 204. The segment nodes 204 represent segments $s^{(t)} = \{s_k^{(t)}\}_{k=1 \ldots K_t}$ where $s_k^{(t)}$ is a collection of points $$s_{k,i}^{(t)} \in \mathbb{R}^2 \text{ with } i \in \{1 \ldots m_k^{(t)}\} \text{ with } i \in \tilde{\{1 \ldots m_k^{(t)}\}}.$$

At each frame t there are $K_t$ segments, each with $m_k^{(t)}$ points, $k \in \{1 \ldots K_t\}$. Variables to be inferred that are associated with the node 202$_{3/o}$ may include segment to cell labels represented by one or more label nodes 206, shape descriptors (in this example, ellipse descriptors) represented by one or more ellipse descriptor nodes 208, number of cells represented by number of cells node 210, and cell division events represented by one or more cell division event nodes 212. The label nodes 206 represent labels assigning segments to cells $l^{(t)} \in \{0, 1, \ldots N_{max}\}^{K_t}$, where in this example $N_{max}$=4 cells. The ellipse descriptor nodes 208 represent ellipses $e_n^{(t)} \in \mathbb{R}^5$, $n \in \{1, \ldots N_{max}\}$. The number of cells node 210 represent number of cells $N^{(t)} \in \{1, \ldots N_{max}\}$. The cell division event nodes 212 represent division event $d^{(t)} \in \{0,1\}$. Each ellipse $e_n^{(t)}$ may be associated with its parent, $e_{Pa(n)}^{(t-1)}$.

The PGM 202 captures at least three types of context: (1) intracell shape and geometric coherence that relate the boundary pixels of any given cell to each other; (2) intercell geometric context that relates the shapes of different cells within an embryo to each other; and (3) temporal context relating shape and topology between image frames 102 (see FIG. 1A). Intracell shape and geometric coherence refers to the relationship between boundary points that belong to one cell, and relates to, for example, segment generation and constrained segment merging (see FIG. 3A). Intercell geometric context refers to the relationship of shapes of different cells (such as in an embryo) to one another. For example, a very large cell and a very small cell are not likely contained in the same embryo, and hypotheses containing the very large cell and the very small cell can be rejected (or scored low). Temporal context refers to, for example, cell shape deformation with time and cell division.

Example 3 below illustrates in detail an example of the mathematical form of the joint probability distribution over the variables represented in the PGM 202, and that discussion is not repeated here. Eq. (8), Example 3 illustrates an example of the observation model included in the joint probability distribution shown in Eq. (7), Example 3. The exemplary observation model of Eq. (8), Example 3 is generalized to include information associated with tracking-free approaches such as classification and/or interframe similarity determination that may be used in conjunction with cell activity tracking. When cell activity tracking is used without tracking-free approaches, an example of the observation model is shown below as Eq. (1), with the term $$c_N^{(t)}(N^{(t)})$$

associates with me classifier set to zero and the term $\delta^{(t)}$ associated with interframe similarity set to 0.5 (so that a division event is equally likely or unlikely between adjacent images 102 (see FIG. 1A)).

$$\phi_2(d^{(t)}, \delta^{(t)})$$

thereby becomes a constant and can be dropped from the observation model.

$$\Phi(e^{(t)}, l^{(t)}, N^{(t)}, d^{(t)}, s^{(t)}) = \phi_0(e^{(t)})(\phi_1(e^{(t)}, l^{(t)}, N^{(t)}, s^{(t)})) \quad (1)$$

In Eq. (8), Example 3, the term $$\phi_1(e^{(t)}, l^{(t)}, N^{(t)}, s^{(t)}),$$

which encodes compatibility of ellipses, segments, and labels, captures intracell shape and geometric coherence that relate segments $s^{(t)}$ to cells. The term $\phi_0(e^{(t)})$, which encodes geometric constraints, captures intercell geometric context that relates the shapes of different cells within an embryo to each other. The motion (transition) model $$\Psi(e^{(t-1:t)}, N^{(t-1:t)}, d^{(t)})_{t=2\ldots T},$$

shown in Eqs. (8, 11), Example 3, captures temporal context relating shape and topology between image frames.

Figure 2B:
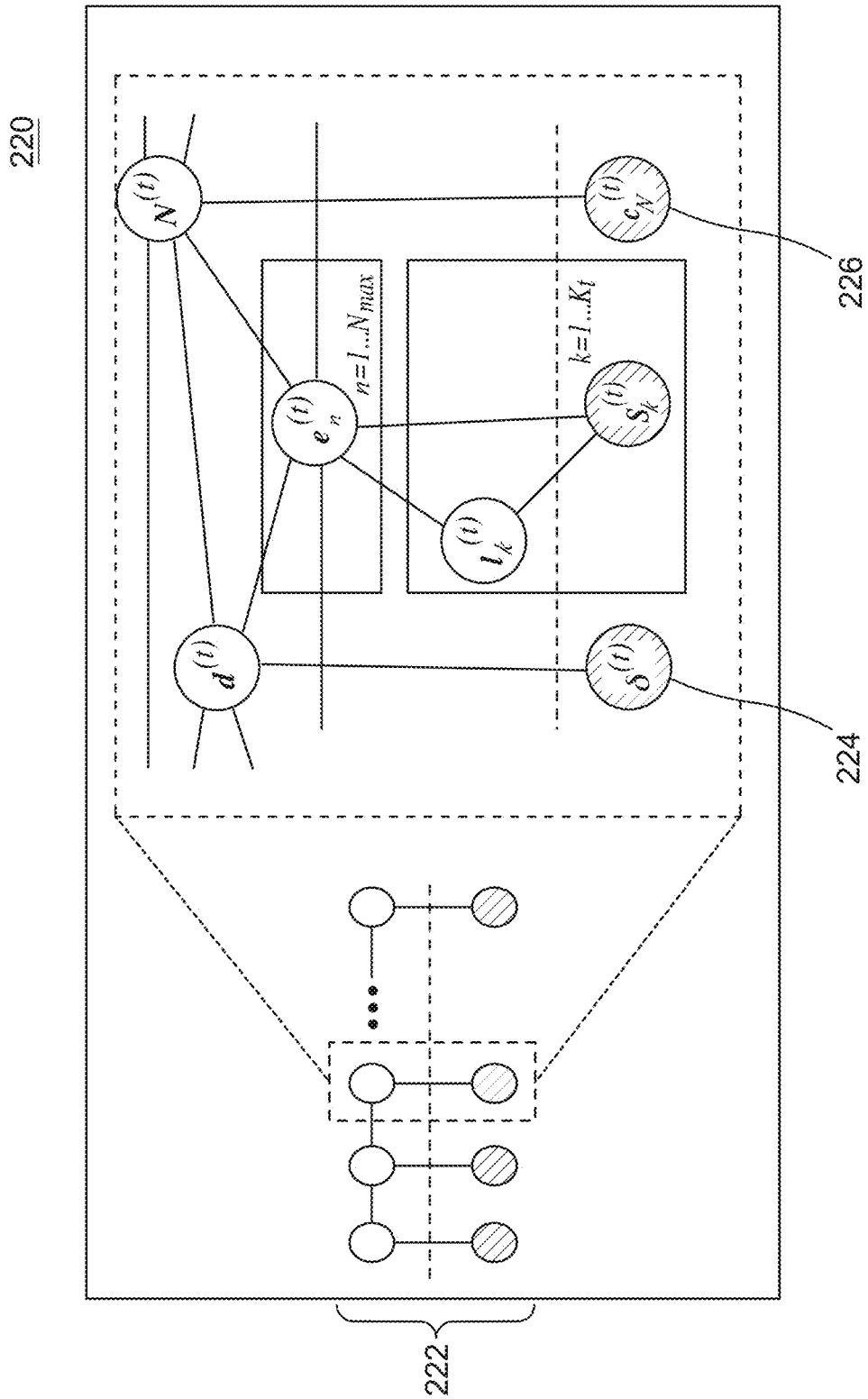
FIG. 2B illustrates a non-limiting example of a cell tracking framework, in accordance with another embodiment of the invention.

FIG. 2B illustrates a non-limiting example of a cell tracking framework 220, in accordance with another embodiment of the invention. In one embodiment, the cell tracking framework 220 may be associated with human embryo development. Various aspects of the cell tracking framework 220 are similar to aspects of the cell tracking framework 200 described with reference to FIG. 2A, and those aspects are not repeated here. A PGM 222 is in many respects similar to the PGM 202 described with reference to FIG. 2A, except that the PGM 222 further includes additional observable information. This additional observable information may include an image similarity measure $\delta^{(t)} \in [0,1]$ represented by one or more image similarity measure nodes 224, and/or a classifier on the number of cells $$c_N^{(t)} \in \mathbb{R}^{N_{max}}$$

represented by one or more classifier nodes 226. The image similarity measure may relate to a likelihood of occurrence of one or more cell division events between adjacent images 102 (see FIG. 1A). The classifier may be an AdaBoost or Support Vector Machine (SVM) classifier, may be single-level or multi-level, and may estimate posterior probabilities of number of cells (in one embodiment, $c_N^{(t)}$ in Eq. (8), Example 3 below) from a set of hand-crafted and/or machine learned discriminative image features. Such a classifier can be configured to perform image-based cell classification as disclosed in Examples 1 and 2 below.

In one embodiment, cell activity tracking can be used in conjunction with tracking-free approaches such as classification and/or interframe similarity determination, as described above with reference to FIG. 2B. Example 3 below illustrates in detail an example of the mathematical form of the joint probability distribution over the variables represented in PGM 222, and that discussion is not repeated here.

Figure 3A:
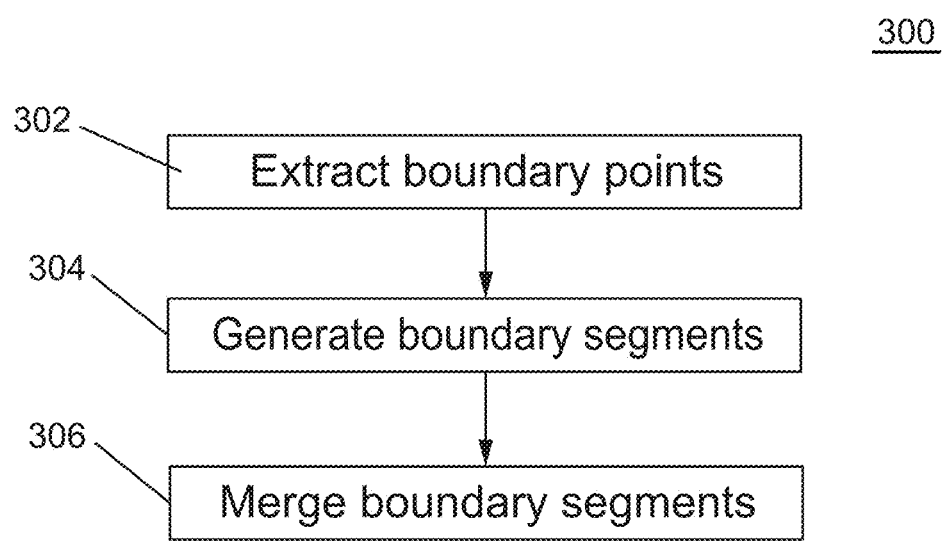
FIG. 3A illustrates a method for obtaining cell boundary feature information, in accordance with an embodiment of the invention.

FIG. 3A illustrates a method 300 for obtaining cell boundary feature information, in accordance with an embodiment of the invention. This cell boundary feature information may include cell boundary segments 104 (see FIG. 1). In one embodiment, the cell boundary segments 104 may be boundary segments of one or more cells included in a human embryo. For each image 102 (see FIG. 1), boundary points of the cell(s) are determined (block 302). Cell boundary segments are then generated based on the cell boundary points (block 304). One or more pairs of the cell boundary segments may then be merged (block 306) into the cell boundary segments 104. Segment merging aims to combine the generated cell boundary segments (from block 304) into a smaller set of longer segments in order to reduce the total number of combinations for mapping of a representation of each of one or more cells to one or more boundary segments associated with each of the one or more cells. These potential mappings can have associated segment to cell labels represented by one or more label nodes 206 (see description with reference to FIG. 2A), and are observable evidence from the images 102 that can be leveraged as part of reducing the number of hypotheses to be considered during hypothesis selection (see description with reference to FIG. 3B).

With reference to extraction of cell boundary points (block 302), in one embodiment, boundary points can be extracted using a Hessian operator, which provides a boundary strength and orientation angle for each pixel of each image 102 (see FIG. 1). The Hessian operator may be represented as a matrix of second-order partial derivatives. The boundary strength at each pixel of each image 102 may be obtained based on the eigenvalues of this matrix, and the orientation angle at each pixel of each image 102 may be obtained based on the eigenvectors of this matrix. In one embodiment, the Hessian images resulting from application of the Hessian operator to each image 102 may be thresholded. The effect of applying the Hessian operator to each image 102 followed by thresholding can be to emphasize contrast between cell boundary points and other pixels within the images 102, whether internal to or external to the cells 100 (see FIG. 1). In other embodiments, other approaches for boundary point extraction can be used, including but not limited to intensity gradients (for example, Canny edge detection and/or Sobel edge detection), texture gradients, region based approaches, and/or other suitable approaches known to one of ordinary skill in the field of computer vision.

With reference to generation of boundary segments (block 304), in one embodiment, the boundary segments can be generated through a directed local search for coherent boundary pixels included in the set of extracted cell boundary points. As described previously, boundary segment generation is based on intracell shape and geometric coherence that relate the boundary pixels of any given cell to each other. For example, boundary points that essentially lie along an elliptical cell boundary and essentially cover the elliptical boundary can be considered to be highly coherent and compatible with that cell. On the other hand, randomly scattered points are incoherent and not compatible with any particular cell. The cell shape in this case is assumed to be an ellipse, but other suitable shape models (such as but not limited to b-splines) can also be assumed. In one embodiment, the generation of boundary segments and the mapping of the boundary segments to representations of cells occurs in a bottom up fashion. Boundary segments can be determined by searching for points that lie along or near a smooth curve. If these points continue along a complete ellipse, the boundary segment is the same as the ellipse. But cell boundaries can also be broken and discontinuous (such as due to occlusion by other cells), so after detecting segments the mapping of the boundary segments to representations of cells typically occurs.

In one embodiment, the boundary points can be grouped into boundary segments subject to the following two competing criteria: (1) create as few segments as possible; and (2) associate each segment with at most one cell in the image 102. In other words, in one embodiment, boundary segment generation aims to group the initial boundary points into as few segments as possible, but errs on the side of breaking apart segments when unsure as to whether they represent the same cell. The subsequent segment merging (block 306) aims to resolve these ambiguities.

In one embodiment, the boundary segments can be generated through ridge search segment generation. A ridge search seeks a path along which consecutive peaks occur. An analogy for the ridge search is walking along the top of a mountain chain and seeking the next peak along the direction of that chain. This search can be performed on a Hessian image generated through boundary point extraction (block 302) from the image 102. The ridge search starts by finding the strongest valued pixel in the Hessian image as an entry point into a ridge. It then continues by progressing along a trajectory that starts from the original pixel along the Hessian orientation angle for each pixel generated through boundary point extraction (block 302) from the image 102. It searches for another high valued pixel along this trajectory, and starts over. It can repeat this process until either there are no high value pixels in the expected regions, or if the found high value pixel has an orientation angle that is too different than the current orientation angle, which can indicate an endpoint for the segment. When a segment's ridge search is finished, a new ridge search is begun. This process is continued until all high value Hessian image pixels have been covered.

In other embodiments, other approaches for boundary segment generation can be used, including but not limited to a breadth first search on the boundary points, ordering the boundary points in a minimal spanning tree and then breaking the tree at points of discontinuity, and/or other suitable approaches known to one of ordinary skill in the field of computer vision.

With reference to merging of boundary segments (block 306), segment merging aims to combine the generated boundary segments (block 304) into a smaller set of longer segments in order to reduce the total number of combinations for mapping of segments to cells. In one embodiment, for any two segments, segment merging may be based on one or more of four criteria: (1) relative fit error; (2) continuity of endpoints; (3) continuity of angle; and (4) curvature consistency. The relative fit error criterion can involve fitting three curves, one for each of the two input segments, and one for the merged segment. If the fit error of the merged segment is better than that of the individual input segments, the likelihood of merging increases. The continuity of endpoints criterion looks at how closely the two segments to be merged are to each other if they were to be continued. Closer distance makes a merge more likely. The continuity of angle criterion is based on a similar concept, except that it is based on the angle at the join point for the merged segment as well as the angle for each of the individual segments were they to continue to the join point. The closer these angles are to each other, the more likely a merge is. The curvature consistency criterion can be that if the mean curvature of the two segments to be merged are close to each other, the more likely a merge is.

In one embodiment, the segments can be merged (block 306) based on a merging inference that analyzes geometric properties of the generated boundary segments (block 304) to determine if they can be merged into a smaller set of larger segments. The merging of the boundary segments can be formulated as a graph partitioning on a graph whose vertices are segments and whose edges indicate merging of segments, where the number of partitions is unknown in advance.

Figure 3B:
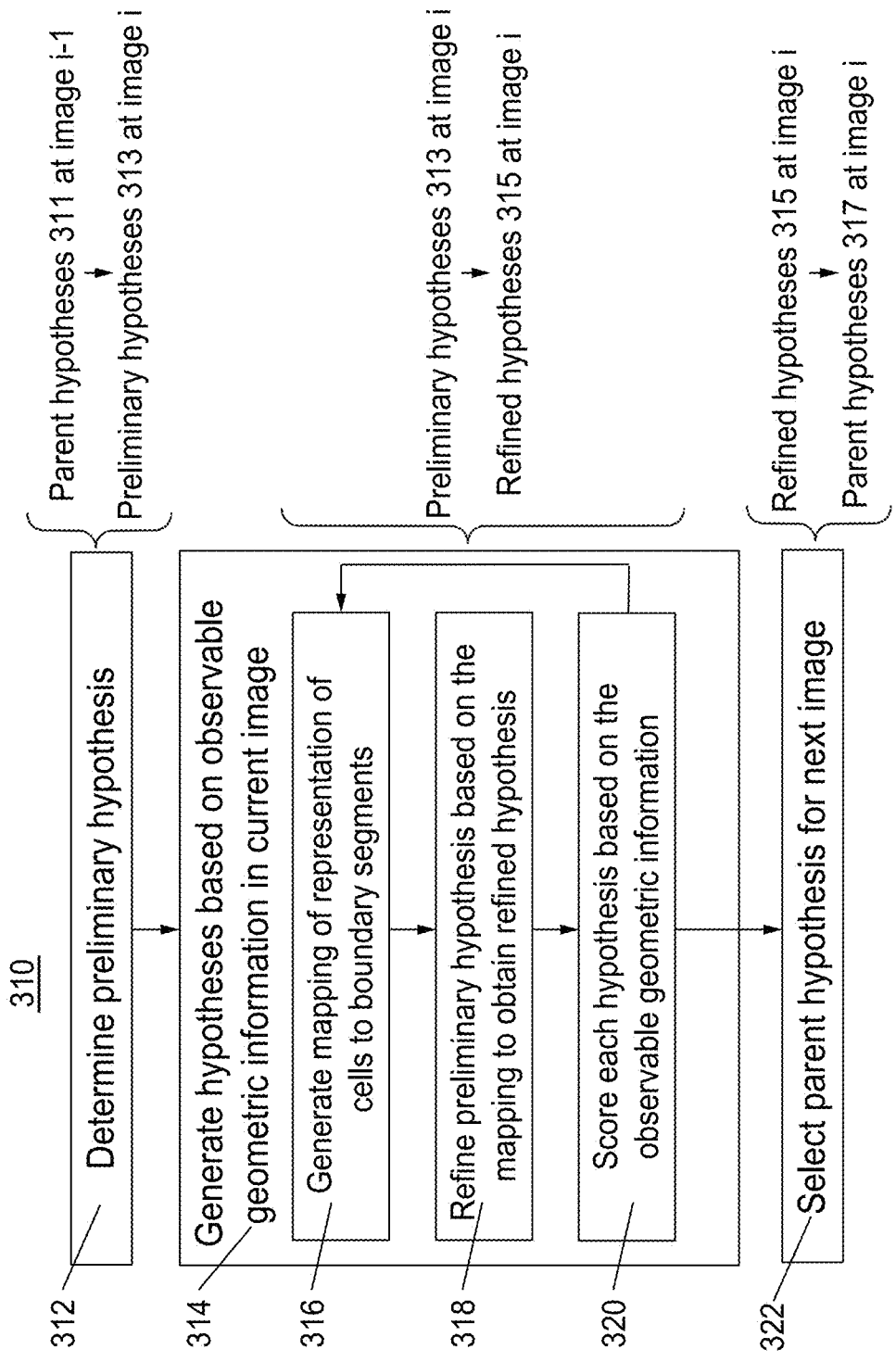
FIG. 3B illustrates a method for generating a mapping of a representation of cells to cell boundary feature information and refining hypotheses each including an inferred characteristic of one or more of the cells, in accordance with an embodiment of the invention.

FIG. 3B illustrates a method 310 for generating a mapping of a representation of cells 100 (see FIG. 1) to cell boundary feature information and refining hypotheses each including an inferred characteristic of one or more of the cells 100, in accordance with an embodiment of the invention. In one embodiment, the cells 100 may be included in a human embryo. At each image 102 (see FIG. 1), hypotheses associated with embryo development are generated, each of which is associated with cell boundary segment labels that map representations of each of the cells 100 to one or more of the cell boundary segments 104. At each image $102_i$, a number of "parent" hypotheses 311 selected from hypotheses $106_{i-1/n}$ for cells $100_{i-1/n}$, from the previous image $102_{i-1}$ can be used to determine preliminary hypotheses 313 associated with the image $102_i$ (block 312). One or more of the inferred characteristics included in the preliminary hypotheses 313 associated with the image $102_i$, such as inferred geometric parameters associated with ellipses associated with each of these preliminary hypotheses 313, may be generated by sampling and perturbing ellipses associated with one or more of the parent hypotheses 311. In one embodiment, there may be one parent hypothesis 311 associated with each number of cells (such as 1, 2, 3, and 4 cells) that can be shown in the image $102_{i-1}$. Alternatively, there may be more or fewer parent hypotheses 311 associated with each number of cells that can be shown in the image $102_{i-1}$. In one embodiment, there may be one, two, three or four preliminary hypotheses 313. Alternatively, there may be a larger number of preliminary hypotheses 313. At an initial image $102_1$, an initial hypothesis may be generated by finding an ellipse that best fits boundary segments for the cell $100_{1/1}$.

In one embodiment, one or more detected segments can be assigned to no representation of any of the cells 100. Advantageously, this can allow for a more robust treatment of outliers and false positive boundaries, which is a common problem associated with processing of cell boundary data.

Next, hypotheses 315 are generated from the preliminary hypotheses based on observable geometric information from the current image (image $102_i$) (block 314). In one embodiment, the hypotheses 315 may be generated (block 314) through expectation maximization (EM) optimization to obtain a data driven refined hypothesis based on at least observable geometric information from the image $102_i$. The observable geometric information from the image $102_i$ may include one or more of the shape and arrangement of the cells $100_{i/n}$ shown in the image $102_i$. The shape of the cells $100_{i/n}$ may be characterized by multiple shape parameters. For example, for a shape that is an ellipse, the shape parameters may include, but are not limited to, major axis length, minor axis length, x-coordinate of the ellipse center, y-coordinate of the ellipse center, and yaw angle. The arrangement of the cells $100_{i/n}$ may be characterized by parameters related to, but not limited to, one or more of orientation of, location of, and overlap between one or more of the cells $100_{i/n}$. Advantageously, by taking into account the observable geometric information from the current image $102_i$ as well as past images $102_1$ to $102_{i-1}$, the hypotheses 315 may be refined to more closely track the full set of available, observable geometric information, thereby making hypothesis selection more tractable and reliable.

In one embodiment, the generation of the hypotheses 315 in block 314 may include one or more of blocks 316, 318, and 320. At the image $102_i$, a mapping of a representation of each of the cells $100_{i/n}$, associated with each of the preliminary hypotheses 313 to boundary segments $104_{i/k}$ obtained from segment merging (block 306) applied to the image $102_i$ may then be generated (block 316). In one embodiment, this mapping may be obtained by assigning each of the segments $104_{i/k}$ to the closest shape (such as an ellipse) included in each of the preliminary hypotheses 313. For example, the ellipse to which the average distance across all points in a segment $104_{i/k}$ is smallest can be the corresponding ellipse for the segment $104_{i/k}$. These mappings may be represented by the segment to cell labels represented by the one or more label nodes 206 (see FIG. 2).

Next, each of the preliminary hypotheses 313 may then be refined based on the mapping from block 316 to obtain refined hypotheses 315 at the image $102_i$ (block 318). Ideally, the entire boundary of each of the cells $100_{i/n}$ shown in the image $102_i$ would be visible, so the boundary segments $104_{i/k}$ mapped to the preliminary hypotheses 313 would cover the entire boundary of each of the cells $100_{i/n}$. However, in a more typical scenario, sections of the boundaries of one or more of the cells $100_{i/n}$ shown in the image $102_i$ may not be visible, and may therefore effectively be missing. An estimate (such as an expected value) may need to be generated for these sections. In one embodiment, portions of each ellipse associated with each preliminary hypothesis 313 are identified that do not have any data points nearby that are associated with boundary segments $10_{i/k}$ mapped to each preliminary hypothesis 313. In one embodiment, a number of equally spaced points (such as 50 to 100, or any other suitable number) can be generated from a parametric representation of each ellipse associated with each preliminary hypothesis 313. Each of these points that does not have a data point sufficiently nearby that is associated with boundary segments $104_{i/k}$ mapped to each preliminary hypothesis 313 can be included in the ellipse as an estimated data point.

The refinement of the preliminary hypotheses 313 to obtain refined hypotheses 315 at the image $102_i$ (block 318) may then include fitting of a shape (such as but not limited to an ellipse) to each group of boundary segments $104_{i/k}$ with the same segment to cell label (represented by the one or more label nodes 206 (see FIG. 2)). Each refined hypotheses 315 includes one or more of these newly fitted ellipses, each ellipse being associated with an associated cell $100_{i/n}$ characterized by the refined hypothesis 315.

Next, each refined hypothesis 315 may be scored based on the observable geometric information from the image $102_i$ (block 320), including but not limited to the boundary segments $104_{i/k}$ determined from the cells $100_{i/n}$ shown in the image $102_i$. In one embodiment, to obtain each refined hypothesis 315, blocks 316, 318, and 320 may be repeated until the fit quality (fit error) converges or a maximum number of iterations is reached. Multiple refined hypotheses 315 can be generated at each image $102_i$. For example, a representative value of the number of refined hypotheses 315 generated at a given image $102_i$ is in the range from 50 to 200, though more or fewer may be generated.

In one embodiment, particle scoring criteria for a given frame include, but are not limited to, the fit quality (fit error) and coverage. The fit quality (which can range from 0 to 1) and/or fit error (which can range from 0 to infinity) indicate how well the cell boundary points associated with each cell $100_{i/n}$ characterized by the refined hypothesis 315, including any estimated data points generated for missing portions of cell boundaries, fit the fitted shape (such as but not limited to an ellipse) to each cell $100_{i/n}$. The coverage indicates how well the boundary of the fitted shape is covered by the cell boundary points associated with each cell $100_{i/n}$ characterized by the refined hypothesis 315, including any estimated data points generated for missing portions of cell boundaries. In one example, one or more parameters associated with the coverage can range from 0 to 1, where 0 can mean no coverage, and 1 can mean full coverage, or vice versa. In addition, other parameters associated with the coverage can characterize inlier coverage, which is the ratio of the cell boundary points associated with each cell $100_{i/n}$ characterized by the refined hypothesis 315, including any estimated data points generated for missing portions of cell boundaries, that are considered inliers to the fitted shape. For example, one or more of these cell boundary points may be excluded if they are too far away from the fitted shape. When that happens, the inlier coverage can be accordingly reduced.

Next, parent hypotheses 317 are selected for the image $102_{i+1}$ from the refined hypotheses 315 (block 322). In one embodiment, there may be one parent hypothesis 317 associated with each number of cells (such as 1, 2, 3, and 4 cells) that can be shown in the image $102_i$. Alternatively, there may be more or fewer parent hypotheses 317 associated with each number of cells that can be shown in the image $102_i$. The collection of the refined hypotheses 315 and their scores are used to approximate a distribution over the refined hypotheses 315, which is then marginalized to obtain an approximate marginal distribution over the number of cells. This marginal distribution can then used to select the parent hypotheses 317. For example, the parent hypotheses 317 may be selected based on one or more of the following determined based on images $102_1$ to $102_i$: an approximate max marginal measure of number of cells at each of the images $102_1$ to $102_i$, an approximate joint distribution over number of cells at each of the images $102_1$ to $102_i$, and/or a marginal distribution over number of cells at each of the images $102_1$ to $102_i$. These distributions are described further with reference to FIGS. 3C, 4A, and 4B.

Figure 3C:
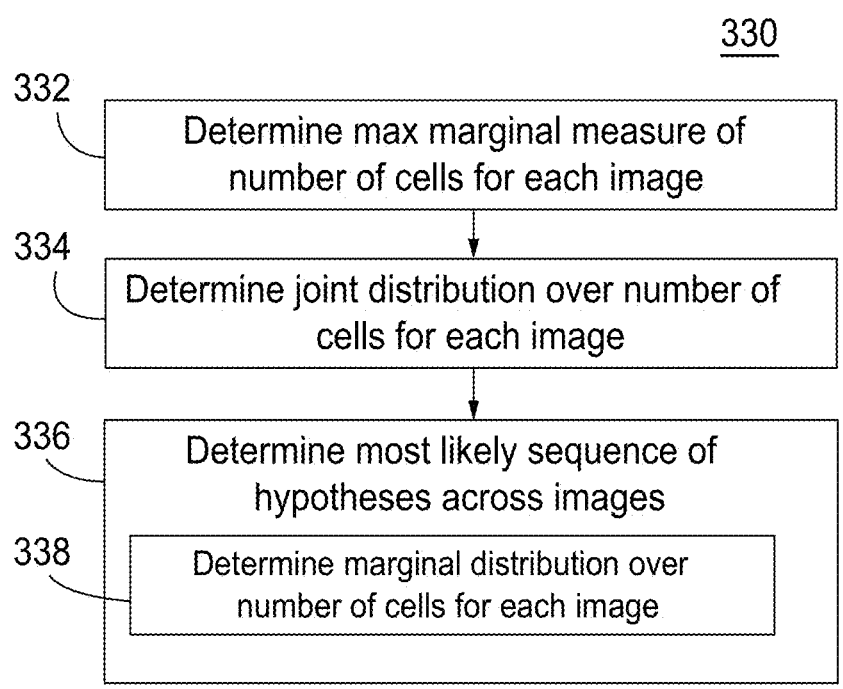
FIG. 3C illustrates a method for selecting hypotheses from the hypotheses illustrated in FIG. 1A, in accordance with an embodiment of the invention.
Figure 4A:
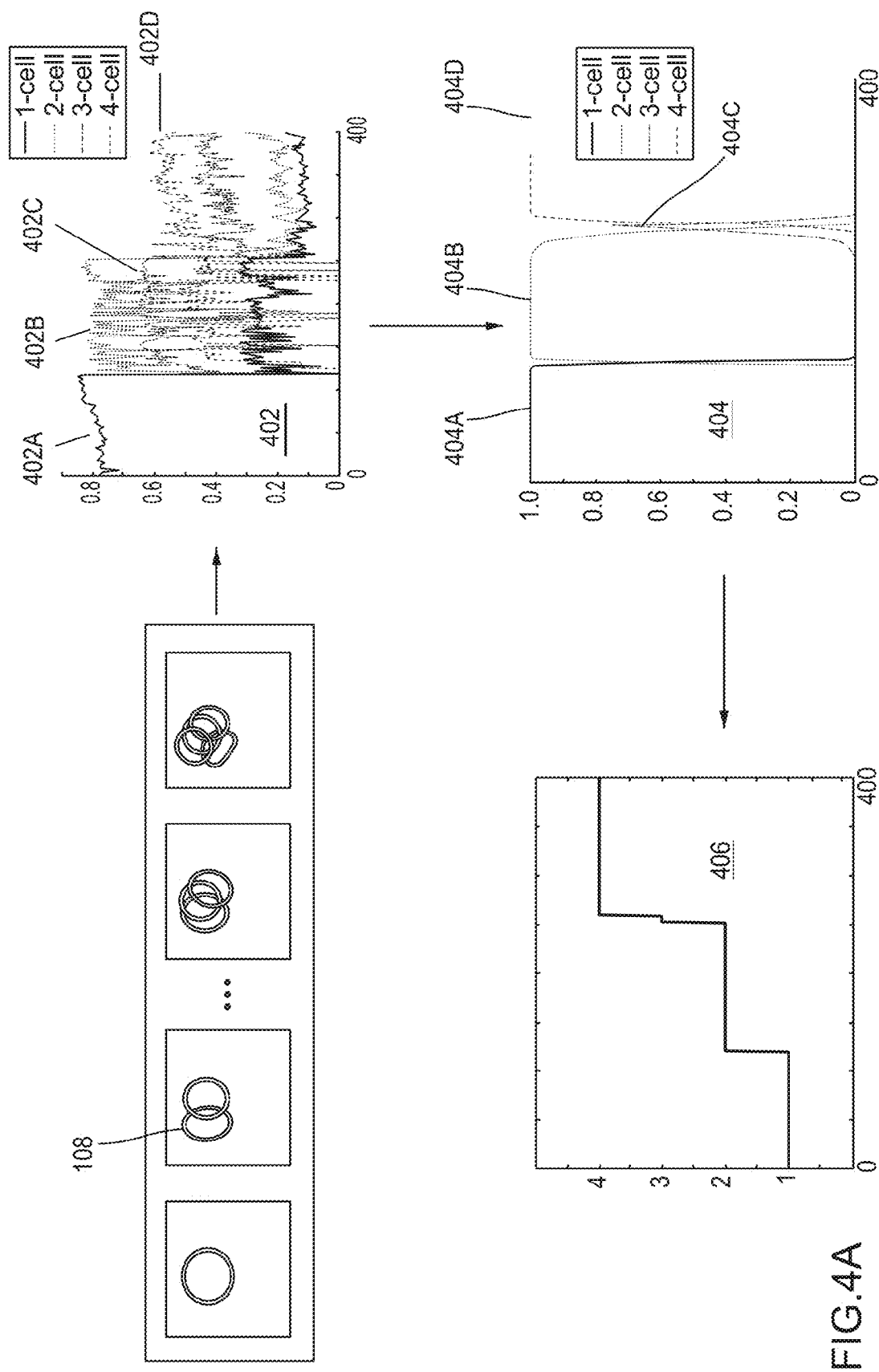
FIG. 4A illustrates an exemplary approach for selection of hypotheses 112 for the images 102 of FIG. 1, in accordance with an embodiment of the invention.
Figure 4B:
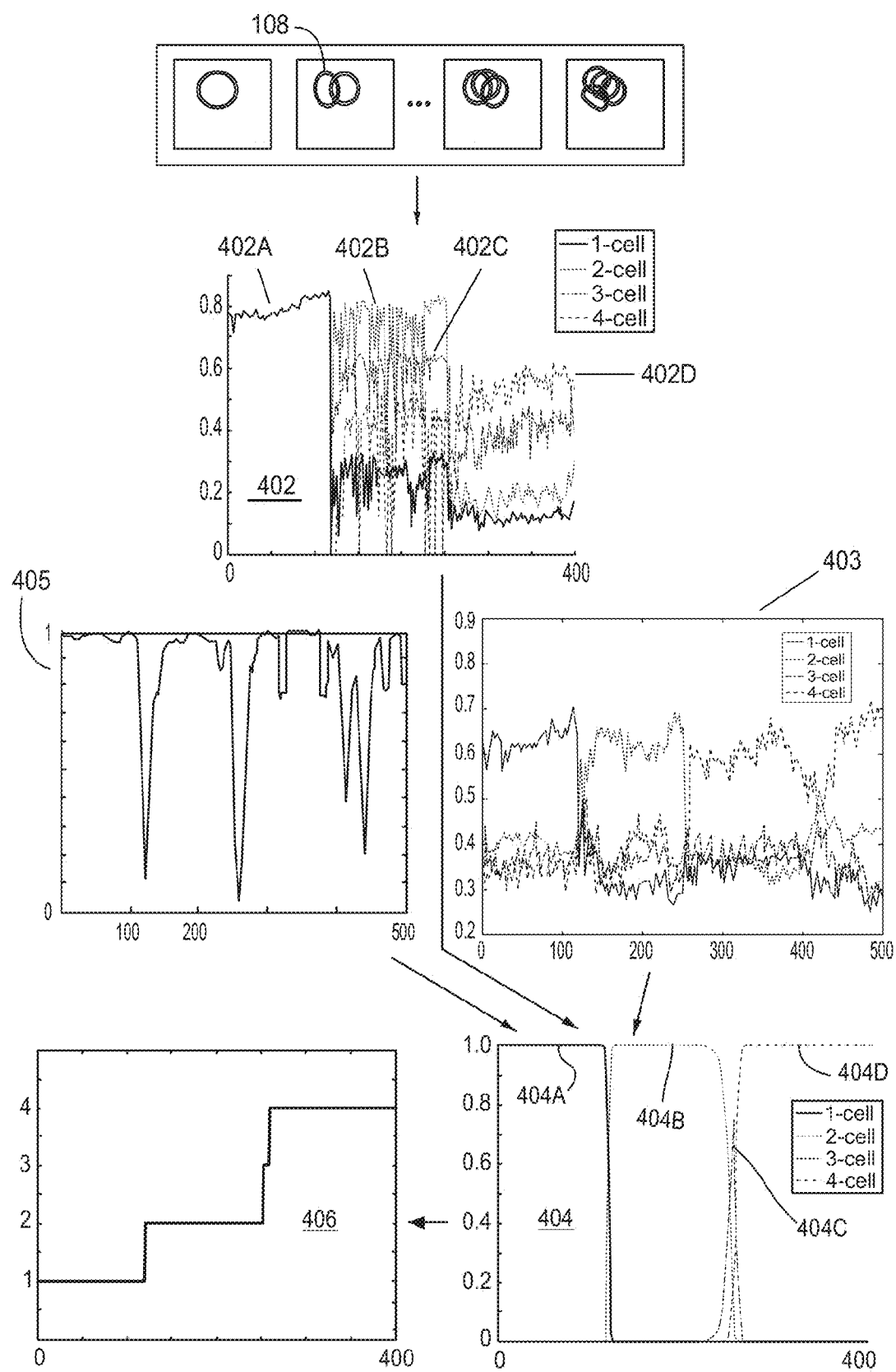
FIG. 4B illustrates an exemplary approach for selection of hypotheses 112 for the images 102 of FIG. 1, in accordance with an embodiment of the invention.

FIG. 3C illustrates a method 330 for selecting hypotheses 112 from the hypotheses 106 (see FIG. 1), in accordance with an embodiment of the invention. FIGS. 4A-4B illustrate exemplary approaches for selection of the hypotheses 112 for the images 102 of FIG. 1, in accordance with embodiments of the invention. In one embodiment, the selection of the hypotheses 112 is an approximate inference over the PGM 202 of FIG. 2A. Alternatively, the selection of the hypotheses 112 is an approximate inference over the PGM 222 of FIG. 2B. Alternatively, the selection of the hypotheses 112 may be an approximate inference over any suitable probabilistic graphical model. Referring to FIGS. 3C, 4A, and 4B, in one embodiment, approximate max marginal measures 402 of number of cells at each of the images $102_1$ to $102_N$ can be determined (block 332) based on the refined hypotheses 315 (see FIG. 3B) for the images $102_1$ to $102_N$. In this example, the approximate max marginal measures 402 are for 1 cell (402A), 2 cells (402B), 3 cells (402C), and 4 cells (402D). The value of the approximate max marginal measures (y-axis) is plotted against image frame number (1 to 400). Then, an approximate joint distribution over number of cells at each of the images $102_1$ to $102_N$ can be determined based on the approximate max marginal measures 402 (block 334). Then, a most likely sequence of hypotheses 112 are determined across the time-sequential images $102_1$ to $102_N$ (block 336). In one embodiment, the most likely sequence of hypotheses 112 are represented as marginal distributions 404 over number of cells at each of the images $102_1$ to $102_N$. These marginal distributions 404 over number of cells can be determined based on the approximate joint distribution (block 338), or in any other suitable manner. The selected hypotheses 112 are associated with characteristics 108 of the cells 100, including the estimated number 406 of the cells $100_{i/n}$ shown in each of the images $102_1$ to $102_N$ (N=400 in the examples shown in FIGS. 4A and 4B) and the geometry of the one or more cells 100 associated with each selected hypothesis 112, as shown for each of the images $102_1$, $102_{150}$, $102_{250}$, and $102_{400}$, respectively. The estimated number 406 of the cells $100_{i/n}$ shown in each of the images $102_1$ to $102_N$ can be determined based on crossover points between the marginal distributions 404 for 1 cell (404A), 2 cells (404B), 3 cells (404C), and 4 cells (404D). The value of the marginal distributions (y-axis) is plotted against image frame number (1 to 400). The value of each marginal distribution 404 across the images $102_i$ represents the probability that the number of cells associated with the marginal distribution 404 is shown in the images $102_i$, based on the selected hypotheses 112. The value of the estimated number 406 of the cells $100_{i/n}$ (y-axis) is also plotted against image frame number (1 to 400).

Example 3 below illustrates in detail examples of the mathematical forms of the approximate max marginal measures 402 (see Eqs. (13, 14), Example 3) and the approximate joint distribution over number of cells at each of the images $102_1$ to $102_N$ (see Eq. (15), Example 3), and that discussion is not repeated here. Eq. (15), Example 3 is generalized to include information associated with tracking-free approaches such as classification and/or interframe similarity determination that may be used in conjunction with cell activity tracking. When cell activity tracking is used without tracking-free approaches, an example of the approximate joint distribution over number of cells is shown below as Eq. (2), with the term $c_{N'}^{(t)}(N^{(t)})$ associated with the classifier set to zero and the term $\delta^{(t)}$ associated with interframe similarity set to 0.5 (so that a division event is equally likely or unlikely between adjacent images 102 (see FIG. 1A)).

$$\phi_2(d^{(t)}, \delta^{(t)})$$

thereby becomes a constant and can be dropped from the approximate joint distribution.

$$\hat{P}(N^{(t)}) \propto \prod_{T=2}^{t} (\hat{\Phi}_M(N^{(t)}))\psi_2(N^{(t-1,t)}, d^{(t)}) \qquad (2)$$

With reference to blocks 336 and 338, the marginal distributions 404 over number of cells at each of the images $102_1$ to $102_N$ can be determined using belief propagation. Belief propagation can be used to integrate prior knowledge, enforce constraints (such as a non-decreasing number of cells), and fuse information such as cell tracking results, classification probabilities, and temporal image similarity to generate embryo stage estimates (such as the estimated number 406 of the cells $100_{i/n}$ shown in each of the images $102_1$ to $102_N$) within a global context. In one embodiment, sum product belief propagation can be used to provide the joint distribution over number of cells at each of the images $102_1$ to $102_N$, and the marginal distributions 404 over number of cells at each of the images $102_1$ to $102_N$. This set of distributions can be used to determine a confidence measure for the inferred cell division times (see description with reference to FIG. 4C).

In one embodiment, the constraint taken into account by hypothesis selection (block 336) is one of: (1) the inferred number of the one or more cells 100 associated with the hypotheses 106 is non-decreasing with time across the series of time-sequential images $102_1$ to $102_N$; (2) after a change in the inferred number of the one or more cells 100, the inferred number of the one or more cells 100 is stable for a period of time across a first subset of the series of time-sequential images $102_1$ to $102_N$; and/or (3) the inferred number of the one or more cells 100 decreases by no more than one with time across a second subset of the series of time-sequential images $102_1$ to $102_N$, then increases at the end of the second subset. Constraint (2) can facilitate elimination of some hypotheses 106, such as cell division events that occur outside of expected biological timeframes. Constraint (3) can apply to human embryo development scenarios in which one or more of the cells 100 divide, then recombine, then divide again later.

In one embodiment, the approximate inference over the PGM 202 and/or 222 (see FIGS. 2A and 2B) described above may occur in a left to right fashion (from image $102_1$ to image $102_N$) followed by event inference (described with reference to FIG. 3C). Alternatively or in addition, another pass through the images 102 from right to left (from image $102_N$ to image $102_1$) can occur to further refine the hypotheses 315 and to search for additional, as yet unexplored hypotheses. Alternatively or in addition, one or more passes through one or more subsets of the images 102 may occur.

In one embodiment, event inference (described with reference to FIG. 3C) may be omitted. In this embodiment, the parent hypotheses 317 (see FIG. 3B) at each of the images $102_1$ to image $102_N$ may be the selected hypotheses 112.

In the embodiment of FIG. 4A, cell activity tracking is used without tracking-free approaches. Alternatively, in the embodiment of FIG. 4B, cell activity tracking is used in conjunction with classification and interframe similarity determination. An image similarity measure 405 may relate to a likelihood of occurrence of one or more cell division events between adjacent images 102 (see FIG. 1A). A classification measure 403 may include estimated posterior probabilities of number of cells (in one embodiment, $c_N^{(t)}$ in Equation (2) of Example 3 below) that may be determined from a set of hand-crafted and/or machine learned discriminative image features.

In some embodiments, the selected hypotheses 112 associated with the plurality of images 102 can be used to determine, account for, and/or otherwise be associated with characterization of biological activity based on one or more parameters such as cell activity parameters, timing parameters, non-timing parameters, and/or the like. For example, when the plurality of images 102 are time-lapse images of a developing embryo, each selected hypothesis 112 can be associated with the likelihood of the images 102 showing a numbers of cells such as but not limited to 1 cell, 2 cells, 3 cells, and/or 4 cells, and can be used to infer cell division timing/events. In such embodiments, the selected hypotheses 112 can reflect constraints, such as those described with reference to FIG. 3C. Accordingly, the selected hypotheses 112 can be used to determine, for the plurality of images 102, duration of first cytokinesis, a time interval between cytokinesis 1 and cytokinesis 2, a time interval between cytokinesis 2 and cytokinesis 3, a time interval between a first and second mitosis, a time interval between a second and third mitosis, a time interval from fertilization to an embryo having five cells (t5 in Table 1 below), a time interval from syngamy to the first cytokinesis (S in Table 2 below), and/or other suitable parameters such as other parameters shown in Table 1 below.

In some embodiments, the parameters can include one or more parameters as described and/or referenced in Table 1 and/or other parameters, wherein the disclosures of (PCT Publication No.) WO 2012/163363, "Embryo Quality Assessment Based on Blastomere Cleavage and Morphology," International Filing Date May 31, 2012, (PCT Application No.) PCT/US2014/014449, "Abnormal Syngamy Phenotypes Observed With Time Lapse Imaging for Early Identification of Embryos With Lower Development Potential," International Filing Date Feb. 3, 2014, and (PCT Application No.) PCT/US2014/014466, "Measuring Embryo Development and Implantation Potential With Timing and First Cytokinesis Phenotype Parameters," International Filing Date Feb. 3, 2014, are incorporated by reference in their entireties.

TABLE 1

List of Parameters

| Parameter | Description/Reference describing Parameter |
| --- | --- |
| P1 | Duration of $1^{st}$ cytokinesis |
| P2 | Interval between $1^{st}$ and $2^{nd}$ cytokinesis (time from 2-cell embryo to 3-cell embryo) (end of $1^{st}$ cytokinesis to end of $2^{nd}$ cytokinesis) (duration as 2 cell embryo) (t3-t2) |
| P3 | Interval between $2^{nd}$ and $3^{rd}$ cytokinesis (time from 3-cell embryo to 4-cell embryo) (end of $2^{nd}$ cytokinesis to end of $3^{rd}$ cytokinesis) (duration as 3 cell embryo) (t4-t3) (synchrony between 3 and 4 cells) |
| S | Time from syngamy to $1^{st}$ cytokinesis |
| 2ce-3C | End of $1^{st}$ cleavage to beginning of second cleavage |
| 3C-4C | Beginning of $2^{nd}$ Cleavage to end of $3^{rd}$ Cleavage |
| t5 | Time from ICSI (fertilization) to 5 cell embryo |
| 2Cb | Time from fertilization to beginning of $1^{st}$ cleavage |
| 2Ce | Time from fertilization until end of $1^{st}$ cleavage |
| 3C | Time from fertilization to beginning of $2^{nd}$ cleavage |
| 4C | Time from fertilization to end of $3^{rd}$ cleavage |
| 5C | Time from fertilization to beginning of $4^{th}$ cleavage |
| BL and/or ICSI | Formation of blastocoel |
| tM | Time from fertilization to morula |
| S3 | Time from 5 cell embryo to 8 cell embryo |
| t2 | Time from fertilization to 2 cell embryo |
| t3 | Time from fertilization to 3 cell embryo |
| t4 | Time from fertilization to 4 cell embryo |
| cc3 | T5-t3: Third cell cycle, duration of period as 3 and 4 cell embryo |
| t5-t2 | Time to 5 cell embryo minus time to 2 cell embryo. |
| cc3/cc2 | Ratio of duration of cell cycle 3 to duration of cell cycle 2 |

TABLE 1-continued

List of Parameters

| Parameter | Description/Reference describing Parameter |
| --- | --- |
| Time till first cleavage | Duration of $1^{st}$ cell cycle |
| 2PB Extrusion | Time from fertilization until the second polar body is extruded |
| PN fading | Time from fertilization until pronuclei disappear, OR time between the appearance of pronuclei appearing and pronuclei disappearing. |
| tSB | Time from fertilization to the start of blastulation |
| tSC | Time from fertilization to the start of compaction |
| PN appearance | Time from fertilization until pronuclei appear |
| t6 | Time from fertilization to 6 cell embryo |
| t7 | Time from fertilization to 7 cell embryo |
| t8 | Time from fertilization to 8 cell embryo |
| cc2b | t4-t2; Second cell cycle for both blastomeres, duration of period as 2 and 3 cell blastomere embryo |
| cc2_3 | t5-t2; Second and third cell cycle, duration of period as 2, 3, and 4 blastomere embryo |
| cc4 | t9-t5; fourth cell cycle; duration of period as 5, 6, 7 and 8 blastomere embryo. |
| s3a | t6-t5; Duration of the individual cell divisions involved in the development from 4 blastomere embryo to 8 blastomere embryo |
| s3b | t7-t6; Duration of the individual cell divisions involved in the development from 4 blastomere embryo to 8 blastomere embryo |
| s3c | t8-t7; Duration of the individual cell divisions involved in the development from 4 blastomere embryo to 8 blastomere embryo |
| cc2/cc3 | WO 2012/163363 |
| cc2/cc2_3 | WO 2012/163363 |
| cc3/t5 | WO 2012/163363 |
| s2/cc2 | WO 2012/163363 |
| s3/cc3 | WO 2012/163363 |
| AC1 | Cleavage directly from 1 cell embryo to 3 cell embryo |
| AC2 | Cleavage of a daughter cell into more than 1 blastomere |
| AS | (abnormal syngamy) Breakdown of pronuclei when two sets of chromosomes unite. Identified when PN disappear smoothly within the cytoplasm and normally occurs within a few hours prior to the first cytokinesis. |
| MN2 | Multinucleation observed at 2 blastomere stage |
| MN4 | Multinucleation observed at 4 blastomere stage |
| EV2 | Evenness of the blastomeres in the 2 blastomere embryo |
| Mul | Multinucleation |
| Uneven | Uneven sizes of blastomeres at 2-4 cells |
| Frg | Fragmentation |
| Nec | Blastomere necrosis |
| Vac | Vacuolization |

Aspects of the invention are further operable for determination of a confidence measure for each selected hypothesis (such as the hypotheses 112 (see FIG. 1A)). The confidence measure for each selected hypothesis can be based on an estimate of the likelihood of the selected hypothesis. If, for example, various periods in embryo development (including but not limited to 1 cell, 2 cell, 3 cell, and 4 cell periods) are represented by marginal probabilities close to 1, and optionally sharp transitions in the marginal distributions 404 between the 1 cell, 2 cell, 3 cell, and/or 4 cell regions, then the estimated number 406 of the cells $100_{i/n}$ associated with the selected hypotheses 112 can be considered to be reliable with high confidence. The confidence measure can be expressed in any suitable manner, such as a probability (between 0 and 1), a percentage (between 0% and 100%), and/or the like.

In7 this manner, aspects of the invention are further operable to determine if the selected hypothesis is reliable based on the confidence measure. For example, the selected hypothesis can be deemed reliable if the confidence measure meets or surpasses a threshold value, and deemed unreliable otherwise. In other words, the reliability determination can be a binary selection criterion, and can be used to determine, automatically or manually, whether to use or discard the hypothesis, and/or the image associated with the hypothesis, and/or the plurality of images, and so on. In some embodiments, the reliability determination can be a factor affecting determination and/or communication of cell activity parameters associated with the selected hypotheses. For example, in some embodiments, the cell activity parameters can be determined if at least one of the selected hypotheses for each different cell characteristic is reliable. Hence, for example, cell activity parameters will be determined for the characteristics 108 (see FIG. 1) if at least one selected hypothesis 112 associated with each of 1 cell, 2 cells, 3 cells, and 4 cells is deemed reliable. In some embodiments, the cell activity parameters can be determined if at least a minimum number of selected hypotheses are reliable.

In some embodiments, the cell activity parameters are displayed only if at least one of the selected hypotheses for each different number of cells (e.g. for 1 cell, 2 cells, etc.) is deemed reliable. In some embodiments, the cell activity parameters are displayed with an indicator of the reliability of the selected hypotheses associated therewith. In this manner, aspects of the invention are operable to prevent display of low confidence results to a user, and/or to warn the user of low reliability results.

In some embodiments, a selection criterion can be applied to the cells shown in the plurality of images based on the reliability determination of the images. In other words, the image-based reliability determination can be translated to making biological determinations of the cells shown in the images. For example, the selection criterion can be associated with development competence of the cells, i.e., whether the cells if implanted would proceed to blastocyst, would result in implantation in a female subject, would result in a pregnancy when implanted in a female subject, and/or the like. In some embodiments, the one or more cells can be deemed (for example) unfit for implantation if at least one of the hypotheses is determined to be unreliable. In some embodiments, the result of applying such a selection criterion can be communicated to the user. In this manner, the user can decide whether to discard or use the cells based on the image-based selection criterion determination described here.

Figure 4C:
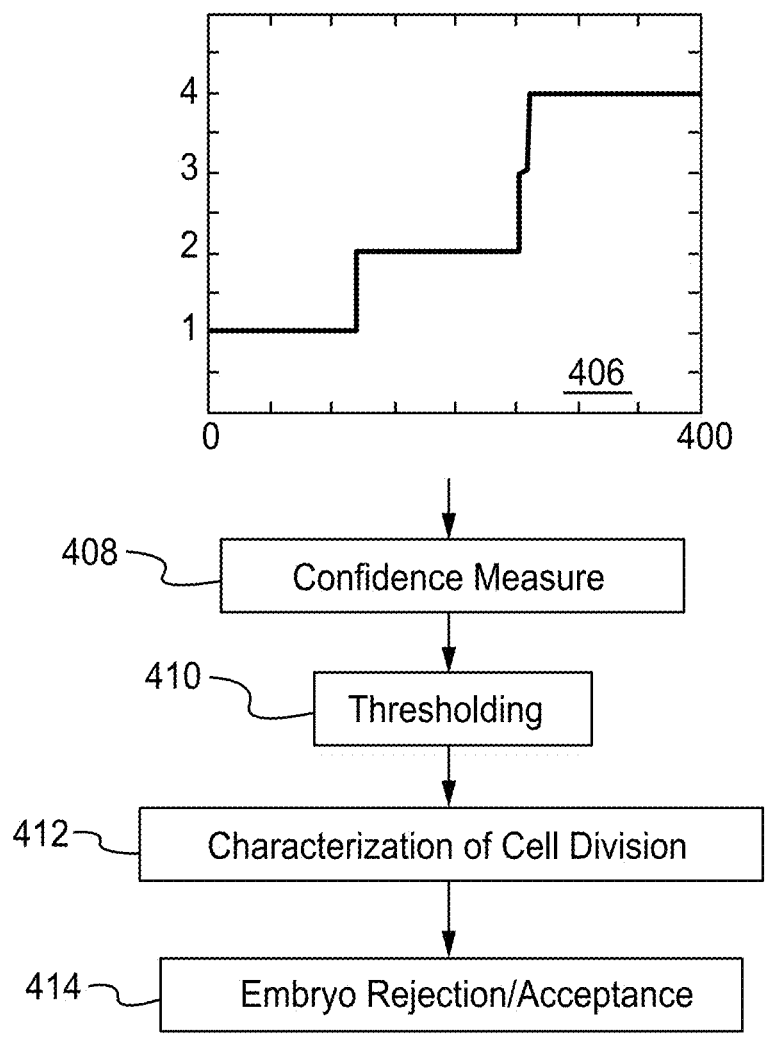
FIG. 4C illustrates an exemplary and nonlimiting approach for determination of a confidence measure for selected hypotheses (such as selected hypotheses 112 of FIG. 1A) and for applying this confidence information, according to an embodiment of the invention.

FIG. 4C illustrates an exemplary and nonlimiting approach for determination of a confidence measure for selected hypotheses (such as selected hypotheses 112 of FIG. 1A) and for applying this confidence information, according to an embodiment of the invention. The estimated number 406 of the cells $100_{i/n}$ shown in each of the images $102_1$ to $102_N$ are associated with the selected hypothesis 112 (for 1 cell, 2 cells, 3 cells, or 4 cells, in this example) that has the highest likelihood at each image $102_i$. Then, a confidence measure for each selected hypothesis is determined (block 408). The confidence measure can be representative of the reliability of one or more of the selected hypotheses 112 across the images $102_1$ to $102_N$. For example, the confidence measure may be based on the highest probability associated with the marginal distribution 404B (for 2 cells; see FIGS. 4A and 4B), or another suitable measure. Alternatively or in addition, the confidence measure may be based on sharpness of transitions between the 1 cell, 2 cell, 3 cell, and/or 4 cell regions as represented by the marginal distributions 404. If these various periods in embryo development (including but not limited to 1 cell, 2 cell, 3 cell, and 4 cell periods) are represented by marginal probabilities close to 1, and optionally sharp transitions in the marginal distributions 404 between the 1 cell, 2 cell, 3 cell, and/or 4 cell regions, then the estimated number 406 of the cells $100_{i/n}$ associated with the selected hypotheses 112 can be considered to be reliable with high confidence. The confidence measure may be a value between 0 and 1, and may represent a percentage confidence value between 0% and 100%.

Next, the reliability of the selected hypotheses 112 can be determined by thresholding the confidence measure (block 410). For example, the selected hypotheses 112 can be deemed reliable overall if the confidence measure for at least one selected hypothesis 112 for each number of cells is at least a threshold value. The threshold value may be any suitable value between 0 and 1, such as but not limited to 0.5, 0.6, 0.7, 0.8, 0.9, or 1.0. In some embodiments, if the selected hypotheses 112 are deemed unreliable, an indicator of the unreliability of the hypotheses 112 may be displayed.

Next, if the selected hypotheses 112 are deemed reliable, and/or if so specified for unreliable outcomes, cell activity can be determined based on characterization of parameters such as cell division events, duration of cell division and/or growth, and/or the like (block 412). Next, a selection criterion can be applied to determine whether to accept or reject the embryo shown in the images 102 for implantation (block 414). The selection criterion can be determined based on the thresholding performed at block 410, and optionally based on the parameter characterization performed at block 412.

In one embodiment, a rejection of an embryo for implantation into a female human subject can be displayed if at least one of the hypotheses 112 is determined to be unreliable based on the selection criterion. Alternatively or in addition, an indicator of development competence of the embryo for implantation into a female human subject can be displayed, where the indicator is based on the reliability of at least one of the hypotheses 112 determined based on the selection criterion. The rejection and/or the indicator of development competence may be displayed along with an indicator of the reliability of the at least one of the hypotheses 112 based on the confidence measure.

Figure 5:
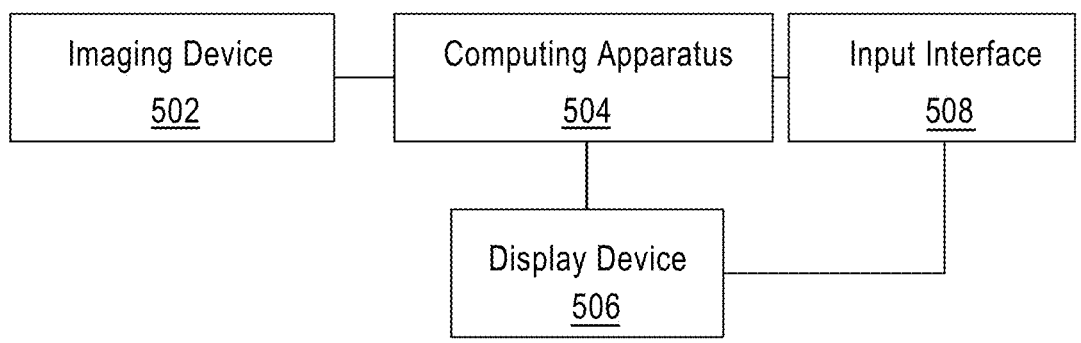
FIG. 5 illustrates a schematic diagram of a system for automated cell tracking and for confidence estimation in accordance with embodiments of the invention.

Referring to FIG. 5, a schematic diagram of a system 500 for automated cell tracking and for confidence estimation in accordance with embodiments of the invention is described. The system 500 includes at least an imaging device 502, a computing apparatus 504, a display device 506, and an input interface 508.

In some embodiments, the computing apparatus 504, the display device 506, and the input interface 508 may be integrated into a common chassis (such as in a personal computer, laptop, and/or tablet form factor), and may be connected to the imaging device 502 over a wireline and/or wireless network. Alternatively or in addition, the imaging device 502, the computing apparatus 504, the display device 506, and the input interface 508 may be integrated into a common chassis.

The imaging device 502 may be any device configurable to acquire an image and/or a plurality of images of one or more cells. The computing apparatus 504 may be configured to receive the images from the imaging device 502. In some embodiments, the imaging device 502 includes one or more of a darkfield illumination microscope and a brightfield illumination microscope, but is not limited to these imaging modalities. The display device 506 may be any suitable device for displaying control information and/or data to a user of the system 500 (e.g. such as a LCD display), and may optionally be suited for receiving user input (e.g. a touch screen panel). In some embodiments, the display device 506 is at least configured to display one or more of the plurality of images. In some embodiments, the display device 506 is further configured to present an indicator of the reliability of the plurality of hypotheses.

In some embodiments, the computing apparatus 504 may be configured for automated evaluation of cell activity. In some embodiments, the computing apparatus 504 may be configured to generate a plurality of hypotheses characterizing one or more cells shown in an image, such that the plurality of hypotheses include an inferred characteristic of one or more of the cells based on geometric features of the one or more cells shown in the image. The computing apparatus may be further configured to select a hypothesis from the plurality of hypotheses associated with the image. The computing apparatus 504 may be further configured to determine a characteristic of the one or more of the cells based on the inferred characteristic associated with the hypothesis. The one or more cells may be included in a multi-cell embryo. The one or more cells may be included in a human embryo, one or more oocytes, or one or more pluripotent cells.

In some embodiments, the computing apparatus 504 may be configured to select the hypothesis based on compatibility of the inferred characteristic with the geometric features of the one or more cells shown in the image. The geometric features may include boundary information associated with each of the one or more cells. The boundary information may include one or more boundary segments. The computing apparatus may be configured to determine the one or more boundary segments associated with each of the one or more cells.

In some embodiments, the computing apparatus 504 may be configured to map a representation of each of the one or more cells to the one or more boundary segments. In some embodiments, the computing apparatus 504 may be further configured to map a first boundary segment to a null identifier associated with none of the cells, the boundary segments including the associated one or more of the boundary segments mapped to the each of the cells and the first boundary segment.

In some embodiments, the computing apparatus 504 may be configured to determine, based on the characteristic of the one or more of the cells, one or more of the following: a duration of first cytokinesis, a time interval between cytokinesis 1 and cytokinesis 2, a time interval between cytokinesis 2 and cytokinesis 3, a time interval between a first and second mitosis, a time interval between a second and third mitosis, a time interval from fertilization to an embryo having five cells, and a time interval from syngamy to the first cytokinesis.

In some embodiments, the computing apparatus 504 may be configured to generate a preliminary hypothesis characterizing the one or more cells shown in the image. The computing apparatus 504 may be further configured to refine the preliminary hypothesis to obtain one or more of the plurality of hypotheses based on the associated geometric features of the one or more cells shown in the image. The preliminary hypothesis may be refined based on a mapping of a representation of each of the one or more cells to one or more boundary segments associated with each of the one or more cells.

In some embodiments, the preliminary hypothesis may include a plurality of first shapes, each of the plurality of first shapes being defined by first shape parameter values, the each of the cells being characterized by an associated one of the plurality of first shapes. The computing apparatus being configured to refine the preliminary hypothesis includes being configured to fit each of a plurality of second shapes to the associated geometric features of the one or more cells shown in the image. Each of the plurality of first shapes and each of the plurality of second shapes may be ellipses. Alternatively, each of the plurality of first shapes and each of the plurality of second shapes may be b-splines.

In some embodiments, the computing apparatus 504 may be configured to determine boundary information associated with each of the one or more cells from a series of time-sequential images of the cells, the image being a first image included in the series of time-sequential images. The computing apparatus 504 may be further configured to generate the preliminary hypothesis by modifying a previously selected hypothesis, the previously selected hypothesis characterizing the cells as shown in a second image included in the series of time-sequential images, the second image prior to the first image. The series of time-sequential images may be a series of time-lapse images.

In some embodiments, the image may be a first image, and the computing apparatus 504 being configured to select the hypothesis from the plurality of hypotheses characterizing the cells as shown in the first image may include being configured to determine a most likely sequence of hypotheses across a series of images including the first image.

In some embodiments, the series of images may be a series of time-sequential images. The computing apparatus 504 being configured to determine the most likely sequence of hypotheses across the series of time-sequential images may include being configured to take into account a constraint that limits how the inferred characteristic of the one or more of the cells can vary across two or more of the series of time-sequential images. The constraint may be selected from the group consisting of: (1) the inferred number of the one or more cells is non-decreasing with time across the series of time-sequential images; (2) after a change in the inferred number of the one or more cells, the inferred number of the one or more cells is stable for a period of time across a first subset of the series of time-sequential images; and (3) the inferred number of the one or more cells decreases by no more than one with time across a second subset of the series of time-sequential images, then increases at the end of the second subset.

In some embodiments, the inferred characteristic of the one or more cells may include at least one of an inferred number of the one or more cells and an inferred geometry of the one or more cells. The characteristic of the one or more cells may include at least one of a number of the one or more cells and a geometry of the one or more cells. The inferred geometry of the one or more cells may include an inferred shape of the one or more cells and an inferred arrangement of the one or more cells. The geometry of the one or more cells may include a shape of the one or more cells and an arrangement of the one or more cells. The number of the one or more cells may be the same as the inferred number associated with the hypothesis. The geometry of the one or more cells may be the same as the inferred geometry of the one or more cells associated with the hypothesis.

In some embodiments, the computing apparatus 504 may be configured to select the hypothesis from the plurality of hypotheses based on differences between the inferred geometry of the one or more of the cells associated with each of the plurality of hypotheses and the associated geometric features of the one or more cells shown in the image. In some embodiments, the computing apparatus 504 may be configured to select the hypothesis from the plurality of hypotheses based on compatibility between the inferred geometry of the one or more of the cells associated with each of the plurality of hypotheses and the associated geometric features of the one or more cells shown in the image.

In some embodiments, the computing apparatus 504 may be configured to determine the one or more boundary segments associated with each of the one or more cells. In some embodiments, the computing apparatus being configured to determine the one or more boundary segments of each of the one or more cells may include being configured to perform segment generation, such as but not limited to ridge search segment generation. In some embodiments, the computing apparatus 504 being configured to determine the one or more boundary segments of each of the one or more cells may include being configured to merge a first boundary segment and a second boundary segment into a third boundary segment included in the one or more boundary segments of at least one of the one or more cells.

In some embodiments, the computing apparatus 504 may be configured to determine a confidence measure associated with a plurality of hypotheses based on an estimate of a likelihood of the one or more of the plurality of hypotheses. Each of the plurality of hypotheses characterizes one or more cells shown in an associated one or more of a plurality of images. In some embodiments, the computing apparatus 504 is further configured to select the plurality of hypotheses based on differences between an inferred geometry of each of the one or more cells associated with each of the plurality of hypotheses and boundaries of the each of the one or more cells determined from the one or more images of the one or more cells. In some embodiments, the computing apparatus 504 is further configured to select the plurality of hypotheses based on compatibility between an inferred geometry of each of the one or more cells associated with each of the plurality of hypotheses and boundaries of the each of the one or more cells determined from the one or more images of the one or more cells.

In some embodiments, the plurality of images are a series of time-lapse images, and the estimate of the likelihood of the one or more of the plurality of hypotheses takes into account a constraint that the number of cells shown in each of the series of time-lapse images is non-decreasing with time.

The computing apparatus 504 may be further configured to determine reliability of the plurality of hypotheses based on the confidence measure. In some embodiments, each of the plurality of hypotheses are based on one or more of an estimate of a number of the one or more cells, an estimate of a shape of each of the one or more cells, and an estimate of an arrangement of the one or more cells.

In some embodiments, the computing apparatus 504 may be further configured to detect boundaries associated with the one or more cells in each of the plurality of images. Each of the plurality of hypotheses may be based on an associated one or more of the boundaries. In some embodiments, each of the boundaries includes one or more boundary segments.

In some embodiments, the plurality of hypotheses are associated with a characterization of cell activity associated with development potential of the one or more cells. In some embodiments, the characterization of cell activity includes one or more of the following: a duration of first cytokinesis, a time interval between cytokinesis 1 and cytokinesis 2, a time interval between cytokinesis 2 and cytokinesis 3, a time interval between a first and second mitosis, a time interval between a second and third mitosis, a time interval from fertilization to an embryo having five cells, and a time interval from syngamy to the first cytokinesis.

In some embodiments, the display device 506 may be configured to display an indicator of development competence of the one or more of the cells for implantation into a female human subject based on the characteristic of the one or more of the cells.

In some embodiments, the display device 506 may be further configured to present an indicator of the reliability of the plurality of hypotheses, and the input interface 508 may be further configured to receive, in response to the presenting via the display device 506, an input indicating the development competence of the one or more cells. In some embodiments, the display device 506 is configured to display the characterization of cell activity only if the at least one of the plurality of hypotheses is determined to be reliable. In some embodiments, the display device is configured to display the characterization of cell activity and an indicator of the reliability of the at least one of the plurality of hypotheses associated with the characterization of cell activity.

In some embodiments, the computing apparatus 504 may be further configured to perform classification to augment determination of the characteristic of the one or more cells. Alternatively or in addition, the computing apparatus 504 may be further configured to perform image similarity determination to augment determination the characteristic of the one or more cells.

In some embodiments, the computing apparatus 504 may be further configured to apply a selection criterion to the one or more cells based on the confidence measure as part of determining the reliability of the at least one of the plurality of hypotheses. In some embodiments, the selection criterion is associated with development competence of the one or more cells for implantation into a female human subject. In some embodiments, the selection criterion is based on one or more threshold values of the confidence measure. In some embodiments, the display device 506 is configured to display a result of applying the selection criterion.

In some embodiments, the computing apparatus 504 may be further configured to reject the one or more cells for implantation into a female human subject if the at least one of the plurality of hypotheses is determined to be unreliable based on the selection criterion. In some embodiments, the display device 506 may be further configured to display an indicator of development competence of the one or more cells for implantation into a female human subject based on the reliability of the at least one of the plurality of hypotheses determined based on the selection criterion.

Figure 6:
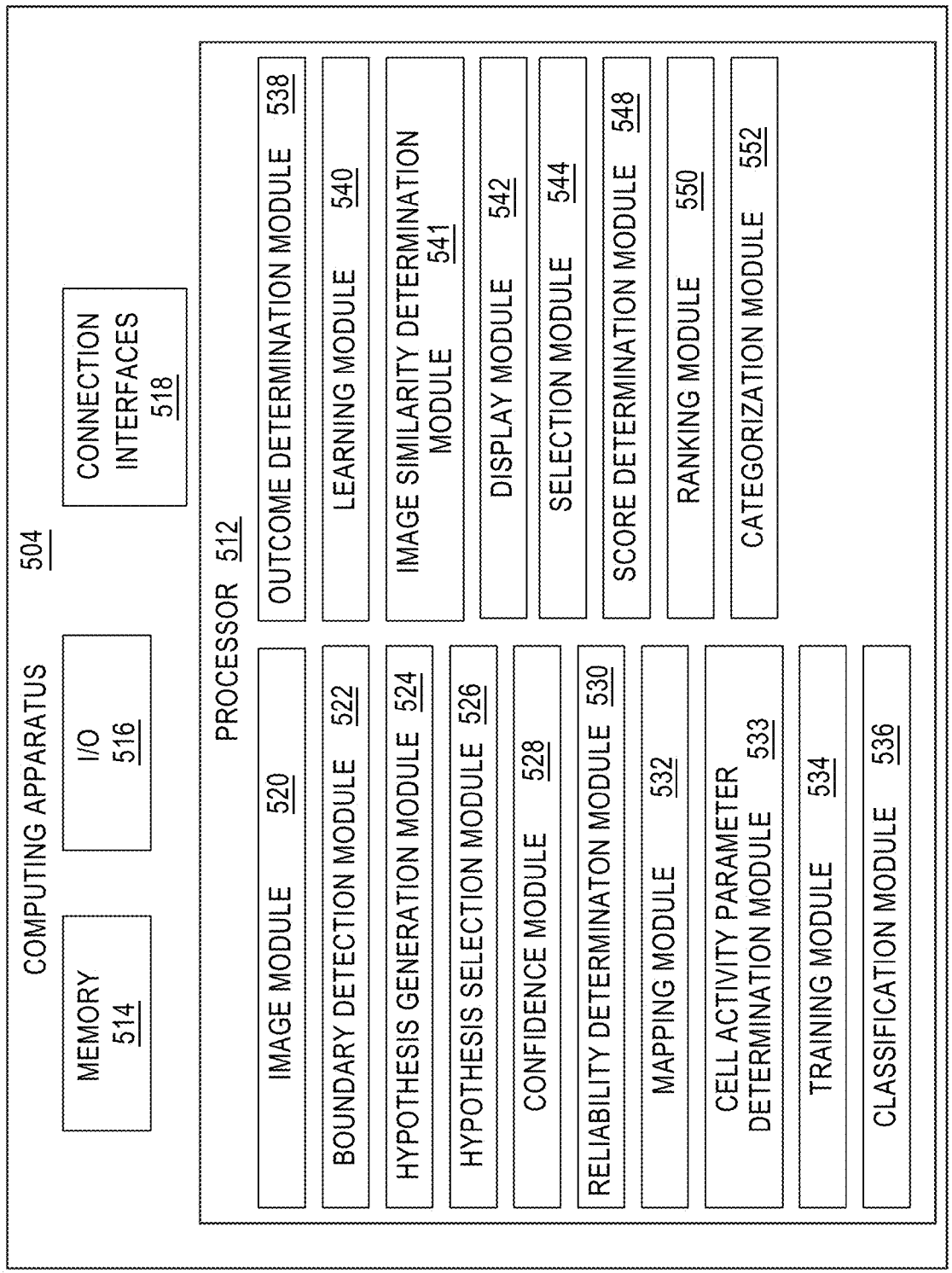
FIG. 6 illustrates a computing apparatus, in accordance with embodiments of the invention.

FIG. 6 illustrates the computing apparatus 504 in accordance with embodiments of the invention. The computing apparatus 504 includes at least a processor 512, a memory 514, an input/output module (I/O) 516, and connection interfaces 518 connected by a bus (not shown). In some embodiments, the memory 514 stores a set of executable programs (not shown) that are used to implement the computing apparatus 504. Additionally or alternatively, the processor 512 can be used to implement the computing apparatus 504, as illustrated in FIG. 6. The processor 512 may include various combinations of the modules shown in FIG. 6, such as an image module 520, a boundary detection module 522, a hypothesis generation module 524, a hypothesis selection module 526, a confidence module 528, a reliability determination module 530, a mapping module 532, a cell activity parameter determination module 533, and a display module 542. In some embodiments, the image module 520 can be configured to acquire a plurality of images via one or more of a dark-field illumination microscope, a bright-field illumination microscope, or other suitable imaging modalities.

In some embodiments, the hypothesis selection module 526 may be configured to select a hypothesis from a plurality of hypotheses characterizing one or more cells shown in an image. Each of the plurality of hypotheses may include an inferred characteristic of one or more of the cells based on geometric features of the one or more cells shown in the image. The hypothesis selection module 526 may be further configured to determine a characteristic of the one or more of the cells based on the inferred characteristic associated with the hypothesis. The hypothesis selection module 526 may be implemented in at least one of a memory or a processing device. The one or more cells may be included in a multi-cell embryo. The one or more cells may be included in a human embryo, one or more oocytes, or one or more pluripotent cells.

In some embodiments, the hypothesis selection module 526 may be configured to select the hypothesis based on compatibility of the inferred characteristic with the geometric features of the one or more cells shown in the image. The geometric features may include boundary information associated with each of the one or more cells. The boundary information may include one or more boundary segments. The computing apparatus may be configured to determine the one or more boundary segments associated with each of the one or more cells.

In some embodiments, the inferred characteristic of the one or more cells may include at least one of an inferred number of the one or more cells and an inferred geometry of the one or more cells. The characteristic of the one or more cells may include at least one of a number of the one or more cells and a geometry of the one or more cells. The number of the one or more cells may be the same as the inferred number associated with the hypothesis. The geometry of the one or more cells may be the same as the inferred geometry of the one or more cells associated with the hypothesis.

In some embodiments, the hypothesis selection module 526 may be configured to select the hypothesis from the plurality of hypotheses based on differences between the inferred geometry of the one or more of the cells associated with each of the plurality of hypotheses and the associated geometric features of the one or more cells shown in the image. The hypothesis selection module 526 may be configured to select the hypothesis from the plurality of hypotheses based on compatibility between the inferred geometry of the one or more of the cells associated with each of the plurality of hypotheses and the associated geometric features of the one or more cells shown in the image.

In some embodiments, the image is a first image. The hypothesis selection module 526 may be configured to select the hypothesis from the plurality of hypotheses characterizing the cells as shown in the first image based on a determination of a most likely sequence of hypotheses across a series of images including the first image.

In some embodiments, the series of images is a series of time-sequential images. The hypothesis selection module 526 may be configured to determine the most likely sequence of hypotheses across the series of time-sequential images taking into account a constraint limiting how the inferred characteristic of the one or more cells can vary across two or more of the series of time-sequential images. The constraint may be selected from the group consisting of: (1) the inferred number of the one or more cells is non-decreasing with time across the series of time-sequential images; (2) after a change in the inferred number of the one or more cells, the inferred number of the one or more cells is stable for a period of time across a first subset of the series of time-sequential images; and (3) the inferred number of the one or more cells decreases by no more than one with time across a second subset of the series of time-sequential images, then increases at the end of the second subset.

In some embodiments, the hypothesis generation module 524 may be configured to generate the plurality of hypotheses based on the associated geometric features of the one or more cells shown in the image. The hypothesis generation module 524 may be configured to generate a preliminary hypothesis characterizing the cells as shown in the image, and may be configured to refine the preliminary hypothesis to obtain one or more of the plurality of hypotheses, based on the geometric features of the one or more cells shown in the image. The hypothesis generation module 524 may be configured to refine the preliminary hypothesis based on a mapping of a representation of the one or more cells to one or more boundary segments as characterized by the preliminary hypothesis.

In some embodiments, the preliminary hypothesis includes a plurality of first shapes, each of the plurality of first shapes being defined by first shape parameter values, each of the one or more of the cells being characterized by an associated one of the plurality of first shapes. The hypothesis generation module 524 may be configured to refine the preliminary hypothesis based on a fit of each of a plurality of second shapes to the associated geometric features of the one or more cells shown in the image. Each of the plurality of first shapes and each of the plurality of second shapes may be ellipses. Alternatively, each of the plurality of first shapes and each of the plurality of second shapes may be b-splines.

In some embodiments, the boundary detection module 522 may be configured to determine boundary information associated with each of the one or more cells based on the image. The boundary detection module 522 may be further configured to determine the boundary information from a series of time-sequential images of the cells. The image may be a first image included in the series of time-sequential images. The hypothesis generation module 524 may be further configured to determine the preliminary hypothesis by modifying a previously selected hypothesis, the previously selected hypothesis characterizing the cells as shown in a second image included in the series of time-sequential images, the second image prior to the first image.

In some embodiments, the boundary detection module 522 may be configured to determine the one or more boundary segments associated with each of the one or more of the cells based on the image. The boundary detection module 522 may be further configured to perform segment generation, such as but not limited to ridge search segment generation to determine the one or more boundary segments.

In some embodiments, the boundary detection module 522 may be configured to determine the one or more boundary segments associated with each of the one or more of the cells based on the image. The boundary detection module 522 may be further configured to perform segment merging to determine at least one of the one or more boundary segments. For example, the boundary detection module 522 may be configured to merge a first boundary segment and a second boundary segment into a third boundary segment included in the one or more boundary segments.

In some embodiments, the cell activity parameter determination module 533 may be configured to determine, based on the characteristic of the one or more cells, one or more of the following: a duration of first cytokinesis, a time interval between cytokinesis 1 and cytokinesis 2, a time interval between cytokinesis 2 and cytokinesis 3, a time interval between a first and second mitosis, a time interval between a second and third mitosis, a time interval from fertilization to an embryo having five cells, and a time interval from syngamy to the first cytokinesis.

In some embodiments, the mapping module 532 may be configured to map a representation of each of the one or more of the cells to the associated one or more boundary segments as characterized by each of the plurality of hypotheses. In some embodiments, the boundary segments may include the one or more boundary segments and a first boundary segment. The mapping module may be configured to map the first boundary segment to a null identifier associated with none of the cells.

In some embodiments, the confidence module 528 may be configured to determine a confidence measure associated with a plurality of hypotheses based on an estimate of a likelihood of one or more of the plurality of hypotheses. Each of the plurality of hypotheses characterizing one or more cells shown in an associated one or more of the plurality of images.

In some embodiments, the reliability determination module 530 may be configured to determine reliability of at least one of the plurality of hypotheses based on the confidence measure. In some embodiments, the reliability determination module 530 may be further configured to apply a selection criterion to the one or more cells based on the confidence measure. In some embodiments, the selection criterion is associated with development competence of the one or more cells for implantation into a female human subject.

In some embodiments, the plurality of hypotheses is a first plurality of hypotheses, and the hypothesis generation module 524 may be configured to determine a second plurality of hypotheses including the first plurality of hypotheses. Each of the second plurality of hypotheses is based on one or more of an estimate of a number of the one or more cells, an estimate of a shape of each of the one or more cells, and an estimate of an arrangement of the one or more cells.

In some embodiments, the hypothesis selection module 526 may be configured to select the plurality of hypotheses based on differences between an inferred geometry of each of the one or more cells associated with each of the plurality of hypotheses and boundaries of the each of the one or more cells determined from the one or more images of the one or more cells. In some embodiments, each of the boundaries includes one or more boundary segments. In some embodiments, the hypothesis selection module 526 may be configured to select the plurality of hypotheses based on compatibility between an inferred geometry of each of the one or more cells associated with each of the plurality of hypotheses and boundaries of the each of the one or more cells determined from the one or more images of the one or more cells. In some embodiments, each of the boundaries includes one or more boundary segments.

In some embodiments, the boundary detection module 522 may be configured to detect boundaries associated with the one or more cells in each of the plurality of images. Each of the plurality of hypotheses is based on an associated one or more of the boundaries. In some embodiments, each of the boundaries includes one or more boundary segments.

In some embodiments, the display module 542 may be configured to display the characterization of cell activity only if the at least one of the plurality of hypotheses is determined to be reliable. In some embodiments, the display module 542 may be further configured to display the characterization of cell activity and an indicator of the reliability of the at least one of the plurality of hypotheses associated with the characterization of cell activity. In some embodiments, the display module 542 may be further configured to display a result of applying the selection criterion. In some embodiments, the display module 542 may be further configured to display an indicator of development competence of the one or more cells for implantation into a female human subject based on the characteristic of the one or more cells, and/or based on the reliability of the at least one of the plurality of hypotheses determined based on the selection criterion.

In some embodiments, the processor 512 may further include a learning module 540, a training module 534, and a classification module 536, which are further described in Example 1 below. The classification module 536 may be configured to augment determination of the characteristic of the one or more cells by the hypothesis selection module 526.

In some embodiments, the processor 512 may further include an outcome determination module 538, which is further described in Example 1 below.

In some embodiments, the processor 512 may further include an image similarity determination module 541. The image similarity determination module 541 may be configured to augment determination of the characteristic of the one or more cells by the hypothesis selection module 526.

In some embodiments, the processor can further include a selection module 544, a score determination module 548, a ranking module 550, and a categorization module 552 for automated embryo ranking and/or categorization, as disclosed in copending U.S. patent application Ser. No. 14/194, 386, "APPARATUS, METHOD, AND SYSTEM FOR IMAGE-BASED HUMAN EMBRYO CELL CLASSIFICATION", filed on Feb. 28, 2014, the entire disclosure of which is incorporated herein by reference.

In some embodiments, the processor can further include a selection module 544, a score determination module 548, a ranking module 550, and a categorization module 552 for automated embryo ranking and/or categorization, as disclosed in copending U.S. patent application Ser. No. 14/194, 386, "APPARATUS, METHOD, AND SYSTEM FOR IMAGE-BASED HUMAN EMBRYO CELL CLASSIFICATION", filed on Feb. 28, 2014, the entire disclosure of which is incorporated herein by reference.

Figure 7:
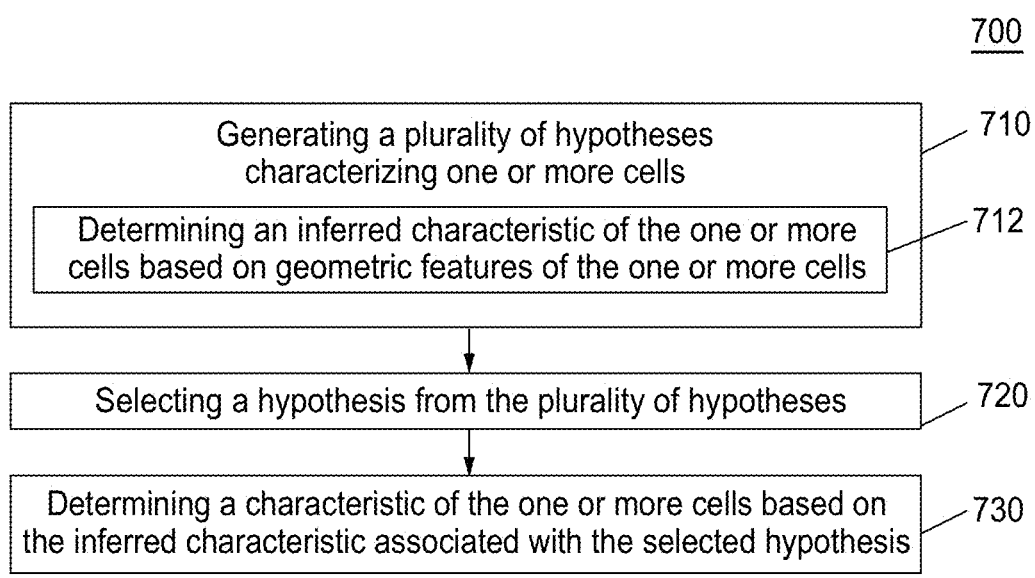
FIG. 7 illustrates a method for automated evaluation of cell activity, in accordance with an embodiment of the invention.

FIG. 7 illustrates a method for automated evaluation of cell activity, in accordance with an embodiment of the invention. A plurality of hypotheses are generated characterizing the one or more cells (block 710). An inferred characteristic of the one or more cells may be determined based on geometric features of the one or more cells (block 712). Next, a hypothesis from the plurality of hypotheses is selected (block 720). Next, a characteristic of the one or more of the cells based on the inferred characteristic associated with the first hypothesis may be determined (block 730).

In some embodiments, a method for automated, non-invasive evaluation of cell activity, comprises generating a plurality of hypotheses characterizing one or more cells shown in an image, the generating the plurality of hypotheses including determining an inferred characteristic of the one or more cells based on geometric features of the one or more cells shown in the image. The method for automated, non-invasive evaluation of cell activity further includes selecting a hypothesis from the plurality of hypotheses associated with the image. The method may include determining a characteristic of the one or more of the cells based on the inferred characteristic associated with the hypothesis.

In some embodiments, the one or more cells are included in a multi-cell embryo.

In some embodiments of the method for automated, non-invasive evaluation of cell activity, the selecting the hypothesis is based on compatibility of the inferred characteristic with the geometric features of the one or more cells shown in the image. The geometric features may include boundary information associated with each of the one or more cells. The boundary information may include one or more boundary segments.

In some embodiments, the method for automated, non-invasive evaluation of cell activity further includes mapping of a representation of each of the one or more cells to the one or more boundary segments. In some embodiments, the method for automated, non-invasive evaluation of cell activity further includes mapping a first boundary segment to a null identifier associated with none of the cells, the boundary segments including the associated one or more of the boundary segments mapped to the each of the one or more cells and the first boundary segment.

In some embodiments, the method for automated, non-invasive evaluation of cell activity further includes performing classification to augment determination of the characteristic of the one or more cells.

In some embodiments, the method for automated, non-invasive evaluation of cell activity further includes performing image similarity determination to augment determination of the characteristic of the one or more cells.

In some embodiments, the method for automated, non-invasive evaluation of cell activity further includes determining, based on the characteristic of the one or more cells, one or more of the following: a duration of first cytokinesis, a time interval between cytokinesis 1 and cytokinesis 2, a time interval between cytokinesis 2 and cytokinesis 3, a time interval between a first and second mitosis, a time interval between a second and third mitosis, a time interval from fertilization to an embryo having five cells, and a time interval from syngamy to the first cytokinesis.

In some embodiments, the inferred characteristic of the one or more cells includes at least one of an inferred number of the one or more cells and an inferred geometry of the one or more cells, and the characteristic of the one or more cells includes at least one of a number of the one or more cells and a geometry of the one or more cells. In some embodiments, the inferred geometry of the one or more cells includes an inferred shape of the one or more cells and an inferred arrangement of the one or more cells. In some embodiments, the geometry of the one or more cells includes a shape of the one or more cells and an arrangement of the one or more cells. In some embodiments, the number of the one or more cells is the same as the inferred number associated with the hypothesis. In some embodiments, the geometry of the one or more cells is the same as the inferred geometry of the one or more cells associated with the hypothesis. In some embodiments, the selecting the hypothesis from the plurality of hypotheses is based on differences between the inferred geometry of the one or more cells associated with each of the plurality of hypotheses and the geometric features of the one or more cells shown in the image. In some embodiments, the selecting the hypothesis from the plurality of hypotheses is based on compatibility between the inferred geometry of the one or more cells associated with each of the plurality of hypotheses and the geometric features of the one or more cells shown in the image.

In some embodiments, the method for automated, non-invasive evaluation of cell activity further includes displaying an indicator of development competence of the one or more cells for implantation into a female human subject based on the characteristic of the one or more cells.

In some embodiments, the method for automated, non-invasive evaluation of cell activity further includes determining the one or more boundary segments associated with each of the one or more cells. In some embodiments, determining the one or more boundary segments of each of the one or more cells includes performing segment generation, such as but not limited to ridge search segment generation. In some embodiments, determining the one or more boundary segments of each of the one or more cells includes merging a first boundary segment and a second boundary segment into a third boundary segment included in the one or more boundary segments of at least one of the one or more cells.

In some embodiments, the method for automated, non-invasive evaluation of cell activity further includes generating a preliminary hypothesis characterizing the one or more cells, and refining the preliminary hypothesis to obtain one or more of the plurality of hypotheses based on the associated geometric features of the one or more cells shown in the image. In some embodiments, the preliminary hypothesis includes a plurality of first shapes, each of the plurality of first shapes being defined by first shape parameter values, the each of the cells being characterized by an associated one of the plurality of first shapes. In some embodiments, the refining the preliminary hypothesis includes fitting each of a plurality of second shapes to the associated geometric features of the one or more cells shown in the image. In some embodiments, each of the plurality of first shapes and each of the plurality of second shapes are ellipses. In some embodiments, each of the plurality of first shapes and each of the plurality of second shapes are b-splines. In some embodiments, the method for automated, non-invasive evaluation of cell activity further includes determining boundary information associated with each of the one or more cells from a series of time-sequential images of the cells, the image being a first image included in the series of time-sequential images, and generating the preliminary hypothesis by modifying a previously generated hypothesis, the previously generated hypothesis characterizing the cells as shown in a second image included in the series of time-sequential images, the second image prior to the first image. In some embodiments, the series of time-sequential images is a series of time-lapse images.

In some embodiments, the image is a first image, and the selecting the hypothesis from the plurality of hypotheses characterizing the one or more cells as shown in the first image includes determining a most likely sequence of hypotheses across a series of images including the first image. In some embodiments, the series of images is a series of time-sequential images, and the determining the most likely sequence of hypotheses across the series of time-sequential images takes into account a constraint that limits how the inferred characteristic of the one or more cells can vary across two or more of the series of time-sequential images. In some embodiments, the constraint is selected from the group consisting of: an inferred number of the one or more cells is non-decreasing with time across the series of time-sequential images; after a change in the inferred number of the one or more cells, the inferred number of the one or more cells is stable for a period of time across a first subset of the series of time-sequential images; and the inferred number of the one or more cells decreases by no more than one with time across a second subset of the series of time-sequential images, then increases at the end of the second subset.

In some embodiments, the cells are included in a human embryo, one or more oocytes, or one or more pluripotent cells.

Figure 8:
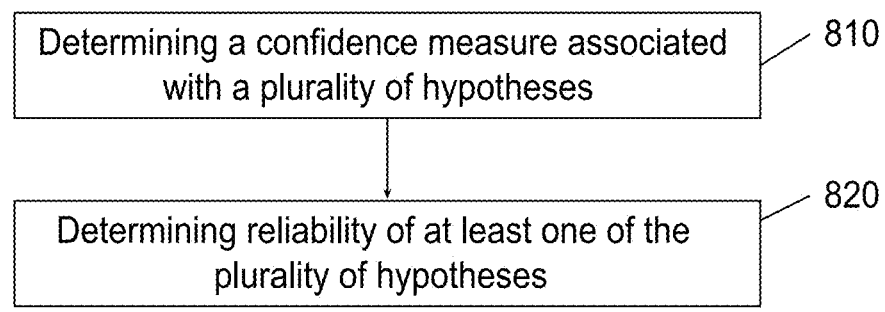
FIG. 8 illustrates a method for automated evaluation of cell activity including reliability determination, in accordance with an embodiment of the invention.

FIG. 8 illustrates a method of the invention for automated evaluation of cell activity including reliability determination, in accordance with an embodiment of the invention. A confidence measure is determined, the confidence measure associated with a plurality of hypotheses based on an estimate of a likelihood of one or more of the plurality of hypotheses (block 810). Each of the plurality of hypotheses characterizes one or more cells shown in an associated one or more of a plurality of images. Reliability of at least one of the plurality of hypotheses is determined based on the confidence measure (block 820).

In some embodiments, a method for automated evaluation of cell activity comprises determining a confidence measure associated with a plurality of hypotheses based on an estimate of a likelihood of one or more of the plurality of hypotheses, each of the plurality of hypotheses characterizing one or more cells shown in an associated one or more of a plurality of images. The method for automated evaluation of cell activity further includes determining reliability of at least one of the plurality of hypotheses based on the confidence measure.

In some embodiments, the one or more cells are included in a human embryo, one or more oocytes, or one or more pluripotent cells.

In some embodiments, the method for automated evaluation of cell activity further includes electing the plurality of hypotheses based on differences between an inferred geometry of each of the one or more cells associated with each of the plurality of hypotheses and boundaries of the each of the one or more cells determined from the one or more images of the one or more cells. In some embodiments, each of the boundaries includes one or more boundary segments.

In some embodiments, the plurality of images are acquired by dark-field illumination microscopy.

In some embodiments, each of the plurality of hypotheses are based on one or more of an estimate of a number of the one or more cells, an estimate of a shape of each of the one or more cells, and an estimate of an arrangement of the one or more cells.

In some embodiments, the method for automated evaluation of cell activity further includes detecting boundaries associated with the one or more cells in each of the plurality of images, wherein each of the plurality of hypotheses is based on an associated one or more of the boundaries. In some embodiments, each of the boundaries includes one or more boundary segments.

In some embodiments, the plurality of hypotheses are associated with a characterization of cell activity associated with development potential of the one or more cells. In some embodiments, the characterization of cell activity includes one or more of the following: a duration of first cytokinesis, a time interval between cytokinesis 1 and cytokinesis 2, a time interval between cytokinesis 2 and cytokinesis 3, a time interval between a first and second mitosis, a time interval between a second and third mitosis, a time interval from fertilization to an embryo having five cells, and a time interval from syngamy to the first cytokinesis. In some embodiments, the method for automated evaluation of cell activity further includes displaying the characterization of cell activity only if the at least one of the plurality of hypotheses is determined to be reliable. In some embodiments, the method for automated evaluation of cell activity further includes displaying the characterization of cell activity and an indicator of the reliability of the at least one of the plurality of hypotheses associated with the characterization of cell activity.

In some embodiments, the plurality of images are a series of time-lapse images, and the estimate of the likelihood of the one or more of the plurality of hypotheses takes into account a constraint that the number of cells shown in each of the series of time-lapse images is non-decreasing with time.

In some embodiments, determining the reliability of the at least one of the plurality of hypotheses includes applying a selection criterion to the one or more cells based on the confidence measure. In some embodiments, the selection criterion is associated with development competence of the one or more cells for implantation into a female human subject. In some embodiments, the selection criterion is based on one or more threshold values of the confidence measure. In some embodiments, the method for automated evaluation of cell activity further includes displaying a result of applying the selection criterion. In some embodiments, the method for automated evaluation of cell activity further includes rejecting the one or more cells for implantation into a female human subject if the at least one of the plurality of hypotheses is determined to be unreliable based on the selection criterion. In some embodiments, the method for automated evaluation of cell activity further includes displaying an indicator of development competence of the one or more cells for implantation into a female human subject based on the reliability of the at least one of the plurality of hypotheses determined based on the selection criterion.

EXAMPLES

Example 1

As noted earlier, some aspects of the invention are also operable for automated, non-invasive cell activity tracking in conjunction with tracking-free approaches such as classification and/or interframe similarity determination to enhance determination of cell/embryo characteristics related to embryo health and/or fate/outcome. Accordingly, some aspects of the invention are operable for image-based cell classification and/or image based cell development outcome determination using one or more classifiers. In some embodiments, at least one classifier is usable for both cell classification and for outcome determination. In other embodiments, one or more classifiers usable for cell classification are different from one or more classifiers usable for outcome determination.

In some embodiments, cell classification can include determining a number of cells in the image. In some embodiments, cell classification can include determining a classification probability that the image contains a predicted number of cells; in some embodiments, the cell classification can include a binary classification of the image as containing the predicted number of cells or not.

In some embodiments, one or more classifiers can each be applied to each of a plurality of images of one or more cells. The plurality of images can be a time-sequential series of images, such as a time-lapse series of images. The cells shown in the plurality of images can be any cell of interest. In some embodiments, a number of the cells in each image is of interest, and can be determined by aspects of the invention. For example, the cells can be a human embryo, and the number of cells can be representative of the embryo at one or more of the one cell stage, the two cell stage, the three cell stage, the four cell stage, and so on. In some embodiments, the four cell stage represents four or more cells. Other examples of such cells of interest include, but are not limited to, oocytes and pluripotent cells.

Any suitable classifier may be employed. In some embodiments, the classifier is based on a machine learning algorithm. The classifier may be an AdaBoost (adaptive boosting) classifier, or another classifier such as a Support Vector Machine (SVM). In some embodiments, the classifier is based on cell feature and/or pattern recognition. A cell feature is a feature obtained based on one or more images of one or more cells (such as an embryo, oocyte, or pluripotent cell), such as, but not limited to, recognition of cell shape, texture, edges, and/or the like. A cell feature is not limited to features associated with only a single cell, and can refer to features associated with multiple cells and/or features associated with one or more cells and another portion of an image showing the one or more cells, such as the image background. In some embodiments, the classifier is trained via one or more supervised learning approaches, such as by using labeled images. In some embodiments, cell features on which the classifier is based are determined through one or more unsupervised learning approaches. These unsupervised learning approaches may use unlabeled images.

In some embodiments, a plurality of classifiers can be employed, each associated with a distinct number of cells. Further, in some embodiments, multiple levels of image classifiers can be employed, where within each level, each classifier is associated with a distinct number of cells. For the sake of clarity, an individual classifier associated with n number of cells will be identified as a cell classifier, and a grouping of classifiers (each applied to an image) will be referred to as an image classifier. In some embodiments, a refining algorithm can be applied to the output of the last image classifier to further refine the classification of the image. In some embodiments, the refining algorithm refines the classification of each image based on a temporal image similarity measure of the image. In some embodiments, the refining algorithm is a dynamic programming algorithm for finding the most likely classification of the images included in the time-lapse series of images. In some embodiments, the refining algorithm is a Viterbi algorithm.

In some embodiments, outcome determination can include determining a predicted outcome of several possible outcomes for a plurality of test images of cell development with an unknown outcome. In some embodiments, outcome determination can include binary classification of the test images, i.e. determining an outcome of two possible outcomes for the test images.

In some embodiments, one or more classifiers can each be applied to a plurality of test images of one or more cells to perform outcome determination. The test images can be a time-sequential series of images, such as a time-lapse series of images. The series of images can be included in a video of the one or more cells, such as a time-lapse video. The cells shown in the test images can be any cell of interest. For example, the cells can be a human embryo, and the possible outcome of the test images can be either blast (i.e. a blastocyst is formed that is suitable for implantation) or arrested (i.e. no blastocyst formation occurs because the embryo development is arrested). Other examples of such cells of interest include, but are not limited to, oocytes and pluripotent cells.

In some embodiments, the classifier is trained to perform outcome determination based on cell feature and/or pattern recognition, such as, but not limited to, recognition of cell shape, texture, edges, and/or the like.

In some embodiments, cell features on which the classifier is based are determined through one or more unsupervised learning approaches. These unsupervised learning approaches can use unlabeled images. Accordingly, in some embodiments, the cell features can include one or more machine learned cell features. Generally, the machine learned cell features can be any cell feature that is learned from learning images, for the purpose of subsequent use in outcome determination, cell classification, and/or the like. In some embodiments, the machine learned cell features can be based on unsupervised learning by the classifier from a plurality of unlabeled learning images, the cell features being termed as a 'bag of features' in some embodiments. It is understood that the unlabeled learning images may or may not form a time-lapse series. In some embodiments, the bag of features can be applied towards cell classification by the classifier, as briefly described above and described in more detail later.

In some embodiments the classifier, after unsupervised learning, is trained on at least one series of training images that is labeled and/or otherwise associated with a specified outcome, i.e. the classifier undergoes supervised training. In some embodiments, the classifier is trained on multiple series of training images, with at least one series of training images for each specified outcome provided. In some embodiments, the classifier is trained based on cell feature and/or pattern information extracted from each series of training images associated with the respective specified outcome. In this manner, the classifier can be trained to recognize cell feature information associated with each specified outcome, and can subsequently be applied to classify the test images based on the specified outcome to which the cell feature information extracted from the test images best corresponds.

In some embodiments, the classifier can determine, for one or more cells shown by the test images, a classification probability associated with each specified outcome that indicates an estimated likelihood that the specified outcome is shown by the test images. The classification probability can indicate an estimated likelihood of the specified outcome for development of the one or more cells shown by the test images. The classifier can then classify the test images based on the classification probability such as by, for example, determining that the test images show the specified outcome associated with the highest classification probability.

FIG. 9 illustrates a non-limiting example of a 2-level image-based cell classification approach that employs four AdaBoost cell classifiers at each level, the four cell classifiers (i.e. the 1-cell classifier 902-1, the 2-cell classifier 902-2, the 3-cell classifier 902-3, and the 4-cell (or 4 or more cell) classifier 902-4) classifying an input image for showing one cell, two cells, three cells, and four cells, respectively, in accordance with an embodiment of the invention. As illustrated in FIG. 9, and as will be described in more detail later, the output of the level-1 image classifier 902 can be accounted for by the level-2 image classifier 904 as additional features. In some embodiments, a refining algorithm such as a Viterbi algorithm, for example, is applied to the output of the level-2 image classifier 904.

In some embodiments, each cell classifier of the image classifier can determine, for each image, a first classification probability associated with each cell classifier. The first classification probability for the each image can be based on a plurality of cell features. In some embodiments, the cell features can include one or more machine learned cell features. Generally, the machine learned cell features can be any cell feature that is learned from learning images, for the purpose of subsequent use in cell classification. In some embodiments, the machine learned cell features can be based on unsupervised learning by the classifier on a plurality of unlabeled learning images having an unknown number of cells (also referred to as a 'bag of features'). In some embodiments, the classifier learns the bag of features in this manner from the plurality of unlabeled images, as described above for outcome determination, and as described in more detail later.

In one embodiment, the bag of features is based on keypoint descriptors, such as Scale-Invariant Feature Transform (SIFT), Speeded Up Robust Features (SURF), Fast Regina Keypoint (FREAK), and Binary Robust Invariant Scalable Keypoints (BRISK), or other suitable descriptors known to one of skill in the art.

In some embodiments, the cell features can also include one or more hand-crafted cell features, which are human-designed rather than machine learned. Hand-crafted cell features may include region properties, GLCM, LBP, Hessian features, Gabor features, and/or cell boundary features (see Table 2).

Table 2 below illustrates an exemplary listing of six types of hand-crafted features and the bag of features (determined through unsupervised learning) that can be employed for per-image classification. The GLCM, LBP, and Gabor features are known texture features that can be used for classification. Hessian features are statistics computed from the first eigenvalues of Hessian-filtered images that enhance cell edges. The region properties (area, number of convex hull points, solidity, eccentricity, and perimeter) can be computed from a rough embryo mask obtained by applying a shortest path algorithm to extract the embryo boundary in polar image space. In other embodiments, the features shown in Table 2 can be replaced with alternative feature sets and/or different numbers of features per feature set. For example, the hand-crafted features in Table 2 can be replaced with other machine learned features (such as features learned based on unsupervised learning) similar to the bag of features. In another example, a different number of features (such as 262 instead of the 369 shown in Table 2) can be used. In one embodiment, the 262 features do not include the Boundary Features shown in Table 2, and include 200 features instead of 300 features in the Bag of Features.

TABLE 2

Cell features designed or learned automatically for per-image cell classification

| Feature Set | Number of Features | Type |
|---|---|---|
| Regionprops (area, solidity, eccentricity, etc.) | 5 | Shape |
| GLCM (Gray-Level Co-occurence Matrices) | 22 | Texture |
| LBP (Local Binary Pattern Features) | 10 | Texture |
| Hessian Features | 15 | Edge & Texture |
| Gabor Features | 10 | Texture |
| Boundary Features (average angular score, continuity, etc.) | 7 | Edge |
| Bag of Features (features learned from embryo images) | 300 | Texture & Learned |

Figure 9A:
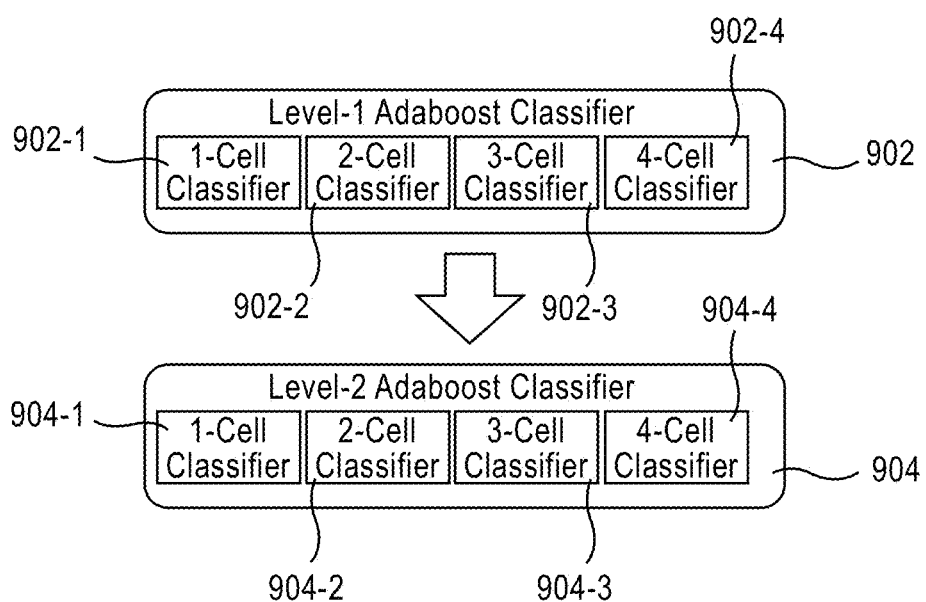
FIG. 9A illustrates an exemplary image-based cell classification approach, in accordance with an embodiment of the invention.
Figures 9B, 9C:
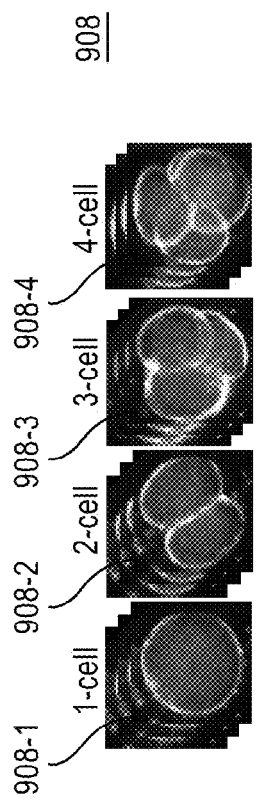
FIG. 9B illustrates exemplary training images, in accordance with an embodiment of the invention.
FIG. 9C illustrates feature vectors for each of a plurality of images, in accordance with an embodiment of the invention.

FIG. 9B illustrates a non-limiting example of training images 908 labeled as showing 1 cell (reference character 908-1), 2 cells (reference character 908-2), 3 cells (reference character 908-3), and 4 cells (reference character 908-4), respectively, that can be used for training of the (for example) level-1 classifiers 902 of FIG. 9A, in accordance with an embodiment of the invention. In one embodiment, the training images 908-4 may show 4 or more cells. The training of the classifier may be supervised learning based on a plurality of labeled images (such as the training images 908), each having a known number of cells.

FIG. 9C illustrates an exemplary output 910 of a classifier employing the listed features of Table 2 on a plurality of images, in accordance with an embodiment of the invention. In FIG. 9C, each row 910-1 to 910-$n$ is associated with a single image (also termed a 'feature vector' for the image). In this embodiment, each feature vector 910-1 to 910-$n$ has 370 columns (not all shown in FIG. 9C), one for an image identifier 910$a$ and one for each of the 369 features shown in Table 2. Representative column entries 910$a$-910$h$, shown in FIG. 9C, include an image identifier 910$a$ and one representative entry (910$b$-910$h$) showing a representative value for a feature included in each of the seven feature sets listed in Table 2. These include representative entries 910$b$-910$g$ associated with the six hand crafted feature sets (Regionprops, GLCM, LBP, Hessian Features, Gabor Features, and Boundary Features), and representative entry 910$h$ associated with the Bag of Features. In this manner, each feature vector 910-1 to 910-$n$ is representative of feature information in its associated image.

Figure 10:
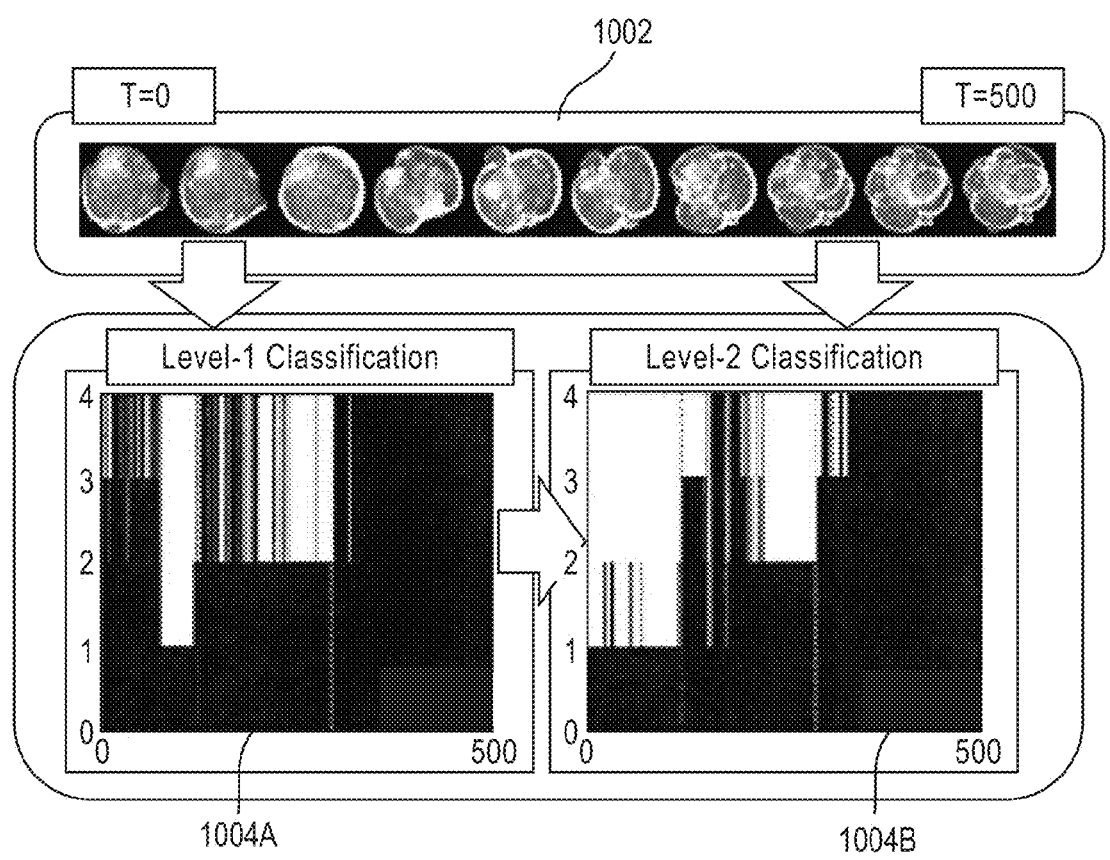
FIG. 10 illustrates exemplary image-based cell classification results by the image-based cell classification approach of FIG. 9A, in accordance with an embodiment of the invention.

Once the cell classifier(s) have been trained, they can be applied to unlabeled images for per-image cell classification, as broadly illustrated in the non-limiting example of FIG. 10, and as described in more detail hereon. In FIG. 10, a time lapse series of images 1002 of a developing embryo is classified on a per-image basis by the level-1 and level-2 classifiers 1002, 1004 of FIG. 9A, in accordance with an embodiment of the invention. The graph 1004A, plotted as predicted number of cells vs. image identifier associated with each of the plurality of images (e.g. such as a frame number or a time indicator), illustrates the output of the level-1 classifiers 902 for each image of the images 1002, where the image identifier is provided on the X-axis, and the classification result associated with the image identifier is provided on the Y-axis. The graph 1004B illustrates the output of the level-2 classifiers 904 for each image with the images 1002 as well as the result of level-1 classification as input. In general, unless noted otherwise, a plot of classification results or the result of applying a refining algorithm as disclosed herein is a plot of predicted number of cells vs. image identifier, where the image identifier is based on the series of images, and can be representative of the time each image was taken with respect to each other image.

Figure 11A:
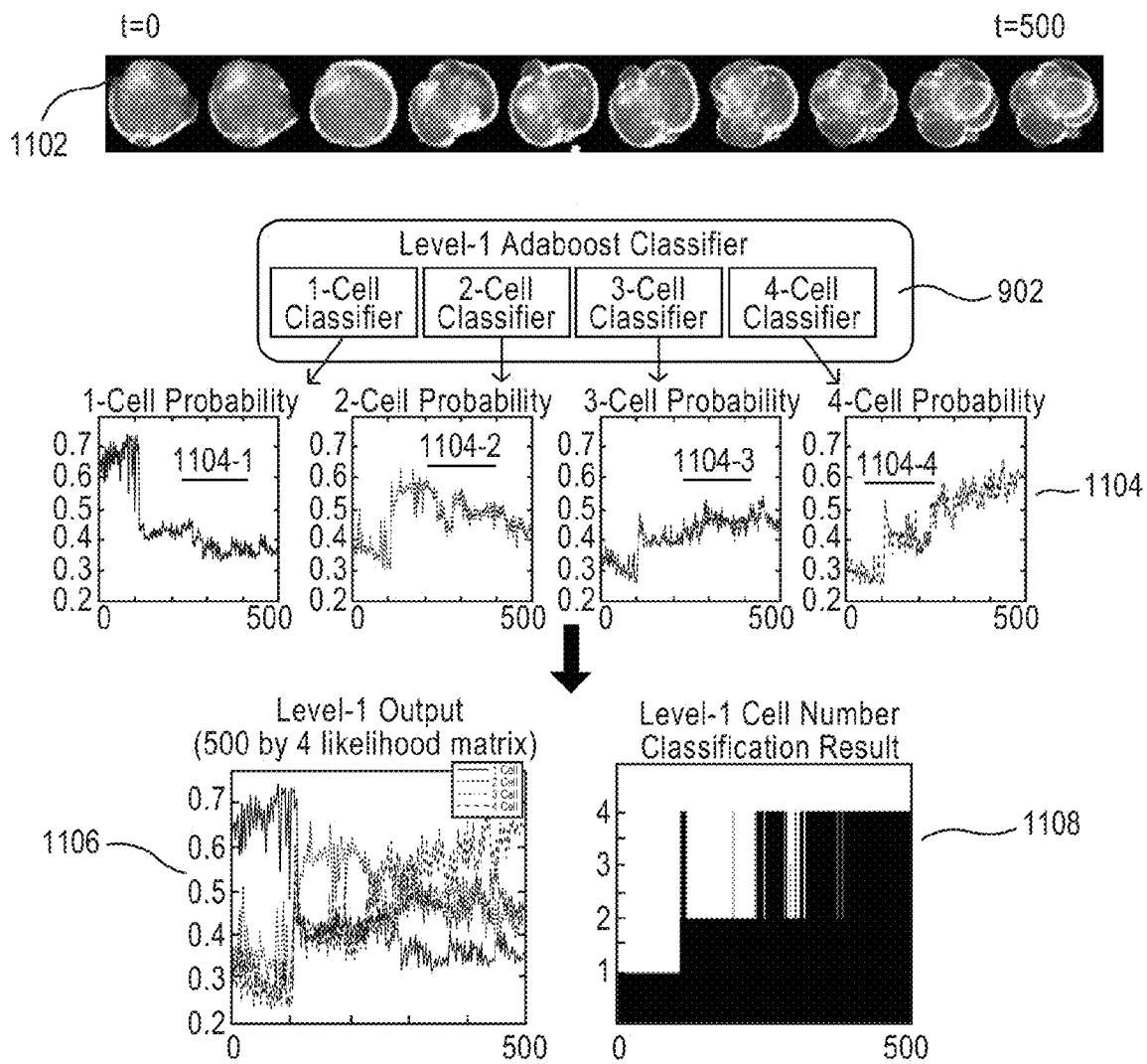
FIG. 11A illustrates an image-based cell classification approach using the level-1 image classifier of FIG. 9A, in accordance with an embodiment of the invention.

FIG. 11A illustrates per-image classification, in accordance with an embodiment of the invention. A series of test and/or otherwise unlabeled images 1102 serves as input to a level-1 image classifier 902 that includes 1-cell, 2-cell, 3-cell, and 4-cell (or 4 or more cell) classifiers ("cell classifier", similar to the cell classifiers 902-1 to 902-4 of FIG. 9 for example), and may further include additional cell classifiers (not shown). In some embodiments, each classifier determines a classification probability for each image based on cell features, where the cell features can be machine-learned features and/or hand-crafted cell features, as described earlier. In some embodiments, determining the classification probability includes extracting and/or otherwise determining a feature vector for each image (e.g. similar to each row 910-1 to 910-$n$ of FIG. 9C), and determining a classification probability based on the feature vector. Each classification probability can be indicative of an estimated likelihood that the distinct number of cells (e.g. 1 cell) associated with the each cell classifier (e.g. the 1-cell classifier) is shown in the each image. In this manner, each images of the images 1102 have a plurality of classification probabilities 1104 associated therewith. In some embodiments, and as illustrated in FIG. 11A, the plurality of classification probabilities 1104 includes at least a 1-cell probability (reference character 1104-1), a 2-cell probability (reference character 1104-2), a 3-cell probability (reference character 1104-3), and a 4-cell probability (reference character 1104-4), as suitably plotted in FIG. 11A for each cell classifier. The output of the image classifier 902 can be represented by the cumulative plot 1106 of the output of all cell classifiers ("Level-1 Output"). In general, unless noted otherwise, a plot of the output of an image classifier or cell classifier as disclosed herein is a plot of classification probability vs. image identifier, where the image identifier is based on the series of images, and can be representative of the time each image was taken with respect to each other image.

Aspects of the invention are further configurable for classifying each image as showing a certain number of cells. In some embodiments, each image can be classified based on the distinct number of cells associated with each cell classifier and the plurality of classification probabilities associated therewith. For example, in FIG. 11A, each image of the images 1102 can be classified as showing 1 cell, 2 cells, 3 cells, or 4 cells (or 4 or more cells) based on the level-1 Output 1106, which provides probability information for each cell number in each image. The classification of any image may be accomplished in any suitable manner that accounts for the classification probabilities associated with that image. In some embodiments, the image is deemed to be classified as showing the cell number associated with the highest classification probability associated with that image. For example, the level-1 Output 1106 in FIG. 11A indicates that the highest classification probability for image identifier 50 (e.g. representative of a time/timestamp corresponding to the $50^{th}$ image) of images 1102 is from the 1-cell classifier 902-1, and the highest classification probability for image identifier 450 of images 1102 is from the 4-cell classifier 902-4. Accordingly, and as best illustrated in the "Level-1 Cell Number Classification Result" plot 1108 of FIG. 11A, image identifier 50 is classified as showing 1 cell, while image identifier 450 is classified as showing 4 cells.

In some embodiments, the cell classification results 1108 can be used to infer biological activity based on one or more parameters such as cell activity parameters, timing parameters, non-timing parameters, and/or the like for the cells shown in the plurality of images. In some embodiments, the cell classification results 1108 can be used to infer cell division events based on the change(s) in the number of cells in successive images of a time-lapse series of images. For example, the classification results 1108 of FIG. 11A can be used to determine cell activity parameters. In some embodiments, the parameters can include cell activity parameters, and be one or more of the following for dividing cells such as in a developing embryo: a duration of first cytokinesis, a time interval between cytokinesis 1 and cytokinesis 2, a time interval between cytokinesis 2 and cytokinesis 3, a time interval between a first and second mitosis, a time interval between a second and third mitosis, a time interval from fertilization to an embryo having five cells (t5 in Table 2 below) and a time interval from syngamy to the first cytokinesis (S in Table 2 below).

In some embodiments, the parameters can include one or more parameters as described and/or referenced in Table 1.

In some embodiments, one or more predictive criterion can be applied to the one or more cells based on the determined cell activity parameters, such as, but not limited to, a measure of embryo quality (i.e. when the images are of a developing embryo). In some embodiments, the predictive criterion can be further employed to determine a predicted outcome such as, for example, which embryo(s) will reach blastocyst, and can enable the user to determine which embryo(s) have development potential for human implantation.

Figure 11B:
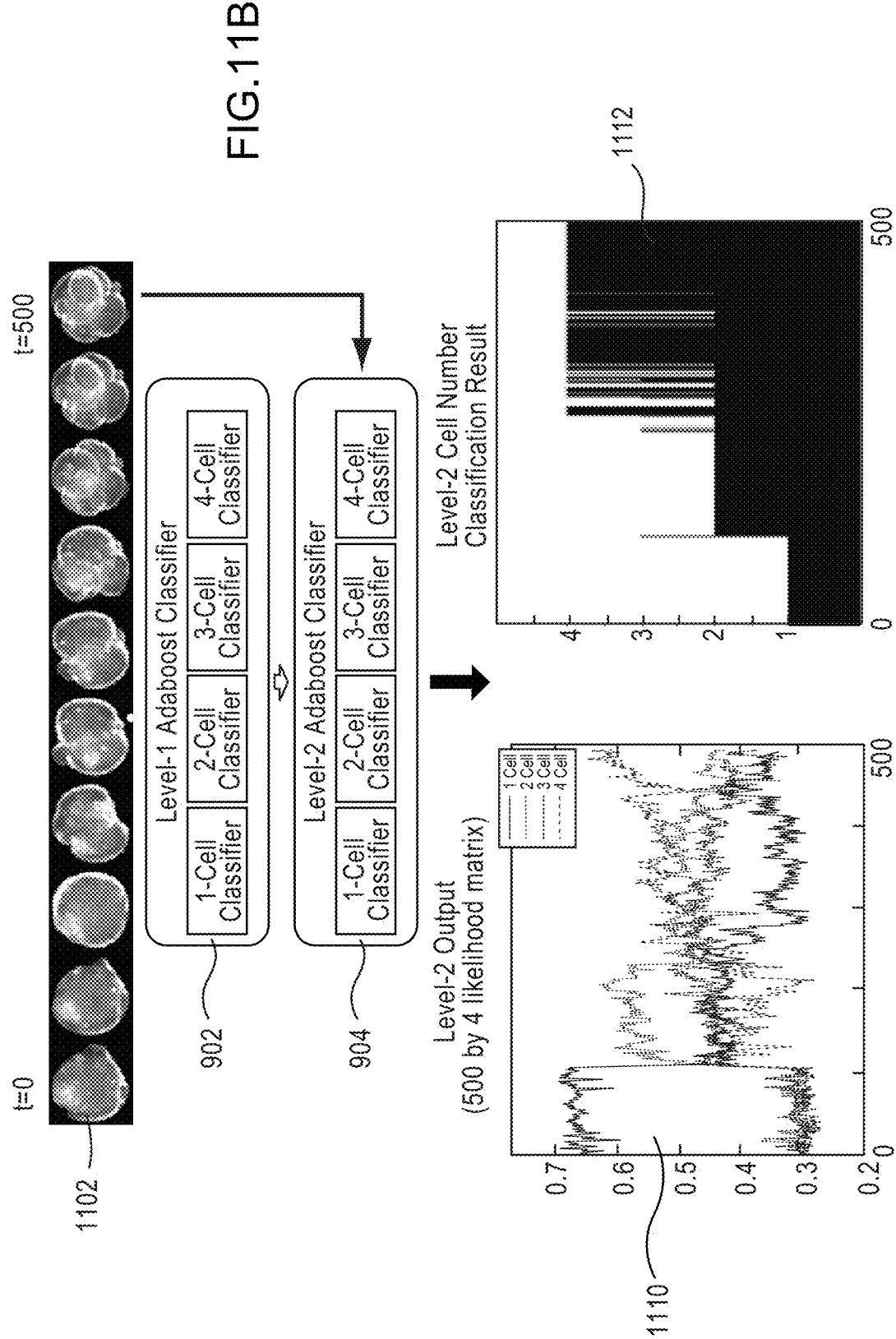
FIG. 11B illustrates an image-based cell classification approach using the level-1 and level-2 image classifiers of FIG. 9A and FIG. 11A, in accordance with an embodiment of the invention.

In some embodiments, the per-image probabilities 1104-1 to 1104-4 and/or classification results 1108 described above can be used to define additional cell features that can be used as input for another classification process/approach. The exemplary embodiment of FIG. 11B illustrates how the classification probabilities 1104-1 to 1104-4 determined by the cell classifiers of FIG. 11A (also referred to as "level-1 cell classifiers", "first cell classifiers", "level-1 image classifier" and/or "first image classifier") can be employed to calculate and/or otherwise determine additional cell features that can be employed by a subsequent level-2 cell classifier 904 to classify the images 1102, in accordance with an embodiment of the invention. As illustrated in FIG. 11B, the level-2 classifier 904 also includes 1-cell, 2-cell, 3-cell and 4-cell classifiers that are associated with the 1-cell, 2-cell, 3-cell and 4-cell classifiers of the level-1 classifier. In some embodiments, the additional cell features can be added to the feature vector for each image to generate an enhanced feature vector. As an example, an additional column can be added to the table 910 illustrated in FIG. 9C for each additional cell feature, such that each row (associated with a single image) 910-1 to 910-n has an additional entry for each additional cell feature. In some embodiments, one or more additional cell features are calculated for each image based on the level-1 classification probabilities 1104-1 to 1104-4 associated with that image, and based on the level-1 classification probabilities associated with at least one other image. For example, in some embodiments, four or more additional cell features can be added to the feature vector 910-1 to 910-n for each image based on the 1-cell, 2-cell, 3-cell and 4-cell classification probabilities 1104-1 to 1104-4 respectively for that image as determined by the level-1 cell classifiers. In some embodiments, the four or more additional cell features added to the feature vector 910-1 to 910-n for each image are based on one or more of an average (mean), median, maximum, minimum, standard deviation, and/or other combined representation of the 1-cell, 2-cell, 3-cell and 4-cell classification probabilities 1104-1 to 1104-4 respectively for that image and at least one other image of the plurality of images. In some embodiments, the averaged images are temporally adjacent to each other to facilitate reduction of noisy variations in the level-1 classification probabilities, such as those shown in the graph 1004A of FIG. 10. In other words, with reference to the images 1102, the averaged classification probabilities are adjacent to each other in the sequence of the images 1102. In this manner, classification information can be communicated from one classifier to the next in a sequential image classification scheme. It is understood that while illustrated in FIG. 11B for two image classifiers 902 and 904, the approach(es) described herein are extendible to any additional image classifiers executing in sequence and/or parallel. For example, in some embodiments, the output of the level-1 classifier can be fed in parallel to two or more level-2 classifiers, each level-2 classifier having learned from and/or being trained on a different set of learning and/or training images, respectively. In this manner, aspects of the invention are operable to receive independent, complementary validation of the output of each level-2 classifier by comparing it to the output of each other level-2 classifier.

Still referring to FIG. 11B, in some embodiments, each level-2 cell classifier 904-1 to 904-4 is configured based on unsupervised learning on unlabeled learning images having an unknown number of cells. In some embodiments, the unlabeled images used for unsupervised learning of the level-2 cell classifiers 904-1 to 904-4 are different than at least some, if not all, the unlabeled images used for unsupervised learning of the level-1 cell classifier. Aspects of the invention are hence configurable for employing independently-trained classifiers in a sequential manner such that each subsequent classification of an image can benefit from an independent prior classification of the same image.

Image-based cell classification (also referred to as "second classification") by the level-2 image classifier 904 can proceed in a manner similar to that described above for the level-1 image classifier 902. Namely, the level-2 cell classifiers 904-1 to 904-4 can be applied to each image of images 1102 to determine a second classification probability associated with each level-2 cell classifier for each image. In some embodiments, determining the second classification probability can include extracting and/or otherwise determining an enhanced feature vector for each image as described above, and determining the second classification probability based on the feature vector. Each second classification probability can be indicative of an estimated likelihood that the distinct number of cells (e.g. 1 cell) associated with the each cell classifier (e.g. the 1-cell classifier) is shown in the each image. In this manner, each image of the images 1102 has a plurality of second classification probabilities associated therewith. In some embodiments, the plurality of second classification probabilities includes at least a 1-cell probability, a 2-cell probability, a 3-cell probability, and a 4-cell probability. The output of the level-2 image classifier can be represented by the cumulative plot 1110 of the output of all level-2 cell classifiers ("Level-2 Output" plot).

Aspects of the invention are further configurable for classifying each image as showing a certain number of cells. In some embodiments, each image can be classified based on the distinct number of cells associated with each level-2 cell classifier and the second classification probabilities associated therewith. For example, in FIG. 11B, each image of the images 1102 can be classified as showing 1-cell, 2-cells, 3-cells, or 4-cells based on the level-2 Output, which provides second probability information for each cell number in each image. The second classification of any image may be accomplished in any suitable manner that accounts for the second classification probabilities associated with that image. In some embodiments, the image is deemed to be classified as showing the cell number associated with the highest second classification probability associated with that image.

In some embodiments, the level-2 cell classification results 1112 can be used to infer biological activity, cell activity parameters, and/or the like for the cells shown in the plurality of images. In some embodiments, the level-2 cell classification results 312 can be used to infer cell division events based on the change(s) in the number of cells in successive images of a time-lapse series of images. For example, the level-2 classification results 1112 of FIG. 11B can be used to determine cell activity parameters that include one or more of the following for dividing cells: a duration of first cytokinesis, a time interval between cytokinesis 1 and cytokinesis 2, and a time interval between cytokinesis 2 and cytokinesis 3, a time interval between a first and second mitosis, a time interval between a second and third mitosis, and a time interval from fertilization to an embryo having five cells (t5 in Table 3). Alternatively or in addition, the level-2 classification results 1112 of FIG. 11B can be used to determine any of the cell activity parameters included in Table 3.

Figure 11C:
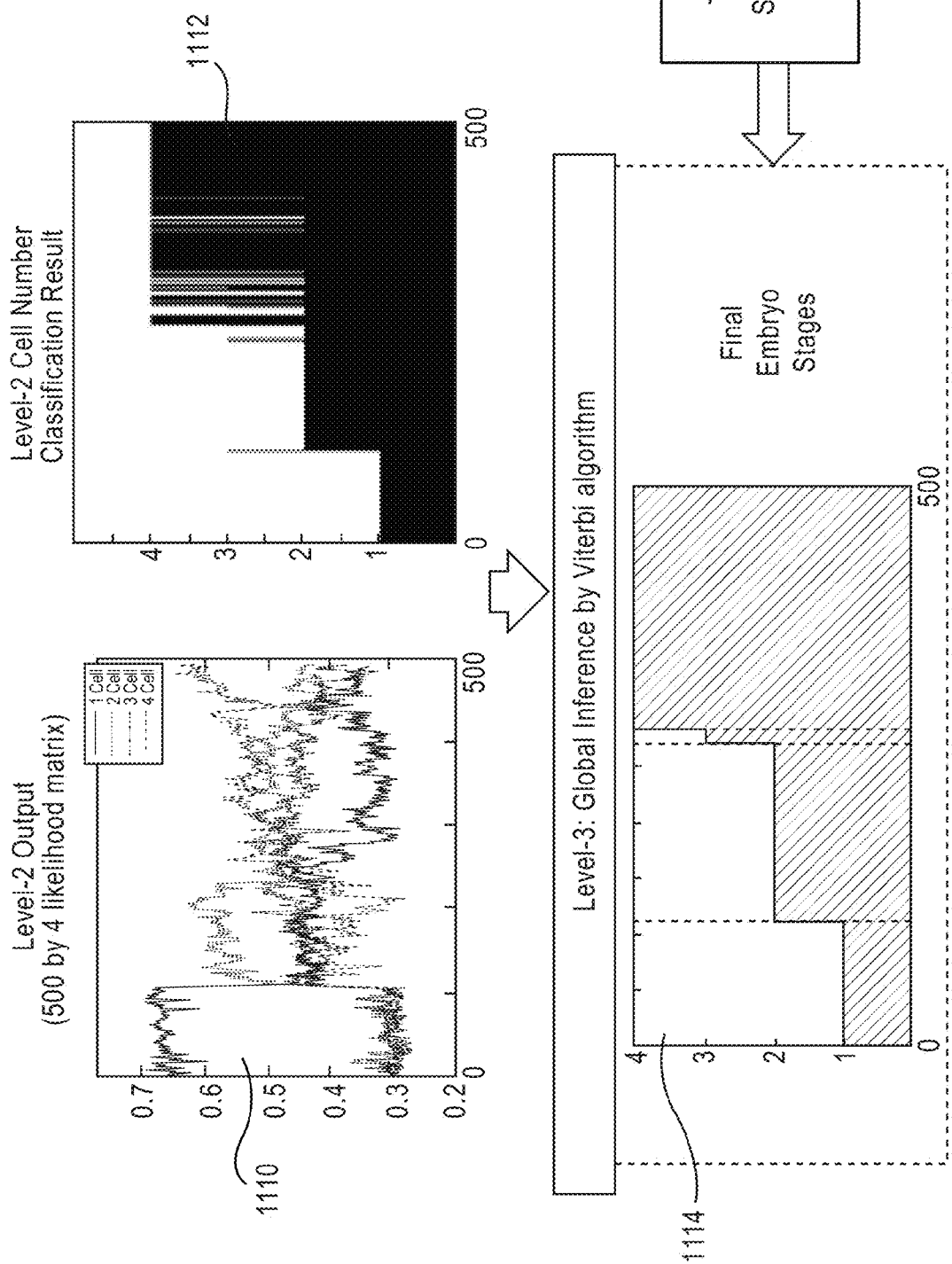
FIG. 11C illustrates an image-based cell classification refining approach using a Viterbi classifier applied to the output of the level-2 image classifier of FIG. 11B, in accordance with an embodiment of the invention.

In some exemplary embodiments, and as illustrated in FIG. 11C, a Viterbi algorithm is used to refine the level-2 classification results 1112 of FIG. 11B. The level-2 classifier 904, or alternatively a module receiving the level-2 classification results 1112, may implement the Viterbi algorithm. The Viterbi algorithm can be used by the level-2 classifier 1104 to integrate prior knowledge, enforce the non-decreasing number of cells, and fuse information such as classification probabilities and temporal image similarity to generate final embryo stage classification results within a global context.

In some embodiments, for a given image, the Viterbi algorithm accounts for each preceding image. The Viterbi algorithm may enforce that successive images have a non-decreasing number of cells, thereby 'smoothing' the level-2 classification results, as illustrated in the level-3 results 1114. In this manner, aspects of the invention can provide a single most likely classification 1114 of the images 1102. As also shown in FIG. 11B, the Viterbi algorithm can also accept as input a Temporal Image Similarity Score 1116 for each image, evaluated as disclosed with reference to FIG. 20 below.

In some embodiments, one or more predictive criterion can be applied to the one or more cells based on the determined cell activity parameters, such as, but not limited to, a measure of embryo quality (i.e. when the images are of a developing embryo). In some embodiments, the predictive criterion can be further employed to determine a hypothetical outcome such as, for example, which embryo(s) will reach blastocyst, and can enable the user to determine which embryo(s) have development potential for human implantation.

Figure 12:
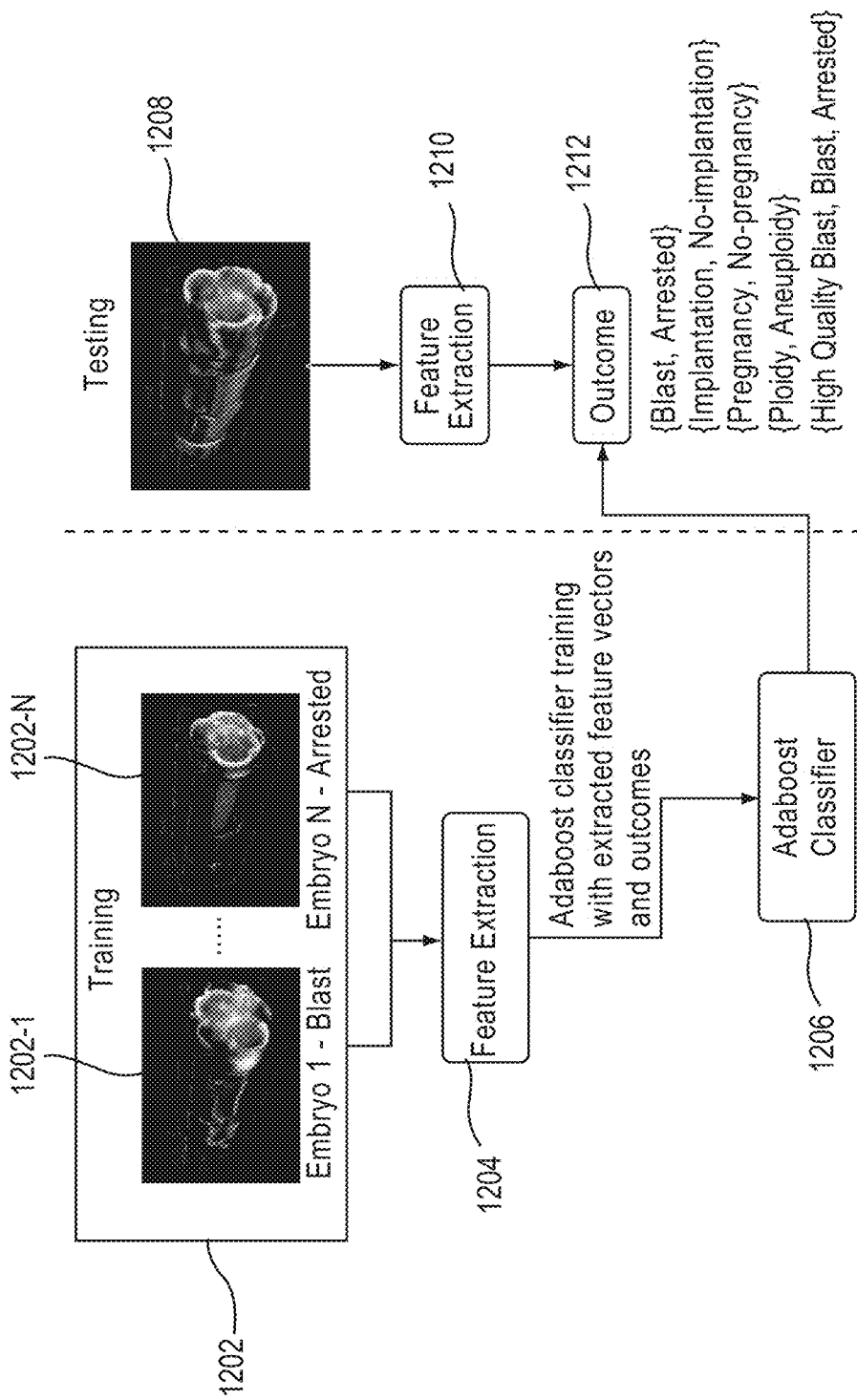
FIG. 12 illustrates an exemplary cell development outcome determination approach, in accordance with an embodiment of the invention.

FIG. 12 illustrates a non-limiting example of an outcome determination approach for images of cell development such as embryo development, according to some embodiments of the invention. During training, N sets of training images 1202 are provided with specified outcomes, each specified outcome here corresponding to either 'blast' or 'arrested'. For example, as illustrated in FIG. 12, the series of training images 1202-1 is associated with the blast outcome, and the series of training images 1202-N is associated with the arrested outcome. In some embodiments, at least one or more of the training images 1202 can be the same as at least one or more of the training images 908. Alternatively, all of the training images 1202 can be different from the training images 908.

As also illustrated in FIG. 12, and as will be explained in more detail below, aspects of the invention are operable to carry out feature extraction 1204 from each series of the training images 1202. The extracted feature information, such as one or more feature vectors, and their associated outcomes can be employed to train an outcome classifier 1206, although in some embodiments (not shown), multiple classifiers may be trained on some or all of the series of training images 1202. Although FIG. 12 illustrates the classifier 1206 as an AdaBoost classifier, it is understood that any suitable classifier may be employed.

The classifier 1206, after training, can be applied for outcome determination of a series of test images 1208. As illustrated in FIG. 12, feature information can be extracted from the test images 1208 via feature extraction 1210 in a manner/approach similar to that used for the feature extraction 1204 for the training images 1202. The classifier 1206 can then determine the outcome and/or classify the test images 1208 as blast or arrested based on the extracted feature information. In some embodiments, and as also illustrated in FIG. 12, other related additional or alternative outcomes/inferences may be determined by the classifier 1206, including but not limited to whether the embryo is suitable for implantation or not ("Implantation, No-implantation"), whether implantation of the embryo is likely to develop into a pregnancy or not ("Pregnancy, No-pregnancy"), and whether the embryo has a normal number of chromosomes ("Ploidy, Aneuploidy"). There may also be groups of three or more outcomes, such as but not limited to ("High Quality Blast, Blast, Arrested") pertaining to the quality of the embryo.

As discussed above, in some embodiments, the classifier undergoes unsupervised feature learning on unlabeled learning images to 'learn' cell features, also called a bag of features. In one embodiment, the bag of features is based on keypoint descriptors, such as Scale-Invariant Feature Transform (SIFT), Speeded Up Robust Features (SURF), Fast Regina Keypoint (FREAK), and Binary Robust Invariant Scalable Keypoints (BRISK), or other suitable descriptors known to one of skill in the art.

Any suitable learning approach may be employed that generates feature information representative of the learning images. In some embodiments, regions within each learning image are analyzed to determine a plurality of local feature information associated with the regions of the learning image ("local feature information"). In some embodiments, local feature information is determining by sampling the learning image at multiple locations within the learning image. For example, the color, or intensity, at each sample point can be determined as a numeric value, and as the local feature information. In some embodiments, a compressed sensing technique, such as sparse sampling, is employed that accounts for the sparse nature of information as is typical in biological images. In some embodiments, additional steps are taken towards detection and/or description of local features. For example, each sample point can be further divided into bins, and multiple measurements can be made for each bin for different directions to collect multiple local feature descriptor values per sample.

In some embodiments, the local feature information can be combined to obtain image feature information for the entire learning image ("image feature information"). For example, the image feature information can be specified as a multi-dimensional matrix, such as a two-dimensional matrix. The matrix may have a first dimension corresponding at least to the number of sample points associated with the determination of the local feature information, and a second dimension corresponding at least to additional detection/description information for each sample point, such as the number of local feature descriptor values collected per sample. For example, in some embodiments, the feature descriptors associated with the learning image can be represented as this two-dimensional matrix, which can also be viewed as a collection of feature vectors associated with the local feature information. The number of feature vectors may be the number of sample points, and the length of each feature vector can be determined by the following product: the number of bins x the number of directions, as described above for each sampling point.

In some embodiments, the image feature information for all learning images can be combined to obtain feature information for the entire set/group of the learning images ("set feature information"). The set feature information may include all of the local feature information for all of the learning images. For example, the set feature information can be specified as a multi-dimensional matrix, such as a three-dimensional matrix. The matrix may have a first dimension corresponding at least to the number of learning images, a second dimension corresponding at least to the number of sample points associated with the determination of the local feature information, and a third dimension corresponding at least to additional detection/description information for each sample point, such as the number of local feature descriptor values collected per sample. In this manner, feature information at the local, image, and set level can be successively accounted for, aggregated, interlinked, and/or combined in any suitable manner to generate set feature information from which the outcome classifier can ultimately learns cell features.

In some embodiments, data mining approaches can be employed to divide up the generated set feature information into a plurality of data regions or clusters of relevant and/or useful cell feature information ("feature clusters"). In some embodiments, k-clustering approaches are employed, such as k-means clustering, k-median clustering, k-medoid clustering, and/or the like. In some embodiments, k-means clustering is employed that partitions the set feature information into a plurality of feature clusters in which each observation belongs to the feature cluster with the nearest mean. The set feature information can be represented by any suitable number of feature clusters in this manner. In some embodiments, each feature cluster is representative of a learned cell feature, and can be selected from feature types including but not limited to shape type, edge type, and texture type. Any suitable representation of the feature cluster can be employed, such as a plurality of visualizations around a centroid and/or other sampling point of the cluster. In some embodiments, a centroid or other sample point associated with each of the feature clusters (also known as a codeword) can be combined to generate a codebook of the feature clusters, where the number of feature clusters may be the codebook size. For example, the codebook can be specified as a multi-dimensional matrix, such as a two-dimensional matrix with matrix dimensions corresponding to the number of clusters and the number of local feature descriptor values per sample.

Figure 13:
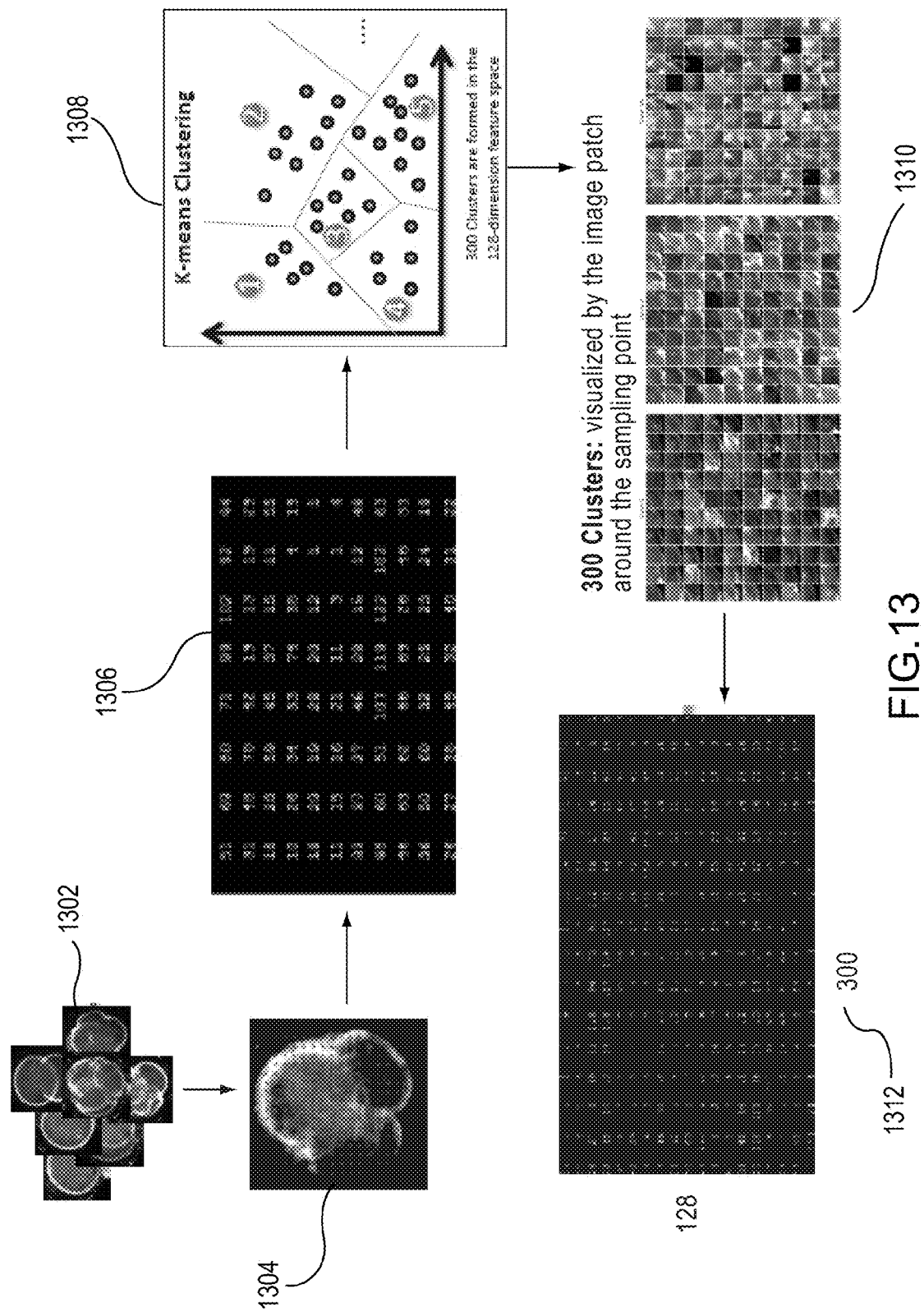
FIG. 13 illustrates an exemplary approach for unsupervised learning, in accordance with an embodiment of the invention.

FIG. 13 illustrates an exemplary and non-limiting approach for unsupervised learning from unlabeled learning images, and shows an embodiment for determining each of the local feature information, the image feature information, the set feature information, the plurality of clusters, the codewords, and the codebook described above. It is understood that each of these may be determined by any suitable means, leading to a wide range of possibilities/combinations for generating the codewords as the result of the unsupervised learning process.

FIG. 13 illustrates unsupervised learning in accordance with an embodiment of the invention, starting with a set of learning images 1302. In some embodiments, at least one or more of the learning images 1302 are the same as at least one or more of the training images 908. Alternatively, all of the training images 1302 can be different from the training images 908.

Each image 1304 included in the learning images 1302 is sampled to generate local feature information, and accordingly, to generate image feature information for the image 1304. The image feature information for each image 1304 included in the learning images 1302 is represented by the matrix 1306. As described earlier, the matrix 1306 may have a first dimension corresponding at least to the number of sample points associated with the determination of the local feature information, and a second dimension corresponding at least to additional detection/description information for each sample point, such as the number of local feature descriptor values collected per sample. The set feature information for the set of learning images 1302 may be represented as multiple matrices 1306 (one representative matrix 1306 shown in FIG. 13), one per learning image 1302, and/or as a single three-dimensional matrix incorporating the multiple matrices 1306.

At 1308, K-means clustering is applied to the matrices 1306 (the set feature information) to generate (in this example) 300 feature clusters in a 128-dimension feature space, each representing a learned cell feature. At 1310, each feature cluster is visualized around a sampling point, illustrated here as a 10×10 matrix of images for each feature cluster. In this example, the centroid of each feature cluster is a codeword, and a codebook 1312 can then be generated based on the 300 codewords, i.e. the codebook is of size 300 (number of clusters/codewords)×128 (number of dimensions in feature space). The codebook 1312 can serve as input to the outcome classifier as describing 300 learned cell features for feature extraction from training and/or test images.

Returning to FIG. 12, in some embodiments, upon unsupervised learning, the classifier 1206 can be trained on the training images 1202-1 to 1202-N for the plurality of outcomes associated therewith. In some embodiments, training the classifier includes extracting local feature information from each set of training images at 1204, and associating the extracted feature information with the outcome associated with the each set of training images by comparing the extracted local feature information with the learned codebook to generate series feature information. In this manner, the classifier 1206 can be 'trained' to recognize a specific outcome, and/or to determine the probability for a specific outcome, for the test images 408 based on prior knowledge of what feature information looks like for that specific outcome.

Figure 14:
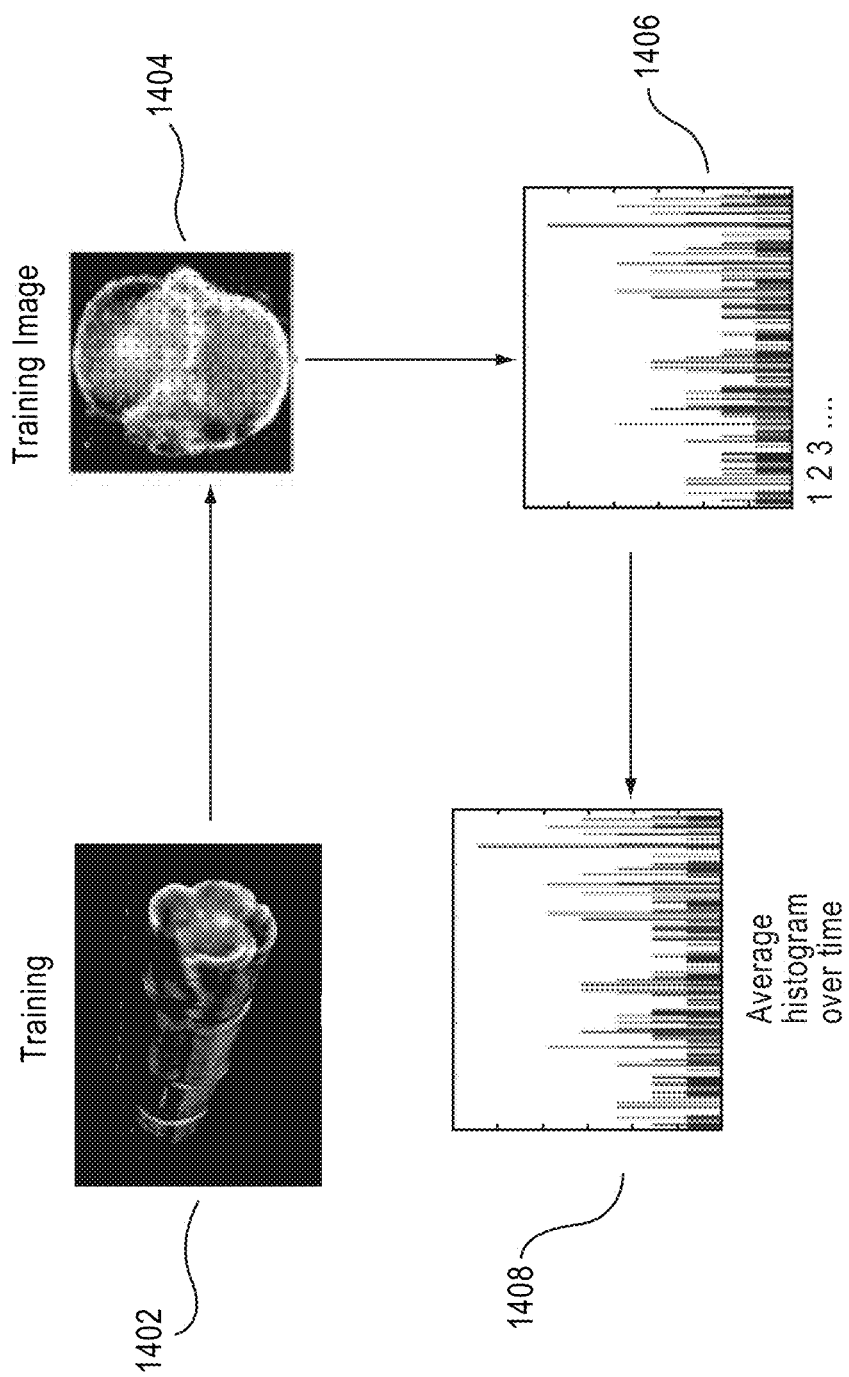
FIG. 14 illustrates an exemplary approach for feature extraction, in accordance with an embodiment of the invention.

In some embodiments, the feature extraction 1204 for extracting training feature information can operate as illustrated in the exemplary and non-limiting approach of FIG. 14. A time-sequential series of training images 1402 (e.g. such as the training images 1202-1) having a specified outcome can be analyzed by the classifier 1206 and/or a learning module 540 (see FIG. 6) that may be included in or separate from the classifier 1206 to generate image feature information for each image 1404 of the series of training images. In some embodiments, at least one or more of the training images 1402 can be the same as at least one or more of the training images 908. Alternatively, all of the training images 1402 can be different from the training images 908. In some embodiments, local feature information for each image 1404 is generated in a manner similar to that described above for unsupervised learning.

Referring to FIGS. 12-14, with the local feature information from the training images 1102 and the codebook as input, the classifier 1206 and/or the learning module 540 (see FIG. 6) can then determine the frequency with which each codeword occurs in the local feature information of each training image 1404 (which can be considered image feature information), and further determine the occurence frequency for each codeword across all the training images 1402, such as by averaging and/or determining the median of the occurrence frequencies for each codeword in each of the training images 1402. In this manner, the frequency distribution of codewords across all the training images 1402, also termed the series feature information, can be associated with the specified outcome associated with all the training images 1402. As best illustrated in FIG. 14, a histogram 1406 (image feature information) visually depicts the result of comparing the local feature information in training image 1404 against the codebook 1312 generated in FIG. 13, and is a frequency distribution of the frequency of occurrence of each of the 300 codewords of codebook 1312 in the image 1404. A histogram 1408 (series feature information) on the other hand, visually depicts the result of a) generating the frequency distribution data for each image of the training images 1402, and b) averaging and/or determining the median of the frequency of occurrence of each codebook across all the images of the training images 1402 to generate a single element that represents the frequency of occurrence for each codeword in the codebook 1312. Since the training images 1402 can be a time-lapse series of images, the histogram 1408 can accordingly be representative of time-lapse information. Further, since the training images 1402 are associated with the specified outcome, the histogram 1408 can accordingly be representative of the specified outcome, and the classifier 1206 can be considered 'trained' to recognize the specified outcome (e.g. the blast outcome, for the training images 1202-1). By repeating this process with a different set of training images (e.g. with 1202-N) having a different outcome (e.g. arrested outcome), the classifier can be considered trained to distinguish between the two outcomes. The classifier can now classify a series of unlabeled images (such as the test images 908) based on the codeword frequency distribution of the series of unlabeled images.

Once the classifier 1206 has been trained on the set of possible outcomes for outcome determination for the series of test images 1208, the classifier can be applied to the test images 1208 of unknown outcome. Outcome determination can include feature extraction 1210 of test local, image, and series feature information from the test images 1208. In some embodiments, feature extraction 1210 for the images 1208 is carried out in a manner similar to the feature extraction 1204, as illustrated in FIG. 14 for each training image 1404, and as described earlier. In other words, test local feature information is determined for each test image, which can be used to generate the test image feature information (i.e. codeword frequency distribution for each test image) for the each test image, which in turn can be used to generate the test series feature information (i.e. combined codeword frequency distribution for the entire series) for the series of test images 1208. An average test histogram can be generated by applying the codebook to the local feature information in each of the test images, and by averaging and/or determining the median of the codeword frequency distribution so obtained.

With the histogram ("test histogram") for the series of test images (e.g. the test images 1208), and the average histogram 1408 ("training histogram") for each series of training images 1202-1 to 1202-N, the classifier 1206 can then determining a classification probability for each outcome by performing classification of the series of test images based on the test histogram and the training histogram(s) for that specified outcome. The classification can be performed in any suitable manner, such as by an AdaBoost (adaptive boosting) classifier, or another classifier such as a Support Vector Machine (SVM). The classifier 906 can then classify the test images as showing a predicted outcome based on the classification probabilities associated with each outcome.

Figure 15:
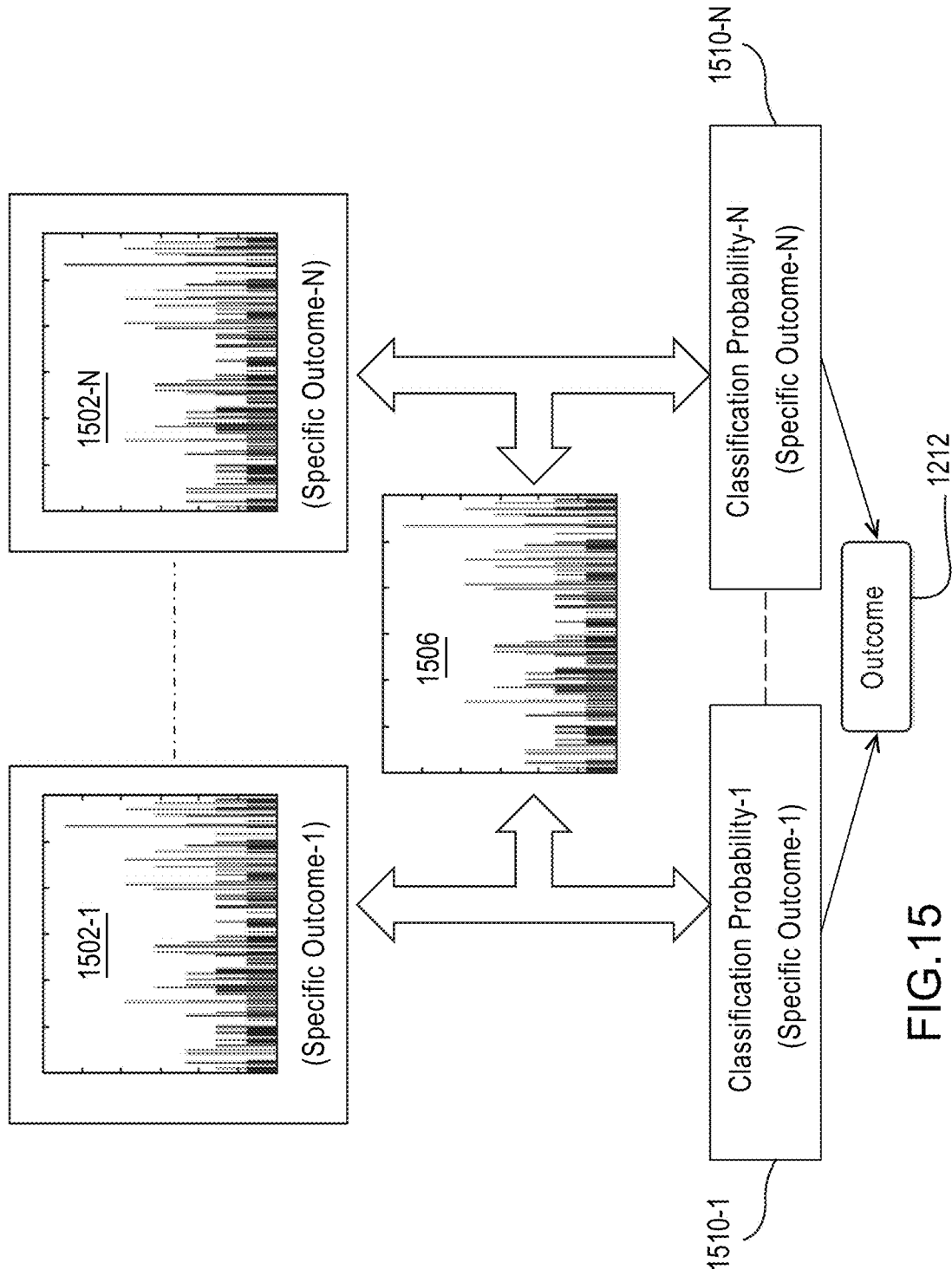
FIG. 15 illustrates an exemplary approach for outcome determination, in accordance with an embodiment of the invention.

FIG. 15 illustrates an exemplary and non-limiting approach for outcome determination of the outcome 1212 of FIG. 15. Training histograms 1502-1 to 1502-N represent codeword frequency distributions for the corresponding series of the training images 1202-1 to 1202-N, respectively, and further represent the specific outcome-1 to specific outcome-N, respectively associated with the corresponding series of the training images 1202-1 to 1202-N. Each training histogram 1502 is compared against a test histogram 1506 that represents the codeword frequency distribution for the test images 1208 of FIG. 12, and classification probabilities 1510-1 to 1510-N are determined that correspond to the specific outcome-1 to specific outcome-N respectively. The outcome 1212 is then determined based on the classification probabilities 1510-1 to 1510-N.

In some embodiments, such as when the cells in the training/test images is an embryo, one or more predictive criterion can be applied based on the determined outcome 1212, such as, but not limited to, whether the embryo is suitable for implantation or not, whether the embryo, if implanted, will result in a pregnancy or not, and so on.

Referring to FIG. 5, in some embodiments, the imaging device 502 can be configurable to acquire the images 1102, the training images for the level-1 image classifier, the training images for the level-2 image classifier, and/or the like. The imaging device 502 can also be configurable to acquire a first time-sequential series of images such as the test images 1208 and to acquire a plurality of time-lapse series of images of one or more cells, such as the training images 1202-1 to 1202-N. In some embodiments, the display device 506 is at least configured to display one or more images of cells as acquired by the imaging device 502, and for presenting a characteristic of the cells based on the image classification described herein. In some embodiments, the display device 506 is at least configured present one or more characteristics of the one or more cells in the first time-lapse series of images based on one or more of the following: the classification probability, the classifying, and the first outcome. In some embodiments, the display device 506 is further configured to present one or more characteristics of one or more cells in the plurality of time-lapse series of images based on the feature information.

In some embodiments, the computing apparatus 504 can be configured for image-based outcome determination. In other embodiments, the computing apparatus 504 can be configured for image-based cell classification. In some embodiments, the computing apparatus 504 applies a classifier to a first time-sequential series of images of one or more cells to determine, for the first time-sequential series of images, a classification probability. In some embodiments, the first time-sequential series of images is a time-lapse series of images. In some embodiments, the classifier is an AdaBoost classifier. In some embodiments, the one or more cells is selected from the group consisting of: a human embryo, one or more oocytes, and one or more pluripotent cells.

In some embodiments, the classification probability indicates an estimated likelihood that a first outcome for development of the one or more cells is shown by the first time-sequential series of images. The first outcome can be included in a plurality of outcomes for cell development associated with the classifier. The computing apparatus 504 is further configured to classify the first time-lapse series of images as showing the first outcome based on the plurality of outcomes associated with the classifier and the classification probability. In some embodiments, the plurality of outcomes include one or more of the following pairs of outcomes: blast and arrested; implantation and no implantation; and pregnancy and no pregnancy.

In some embodiments, the computing apparatus 504 can be configured to configure each of a plurality of first classifiers based on a first plurality of training images showing the distinct first number of cells associated with the each first classifier. In some embodiments, the computing apparatus 504 can be further configured to can be configured to apply a plurality of first classifiers to each of a plurality of images of one or more cells to determine, for each image, a first classification probability associated with each first classifier. The plurality of cell features can include one or more hand-crafted cell features. In some embodiments, each of the plurality of cell features can be one or more of the following types: shape type, texture type, and edge type. In some embodiments, the plurality of first classifiers are AdaBoost classifiers configured to perform binary classification.

In some embodiments, each first classifier is associated with a distinct first number of cells, and the computing apparatus 504 can be configured to determine the first classification probability for the each image based on a plurality of cell features including one or more machine learned cell features.

In some embodiments, the first classification probability indicates a first estimated likelihood that the distinct first number of cells associated with the each first classifier is shown in the each image. Each of the plurality of images thereby has a plurality of the first classification probabilities associated therewith.

In some embodiments, the computing apparatus 504 can be further configured to classify each image as showing a second number of cells based on the distinct first number of cells associated with the each first classifier and the plurality of first classification probabilities associated therewith.

In some embodiments, the computing apparatus 504 can be further configured to apply a plurality of second classifiers to each image to determine, for the each image, a second classification probability associated with each second classifier based on at least one of the plurality of the first classification probabilities. In some embodiments, at least one of the plurality of the first classification probabilities is associated with one or more of the plurality of images that are temporally adjacent to the each image. In some embodiments, the plurality of images are a time-lapse series of images. In some embodiments, the second classification probability and the at least one of the first classification probabilities are associated with the same distinct first number of cells. In some embodiments, the plurality of images are a time-lapse series of images.

In some embodiments, the computing apparatus 504 can be configured to configure the plurality of second classifiers based on a second plurality of training images showing the distinct third number of cells associated with the each second classifier. In some embodiments, each of the second plurality of training images is distinct from all of the first plurality of training images.

In some embodiments, the computing apparatus 504 can be further configured to apply the plurality of second classifiers to each image to determine, for the each image, the second classification probability associated with each second classifier. In some embodiments, each second classifier is associated with a distinct third number of cells, and the each second classifier determines the second classification probability for the each image based on the plurality of cell features, and further based on one or more additional cell features associated with one or more of the plurality of the first classification probabilities associated with one or more images included in the plurality of images that are temporally adjacent to the each image. In some embodiments, the second classification probability indicates a second estimated likelihood that the distinct third number of cells associated with the each second classifier is shown in the each image. Each of the plurality of images thereby has a plurality of the second classification probabilities associated therewith. In some embodiments, the distinct third number of cells associated with the each second classifier is selected from the group consisting of one cell, two cells, three cells, and four or more cells. In some embodiments, the distinct third number of cells associated with the each second classifier is the same as the distinct first number of cells associated with a corresponding one of the plurality of first classifiers.

In some embodiments, the computing apparatus 504 can be further configured to classify each image as showing a fourth number of cells based on the distinct third number of cells associated with the each second classifier and the plurality of second classification probabilities associated therewith. In some embodiments, the computing apparatus 504 can be further configured to apply a refining algorithm to the plurality of images to determine, based on the plurality of images, that one or more of the plurality of images classified as showing the fourth number of cells instead shows a fifth number of cells different from the fourth number of cells.

In some embodiments the computing apparatus 504 is further configured to determine cell activity parameters of the one or more cells based on the fourth number of cells in the each image. In some embodiments, the determined cell activity parameters include one or more of the following: a duration of first cytokinesis, a time interval between cytokinesis 1 and cytokinesis 2, and a time interval between cytokinesis 2 and cytokinesis 3, a time interval between a first and second mitosis, a time interval between a second and third mitosis, a time interval between fertilization to an embryo having five cells and a time interval between syngamy and the first cytokinesis.

In some embodiments, the computing apparatus 504 is further configured to extract series feature information from the first time-sequential series of images and to apply the classifier to the first time-sequential series of images is based on the series feature information. In some embodiments, the series feature information is representative of the first outcome and is associated with an entirety of the first time-sequential series of images. In some embodiments, the computing apparatus 504 is further configured to extract the series feature information by extracting local feature information associated with a portion of one or more of the first time-sequential series of images, and determining the series feature information based on the local feature information and a plurality of codewords.

In some embodiments, the computing apparatus 504 is further configured to determine the series feature information by associating the local feature information with one or more clusters, each of the one or more clusters being associated with a corresponding one of the plurality of codewords. The computing apparatus 504 is further configured to determine a frequency of occurrence of the one or more codewords across the first time-sequential series of images, where the series feature information includes the frequency of occurrence of each of the one or more codewords across the first time-sequential series of images. In some embodiments, each of the plurality of codewords is associated with a cell feature that is one or more of the following: edge type, texture type, and shape type.

In some embodiments, the computing apparatus 504 is further configured to determine each of the plurality of codewords from a plurality of unlabeled images of at least one cell through unsupervised learning.

In some embodiments, the computing apparatus 504 is further configured to train the classifier based on series feature information associated with each of a plurality of time-sequential series of images, where the each of the plurality of time-sequential series of images being associated with one of the plurality of outcomes. In some embodiments, the computing apparatus 504 is further configured to train the classifier by extracting the series feature information from the each of the plurality of time-sequential series of images. In some embodiments, the series feature information associated with one of the plurality of time-sequential series of images is representative of an associated one of the plurality of outcomes, and is associated with an entirety of the one of the plurality of time sequential series of images.

In some embodiments, the computing apparatus 504 is further configured to extract the series feature information by extracting local feature information associated with a portion of one or more of the plurality of time-sequential series of images, and determine the series feature information based on the local feature information and a plurality of codewords determined from a plurality of unlabeled images of at least one cell through unsupervised learning. In some embodiments, the computing apparatus 504 is further configured to determine the series feature information by associating the local feature information with one or more clusters, where each of the one or more clusters being associated with a corresponding one of the plurality of codewords. The computing apparatus 504 is further configured to determine a frequency of occurrence of the one or more codewords across each of the one or more of the plurality of time-sequential series of images. The series feature information includes the frequency of occurrence of each of the one or more codewords across the each of the one or more of the plurality of time-sequential series of images. In some embodiments each of the plurality of codewords is associated with a cell feature that is one or more of the following: edge type, texture type, and shape type. In some embodiments, the computing apparatus 504 is further configured to determine each of the plurality of codewords from a plurality of unlabeled images of at least one cell through unsupervised learning.

Now referring to FIG. 6, in some embodiments, the memory 514 stores a set of executable programs (not shown) that are used to implement the computing apparatus 504 for automated cell classification. Additionally or alternatively, the processor 512 can be used to implement the computing apparatus 504 for automated cell classification. In such embodiments, the processor 512 may include various combinations of the modules shown in FIG. 6, such as image module 520, training module 534, classification module 536, outcome determination module 538, learning module 540, and display module 542.

The image module 520 can be configured to receive a plurality of images of one or more cells. The image module 520 can be configured to acquire a first time-sequential series of images such as the test images 1208 and to acquire a plurality of time-sequential series of images of one or more cells, such as the training images 1202-1 to 1202-N. In some embodiments, the image module 520 also acquires the learning images.

The classification module 536 can be configured to apply a plurality of first classifiers to each of the plurality of images of one or more cells to determine, for each image, a first classification probability associated with each first classifier. Each first classifier can be associated with a distinct first number of cells. The classification module 536 can be further configured to determine the first classification probability for the each image based on a plurality of cell features including one or more machine learned cell features. The first classification probability can indicate a first estimated likelihood that the distinct first number of cells associated with the each first classifier is shown in the each image. Each of the plurality of images thereby has a plurality of the first classification probabilities associated therewith.

The classification module 536 can be further configured to classify each image as showing a second number of cells based on the distinct first number of cells associated with the each first classifier and the plurality of first classification probabilities associated therewith. Each second classifier can be associated with a distinct third number of cells. Each second classifier can determine the second classification probability for the each image based on the plurality of cell features, and further based on one or more additional cell features associated with one or more of the plurality of the first classification probabilities associated with one or more images included in the plurality of images that are temporally adjacent to the each image. The second classification probability can indicate a second estimated likelihood that the distinct third number of cells associated with the each second classifier is shown in the each image. Each of the plurality of images thereby has a plurality of the second classification probabilities associated therewith. The classification module 536 can be further configured to classify each image as showing a fourth number of cells based on the distinct third number of cells associated with the each second classifier and the plurality of second classification probabilities associated therewith.

The classification module 536 can be further configured to apply a refining algorithm to the plurality of images to determine, based on the plurality of images, that one or more of the plurality of images classified as showing the fourth number of cells instead shows a fifth number of cells different from the fourth number of cells.

The classification module 536 can be configured to apply a classifier to a first time-sequential series of images of one or more cells to determine, for the first time-sequential series of images, a classification probability. The classification probability indicates an estimated likelihood that a first outcome for development of the one or more cells is shown by the first time-sequential series of images. The first outcome is included in a plurality of outcomes for cell development associated with the classifier. The classification module 536 can be further configured to classify the first time-lapse series of images as showing the first outcome based on the plurality of outcomes associated with the classifier and the classification probability. The classification module 536 can be implemented on the processor 512 as shown. In addition or alternatively, the classification module 536 can be implemented on the memory 514.

The training module 534 can be configured to configure each of the plurality of first classifiers based on a first plurality of training images showing a distinct first number of cells associated with the each first classifier. In some embodiments, the training module 534 can be further configured to configure a plurality of second classifiers based on a second plurality of training images showing a distinct third number of cells associated with the each second classifier.

In some embodiments, the training module 534 is configured to extract series feature information from the first time-sequential series of images, wherein the classification module 536 is further configured to apply the classifier to the first time-sequential series of images is based on the series feature information. In some embodiments, the training module 534 is further configured to determine the series feature information by associating the local feature information with one or more clusters, each of the one or more clusters being associated with a corresponding one of the plurality of codewords, and the learning module 540 is configured to determine each of the plurality of codewords from a plurality of unlabeled images of at least one cell through unsupervised learning.

Figure 16:
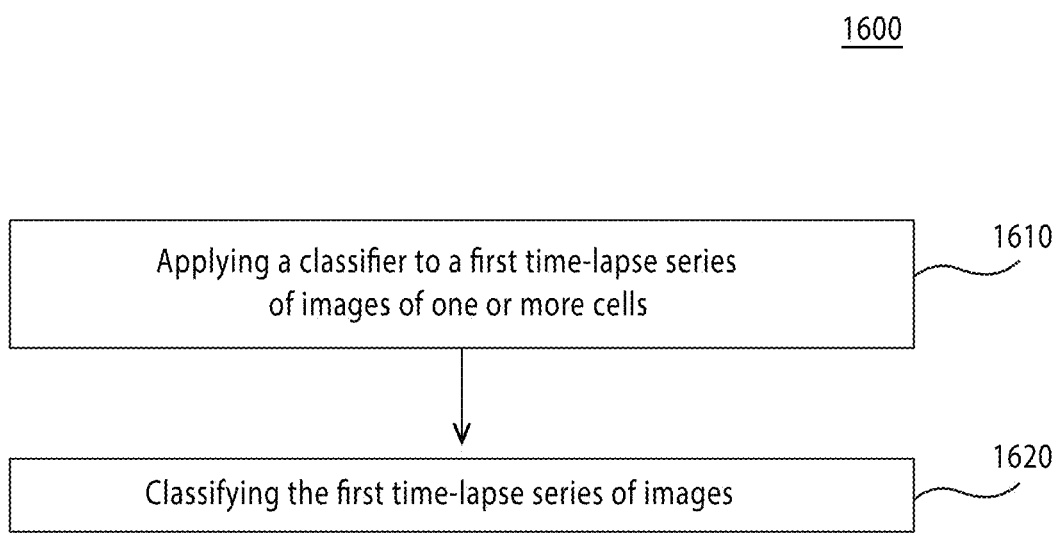
FIG. 16 illustrates a method for image-based cell development outcome determination, in accordance with an embodiment of the invention.

FIG. 16 illustrates a method 1600 of automated image-based cell classification, in accordance with an embodiment of the invention. In some embodiments, at least part of the method 1600 can be performed by the computing apparatus 504, and by the classification module 532 in particular. At step 1610, a plurality of first classifiers are applied to each of a plurality of images of one or more cells to determine, for each image, a first classification probability associated with each first classifier. Each first classifier is associated with a distinct first number of cells, and determine the first classification probability for the each image based on a plurality of cell features including one or more machine learned cell features. The first classification probability can indicate a first estimated likelihood that the distinct first number of cells associated with the each first classifier is shown in the each image. Each of the plurality of images thereby has a plurality of the first classification probabilities associated therewith.

At step 1620, each image is classified as showing a second number of cells based on the distinct first number of cells associated with the each first classifier and the plurality of first classification probabilities associated therewith.

At step 1630, a plurality of second classifiers are applied to each image to determine, for the each image, a second classification probability associated with each second classifier. Each second classifier is associated with a distinct third number of cells and determines the second classification probability for the each image based on the plurality of cell features, and further based on one or more additional cell features associated with one or more of the plurality of the first classification probabilities associated with one or more images included in the plurality of images that are temporally adjacent to the each image. The second classification probability indicates a second estimated likelihood that the distinct third number of cells associated with the each second classifier is shown in the each image, the each of the plurality of images thereby having a plurality of the second classification probabilities associated therewith.

At step 1640, each image is classified as showing a fourth number of cells based on the distinct third number of cells associated with the each second classifier and the plurality of second classification probabilities associated therewith.

In some embodiments, a method for automated cell classification comprises applying a plurality of first classifiers to each of a plurality of images of one or more cells to determine, for each image, a first classification probability associated with each first classifier. Each first classifier is associated with a distinct first number of cells, and determines the first classification probability for the each image based on a plurality of cell features including one or more machine learned cell features. The first classification probability indicates a first estimated likelihood that the distinct first number of cells associated with the each first classifier is shown in the each image, the each of the plurality of images thereby having a plurality of the first classification probabilities associated therewith.

In some embodiments, the method for automated cell classification further includes classifying each image as showing a second number of cells based on the distinct first number of cells associated with the each first classifier and the plurality of first classification probabilities associated therewith.

In some embodiments, the distinct first number of cells associated with the each first classifier is selected from the group consisting of one cell, two cells, three cells, and four or more cells In some embodiments, each of the plurality of first classifiers is configured based on a first plurality of training images showing the distinct first number of cells associated with the each first classifier.

In some embodiments, the plurality of cell features includes one or more hand-crafted cell features.

In some embodiments, the method for automated cell classification further includes applying a plurality of second classifiers to each image to determine, for the each image, a second classification probability associated with each second classifier based on at least one of the plurality of the first classification probabilities.

In some embodiments, the at least one of the plurality of the first classification probabilities is associated with one or more of the plurality of images that are temporally adjacent to the each image.

In some embodiments, the plurality of images are a time-lapse series of images.

In some embodiments, the second classification probability and the at least one of the first classification probabilities are associated with the same distinct first number of cells.

In some embodiments, the method for automated cell classification further includes applying a plurality of second classifiers to each image to determine, for the each image, a second classification probability associated with each second classifier. Each second classifier is associated with a distinct third number of cells. The each second classifier determines the second classification probability for the each image based on the plurality of cell features, and further based on one or more additional cell features associated with one or more of the plurality of the first classification probabilities associated with one or more images included in the plurality of images that are temporally adjacent to the each image. The second classification probability indicates a second estimated likelihood that the distinct third number of cells associated with the each second classifier is shown in the each image, the each of the plurality of images thereby having a plurality of the second classification probabilities associated therewith. The method for automated cell classification further includes classifying each image as showing a fourth number of cells based on the distinct third number of cells associated with the each second classifier and the plurality of second classification probabilities associated therewith. In some embodiments, the plurality of images are a time-lapse series of images.

In some embodiments, the distinct third number of cells associated with the each second classifier is selected from the group consisting of one cell, two cells, three cells, and four or more cells.

In some embodiments, each of the plurality of second classifiers is configured based on a second plurality of training images showing the distinct third number of cells associated with the each second classifier.

In some embodiments, each of the second plurality of training images is distinct from all of the first plurality of training images In some embodiments, the distinct third number of cells associated with the each second classifier is the same as the distinct first number of cells associated with a corresponding one of the plurality of first classifiers In some embodiments, the method for automated cell classification further includes determining cell activity parameters of the one or more cells based on the fourth number of cells in the each image. In some embodiments, the determined cell activity parameters include one or more of the following: a duration of first cytokinesis, a time interval between cytokinesis 1 and cytokinesis 2, a time interval between cytokinesis 2 and cytokinesis 3, a time interval between a first and second mitosis, a time interval between a second and third mitosis, a time interval from fertilization to an embryo having five cells, and a time interval between syngamy and the first cytokinesis.

In some embodiments, the method for automated cell classification further includes applying a refining algorithm to the plurality of images to determine, based on the plurality of images, that one or more of the plurality of images classified as showing the fourth number of cells instead shows a fifth number of cells different from the fourth number of cells.

In some embodiments, the refining algorithm is a Viterbi algorithm.

In some embodiments, the method for automated cell classification further includes determining cell activity parameters of the one or more cells based on the second number of cells in the each image. In some embodiments, determining cell activity parameters of the one or more cells based on the second number of cells in the each image In some embodiments, the method for automated cell classification further includes applying a predictive criterion to the one or more cells based on the determined cell activity parameters to determine a predicted outcome included in a plurality of specified outcomes. In some embodiments, the one or more cells shown in the plurality of images are selected from the group consisting of: a human embryo, one or more oocytes, and one or more pluripotent cells.

In some embodiments, the plurality of first classifiers are AdaBoost classifiers configured to perform binary classification.

In some embodiments, each of the plurality of cell features is one or more of the following types: shape type, texture type, and edge type.

In some embodiments, at least one of the one or more machine learned cell features is learned via unsupervised learning from a plurality of learning images.

Figure 17:
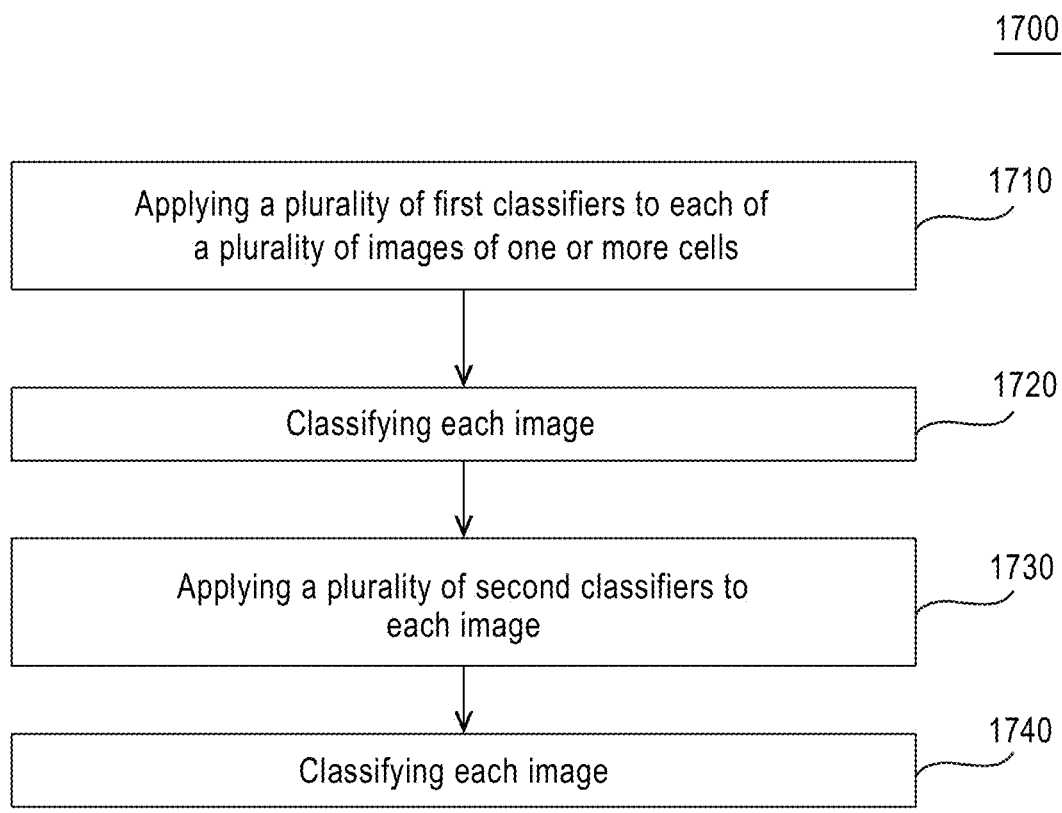
FIG. 17 illustrates a method for automated image-based cell classification, in accordance with an embodiment of the invention.

FIG. 17 illustrates a method 1700 for image-based embryo outcome determination, according to an embodiment of the invention.

At step 1710, a classifier is applied to a first time-lapse series of images of one or more cells to determine, for the first time-lapse series of images, a classification probability. The classification probability can indicate an estimated likelihood that a first outcome for development of the one or more cells is shown by the first time-lapse series of images. The first outcome is included in a plurality of outcomes for cell development associated with the classifier.

At step 1720, the first time-lapse series of images can be classified as showing the first outcome based on the plurality of outcomes associated with the classifier and the classification probability.

In some embodiments, the method can further comprise extracting a feature vector from the first time-lapse series of images, where the feature vector is based on each of the first time-lapse series of images. The feature vector can include an element based on a frequency of occurrence in each of the first time-lapse series of images of a codeword associated with a machine learned cell feature.

In some embodiments, the feature information is based on a feature vector extracted from one or more of the plurality of time-lapse series of images. The feature vector extracted from one or more of the plurality of time-lapse series of images can be based on each image included in the one or more of the plurality of time-lapse series of images.

In some embodiments, the codeword associated with the machine learned cell feature is extracted from the feature vector extracted from one or more of the plurality of time-lapse series of images, and wherein the feature information includes the codeword. In some embodiments, the machine learned cell feature is one or more of the following: edge type, texture type, and shape type. In some embodiments, the plurality of outcomes include one or more of the following pairs of outcomes: blastocyst and arrested; implantation and no implantation; and pregnancy and no pregnancy.

In some embodiments, the classification probability is a first classification probability, and the classifier is further configured to determine additional classification probabilities based on feature information associated with each of the plurality of time-lapse series of images. In some embodiments, classifying the first time-lapse series of images is further based on the additional classification probabilities. In some embodiments, the first classification probability is greater than each of the additional classification probabilities.

In some embodiments, the classifier is an AdaBoost classifier. In some embodiments, the one or more cells in the first time-lapse series of images is of the same cell type as one or more cells in each of a plurality of time-lapse series of images, said cell type selected from: a human embryo, one or more oocytes, and one or more pluripotent cells.

In some embodiments, a method for image-based outcome determination comprises: applying a classifier to a first time-sequential series of images of one or more cells to determine, for the first time-sequential series of images, a classification probability. The classification probability indicates an estimated likelihood that a first outcome for development of the one or more cells is shown by the first time-sequential series of images. The first outcome is included in a plurality of outcomes for cell development associated with the classifier.

In some embodiments, the method for image-based outcome determination further includes classifying the first time-lapse series of images as showing the first outcome based on the plurality of outcomes associated with the classifier and the classification probability.

In some embodiments, the method for image-based outcome determination further includes extracting series feature information from the first time-sequential series of images, wherein the applying the classifier to the first time-sequential series of images is based on the series feature information.

In some embodiments, the series feature information is representative of the first outcome and is associated with an entirety of the first time-sequential series of images.

In some embodiments, the extracting the series feature information includes extracting local feature information associated with a portion of one or more of the first time-sequential series of images, and determining the series feature information based on the local feature information and a plurality of codewords.

In some embodiments, the determining the series feature information includes associating the local feature information with one or more clusters, each of the one or more clusters being associated with a corresponding one of the plurality of codewords, and determining a frequency of occurrence of the one or more codewords across the first time-sequential series of images. The series feature information includes the frequency of occurrence of each of the one or more codewords across the first time-sequential series of images.

In some embodiments, each of the plurality of codewords is associated with a cell feature that is one or more of the following: edge type, texture type, and shape type.

In some embodiments, each of the plurality of codewords is determined from a plurality of unlabeled images of at least one cell through unsupervised learning.

In some embodiments, the method for image-based outcome determination further includes training the classifier based on series feature information associated with each of a plurality of time-sequential series of images, the each of the plurality of time-sequential series of images being associated with one of the plurality of outcomes. In some embodiments, the training the classifier includes extracting the series feature information from the each of the plurality of time-sequential series of images. In some embodiments, series feature information associated with one of the plurality of time-sequential series of images is representative of an associated one of the plurality of outcomes, and is associated with an entirety of the one of the plurality of time sequential series of images. In some embodiments, the extracting the series feature information includes extracting local feature information associated with a portion of one or more of the plurality of time-sequential series of images, and determining the series feature information based on the local feature information and a plurality of codewords determined from a plurality of unlabeled images of at least one cell through unsupervised learning.

In some embodiments, the determining the series feature information includes associating the local feature information with one or more clusters, each of the one or more clusters being associated with a corresponding one of the plurality of codewords, and determining a frequency of occurrence of the one or more codewords across each of the one or more of the plurality of time-sequential series of images, wherein the series feature information includes the frequency of occurrence of each of the one or more codewords across the each of the one or more of the plurality of time-sequential series of images. In some embodiments, each of the plurality of codewords is associated with a cell feature that is one or more of the following: edge type, texture type, and shape type. In some embodiments, each of the plurality of codewords is determined from a plurality of unlabeled images of at least one cell through unsupervised learning.

In some embodiments, the first time-sequential series of images is a time-lapse series of images. In some embodiments, the plurality of outcomes include one or more of the following pairs of outcomes: blast and arrested; implantation and no implantation; and pregnancy and no pregnancy. In some embodiments, the classifier is an AdaBoost classifier. In some embodiments, the one or more cells is selected from the group consisting of: a human embryo, one or more oocytes, and one or more pluripotent cells.

Example 2

This example presents a multi-level embryo stage classification method to estimate the number of cells at multiple time points in a time-lapse microscopy video of early human embryo development. A 2-level classification model is proposed to classify embryo stage within a spatial-temporal context. A rich set of discriminative embryo features are employed, hand-crafted, or automatically learned from embryo images. The Viterbi algorithm further refines the embryo stages with the cell count probabilities and a temporal image similarity measure. The proposed method was quantitatively evaluated using a total of 389 human embryo videos, resulting in a 87.92% overall embryo stage classification accuracy.

Introduction

Timing/morpho-kinetic parameters measured from time-lapse microscopy video of human embryo, such as the durations of 2-cell stage and 3-cell stage, have been confirmed to be correlated with the quality of human embryos and therefore can be used to select embryos with high developmental competence for transfer to IVF patients. Accurately and objectively measuring these timing parameters requires an automated algorithm that can identify the stage of human embryo (i.e. number of cells) during a time-lapse imaging process. This example is focused on classifying human embryos into four stages, i.e. 1-cell, 2-cell, 3-cell, and 4-or-more-cell. This problem can be challenging due to variations in the morphology of the embryos, occlusion, and imaging limitations.

This example presents a 3-level method to classify embryo stage in time-lapse microscopy video of early human embryo development. To the best knowledge of the inventors, this work represents the first attempt of applying machine learning techniques to classify human embryo stages for extraction of predictive parameters of clinical outcome. The classification method and learned embryo features (i.e. bag-of-features (BoF)) can be easily adapted to various imaging modalities, including for other cell classification and mitosis detection problems.

Methodology

Figure 18:
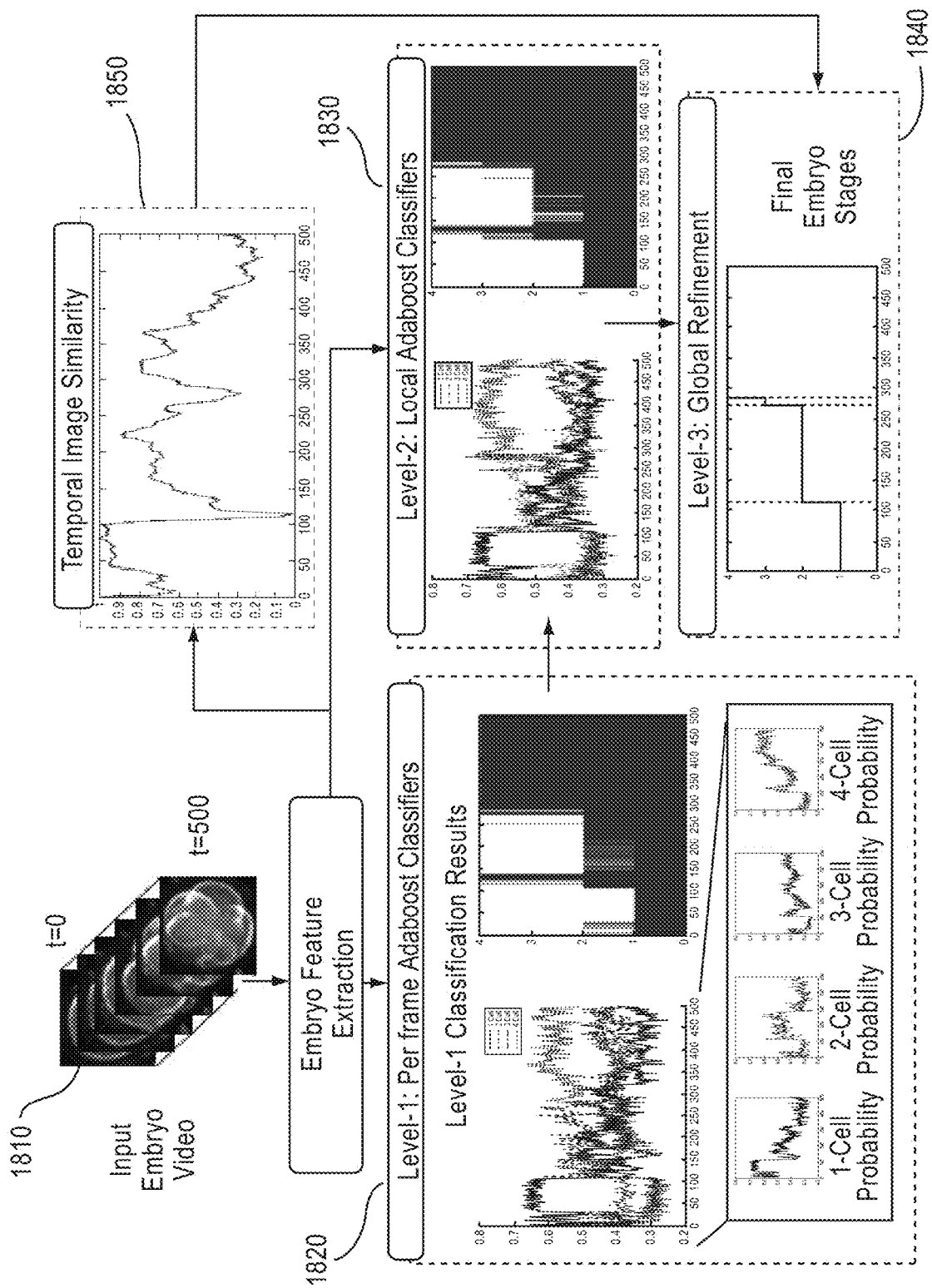
FIG. 18 illustrates an exemplary approach for image-based cell classification, in accordance with an embodiment of the invention.

FIG. 18 illustrates an exemplary approach for image-based cell classification, in accordance with an embodiment of the invention. Given a human embryo video 1810 acquired with time-lapse microscopy, a rich set of 62 standard hand-crafted features and 200 automatically learned bag-of-features are extracted from each frame of the video. The level-1 Adaboost classification model 1820 consists of 4 Adaboost classifiers trained for classifying one class from the rest classes using the 262 features. Level-1 classification is performed using this classification model on each frame independently. The level-2 Adaboost classification model 1830 also consists of 4 Adaboost classifiers trained with augmented feature set that includes both the 262 features and additional features computed from level-1 class probabilities. Level-2 Adaboost is designed to exploit local temporal context and refine the level-1 classification results. At level 3 (see reference character 1840), the Viterbi algorithm integrates prior knowledge, enforces the non-decreasing number of cells, and generates the final embryo stage classification results within the global context.

Embryo Features

The embryo features include 62 hand-crafted features (22 Gray-Level Co-occurrence Matrices (GLCM), 10 Gabor features, and 5 region properties) and 200 Bag-of-Features learned automatically from embryo image. The GLCM, LBP, and Gabor features are well-known texture features for classification problems. Hessian features are statistics computed from the first eigenvalues of the Hessian-filtered images that enhance the cell edges. The region properties (area, member of convex hall points, solidity, eccentricity, and perimeter) are computed from an rough embryo mask obtained by applying a shortest path algorithm to extract the embryo boundary in polar image space.

FIGS. 19A and 19B illustrate a bag of features in accordance with an example, showing (a) examples of dense and sparse occurrence histograms generated from sparsely detected descriptors and densely sampled descriptors with a learned codebook; and (b) four examples of clusters (appearance codewords) generated by k-means clustering. The bag of features (BoF) is based on keypoint descriptors such as SIFT. This example employs the basic SIFT descriptor to demonstrate the effectiveness of BoF. Both densely sampled descriptors 1910A and sparsely detected descriptors 1910B are used in the method. K-means clustering was employed to build a codebook with 200 codewords from SIFT descriptors (128-dimension vectors) extracted from training embryo images. Each cluster 1920A-1920D represents an intrinsic texture pattern of embryos, and its centroid is kept as one of the codewords. Given a testing image, descriptors are extracted first and then quantized by hard-assigning each descriptor to one codeword. The final BoF (1930A, 1930B) is an occurrence histogram that represents the frequency of the codewords.

The additional level-2 features are temporal contextual features computed from class-conditional probabilities output by level-1 Adaboost. At each frame, the mean, median, max, min, and standard deviation of the class-conditional probabilities of its local neighborhood (e.g. 5 frames) are computed and added to the original feature set.

2-Level Adaboost Classification Model

The one-vs-all scheme is employed to handle this multi-class classification problem with binary Adaboost classifiers. Alternatively, the AdaBoost.M1 or Adaboost.M2 can also be used, which are multi-class extensions to Discrete Adaboost. There are four Adaboost classifiers at each level of the 2-Level Adaboost classification model. Each Adaboost classifier is consisted of a set of base stump classifiers and trained to separate one class from the other classes. For a Adaboost classifier trained for class i∈{1,2,3,4}, its output of a image frame is $$P(y_t = i | x_t) = \frac{\sum_{k=1}^{N} a_{ik} h_{ik}(x_t)}{\sum_{k=1}^{N} a_{ik}} \quad (3)$$

where $x_t$ is the extracted feature vector for frame t, $\alpha_{ik}$ is the weight of the base classifiers, $h_{ik} \in \{0,1\}$ is the output of the base classifiers, and $P(y_t=i|x_t)$ is the class-conditional probability normalized to [0.1] (FIG. 12).

Temporal Image Similarity

Figure 20:
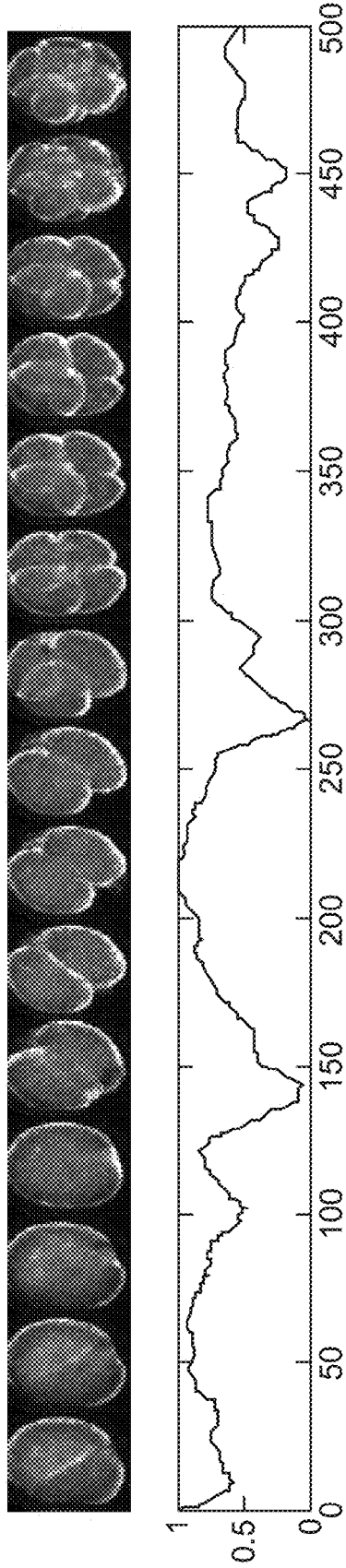
FIG. 20 illustrates an example of temporal image similarity.

Besides representing the embryo image in proposed method, the BoF is also used to compute a temporal image similarity measure 1850 (FIG. 18) that is subsequently used by the Viterbi algorithm to define the state transitional probability. Given the normalized BoF histograms of two consecutive embryo frames, the temporal image similarity at frame t is defined based on the Bhattacharyya distance of these two histograms. One example of the temporal image similarity is shown in FIG. 20. The temporal similarity measure based on BoF is registration free. Those "dips" in the plot are good indications of stage transition.

Global Embryo Stage Refinement

At level-3 of the proposed method, the Viterbi algorithm is employed to refine embryo stages within global context. The problem is to infer the best state sequence of embryos that maximizes the posterior probability P(Y|X):

$$\hat{Y} = \arg\max_Y P(Y | X), \quad (4)$$

where, Y={$y_1$ ..., yr} is the state sequence, X={$x_1$, ... $x_r$} are the feature vectors representing the embryo images.

The Viterbi algorithm recursively finds the weight $V_{t,i}$ of the most likely state sequence ending with each stage i at time t.

$$V_{t,i} = P(x_1 | y_1 = i) P(y_1 = i), \quad (5a)$$

$$V_{t,i} = P(x_t | y_t = i) \max_j (P(y_t = i | y_{t-1} = j) V_{t-1,j}), t \neq 1. \quad (5b)$$

where, $P(y_1=i)$ represents the prior probability of each class at the first frame, $P(x_t|y_t=i)$ is the observation probability, and $P(y_t=i|y_{t-1}=j)$ is the transitional probability. Since an embryo always starts with 1-cell stage, $P(y_1=i)$ is set to 1 for i=1 and 0 for the other stages. If it is assumed that the 4 stages are equally probable for the rest frames, the observation probability $P(x_t|y_t=i)$ is simply the class-conditional probability output by the level-2 Adaboost. The transitional probability $P(y_t=i|y_{t-1}=j)$ is defined as a frame-dependent state.

Automated Embryo Stage Classification $$\text{transition matrix } A(t) = \begin{pmatrix} d(t) & 1-d(t) & 0 & 0 \\ 0 & d(t) & 1-d(t) & 0 \\ 0 & 0 & d(t) & 1-d(t) \\ 0 & 0 & 0 & 1 \end{pmatrix} \quad (6)$$

where d(t) is the temporal image similarity defined in previous section. This transition matrix enforces non-decreasing number of cells and integrates the temporal image similarity measure. When two consecutive frames are almost the same (i.e. d(t) is close to 1), the transition matrix favors no embryo stage change.

Experimental Studies

To evaluate the performance of proposed classification method, human embryo videos were collected from a variety of clinical sites and the classification was evaluated based on classification accuracy and cell division detection rate.

Dataset and Ground Truth

The video acquisition system consists of one inverted digital microscope, which were modified for darkfield illumination. Embryo images were acquired every 5 minutes for up to 2 days until the majority of embryos reached the four-cell stage. The first 500 frames of each embryo video were kept for analysis and each frame was cropped to a size of 151×151 pixels. The training data contains 327 human embryo videos (with 41741, 38118, 7343, and 69987 samples for each class respectively) and our testing data contains 389 human embryo videos (with 47063, 48918, 9386, and 89133 samples for each class respectively) acquired at several clinical sites. Since the 3-cell stage is usually very short, fewer 3-cell training samples are used than the other classes.

Two human experts annotated frames when first cell division, second cell division, and the third cell division occur. The ground-truth division frames are the average of annotations by the two human experts. Ground-truth for the embryo stage of each frame is converted from the cell division ground-truth.

Evaluation Results

The training dataset is split into two halves for training the level-1 and level-2 Adaboost classifiers, respectively. Stump is used as base classifier and each Adaboost classifier contains 100 stumps.

In the first evaluation, the embryo stages predicted by proposed method are compared with ground-truth. Overall classification accuracy and classification accuracy for each class are shown for each level of the method at Table 3. The confusion matrix for the final classification results is shown in Table 4. It can be seen from the results that each level improves overall classification accuracy over the previous level. Over 90% 1-cell and 4-or-more-cell embryos have been classified correctly in the final results. Due to the lack of 3-cell training samples and their resemblance to 2-cell and 4-or-more-cell embryos, only 7.79% accuracy was reached by the level-1 Adaboost. The accuracy was increased to 10.71% by level-2 Adaboost and further improved to 20.86% by the level-3 Viterbi algorithm.

TABLE 3

Classification performance at different levels

| | 1-cell | 2-cell | 3-cell | 4-or-more | Overall |
|---|---|---|---|---|---|
| Level-1 | 87.96% | 77.45% | 7.79% | 85.03% | 80.10% |
| Level-2 | 88.04% | 72.05% | 10.71% | 92.94% | 82.53% |
| Level-3 | 91.95% | 85.58% | 20.86% | 94.14% | 87.92% |

TABLE 4

Confusion matrix of the final classification result

| | 1-cell | 2-cell | 3-cell | 4-or-more |
|---|---|---|---|---|
| 1-cell | 43276 (91.95%) | 3399 (7.22%) | 245 (0.52%) | 143 (0.3%) |
| 2-cell | 643 (1.31%) | 41866 (85.58%) | 2518 (5.15%) | 3891 (7.95%) |
| 3-cell | 5 (0.5%) | 4070 (43.36%) | 1958 (20.86%) | 3353 (35.72%) |
| 4-or-more | 0 (0%) | 2620 (2.94%) | 2603 (2.92%) | 83910 (94.14%) |

In the second evaluation, the three division frames detected by classification were compared with the three ground-truth embryo division frames. An estimated division frame is considered as a true-positive if it is within certain tolerance to the ground-truth, and considered as a false-positive otherwise. A ground-truth division frame is considered as false-negative if there is no predicted division frame within certain tolerance.

Figure 21A:
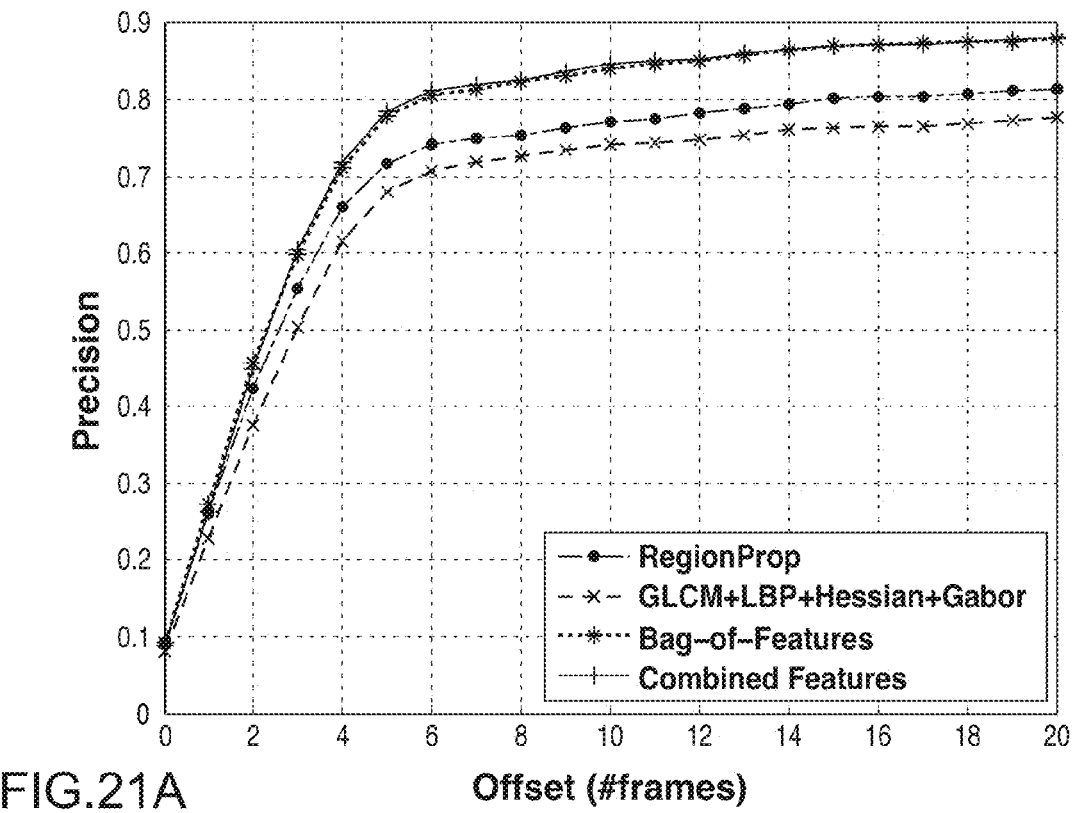
FIG. 21A illustrates exemplary results for precision rate of cell division detection as a function of offset tolerance obtained from an exemplary 3-level classification method, in accordance with an embodiment of the invention.
Figure 21B:
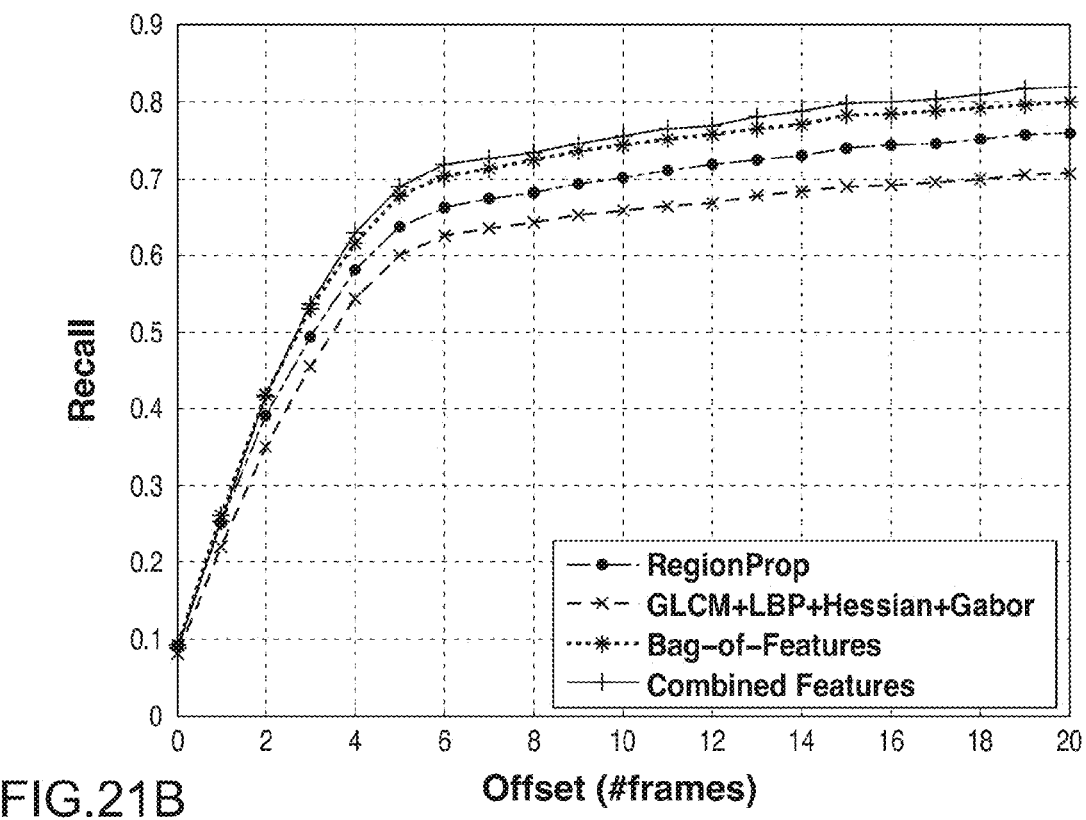
FIG. 21B illustrates exemplary results for recall rate of cell division detection as a function of offset tolerance obtained from an exemplary 3-level classification method, in accordance with an embodiment of the invention.

FIG. 21 illustrates exemplary results for (a) precision rate and (b) recall rate of cell division detection as a function of offset tolerance obtained from an exemplary 3-level classification method, in accordance with an embodiment of the invention. The precision and recall curves for three subsets of features were generated to evaluate their contributions to the classification performance separately. It can be seen from FIG. 15 that BoF outperformed the handcrafted features (RegionProp and GLCM+LBP+Hessian+Gabor, described with reference to Table 1), and that the combination of BoF and the handcrafted features reached the highest performance. For example, at 10-frame tolerance, a precision of 84.58% and a recall rate of 75.63% were achieved by the combined feature set.

This Example presents a classification method for effectively classifying embryo stages in time-lapse microscopy of early human embryo development. When applied to a large testing dataset collected from multiple clinical sites, the proposed method achieved a total of 87.92% classification accuracy.

Example 3

Human embryo tracking can face challenges including a high dimensional search space, weak features, outliers, occlusions, missing data, multiple interacting deformable targets, changing topology, and a weak motion model. This example address these by using a rich set of discriminative image and geometric features with their spatial and temporal context. In one embodiment, the problem is posed as augmented simultaneous segmentation and classification in a conditional random field (CRF) framework that combines tracking based and tracking free approaches. A multi pass data driven approximate inference on the CRF is performed. Division events were measured during the first 48 hours of development to within 30 minutes in 65% of 389 clinical image sequences, winch represents a 19% improvement over a purely tracking based or tracking free approach.

Augmented Simultaneous Segmentation and Classification

Augmented simultaneous segmentation and classification leverages tracking based and tracking free approaches to estimate division events. Both types of features are extracted and added to a CRF. Approximate inference is then performed.

Feature Extraction

In one embodiment, the image features used for tracking are segments 104, depicted in FIG. 1A. Fewer segments 104 reduces the number of tracks. In this example, boundary points are extracted using a Hessian operator, which provides a strength and orientation angle for each pixel. A directed local search is conducted for coherent boundary pixels using this information with hysteresis thresholding. A subsequent merging inference combines the segments into a smaller set of larger segments. This step is formulated as a graph partitioning on a graph whose vertices are segments and whose edges indicate merging of segments. The number of partitions is unknown in advance.

In one embodiment, the tracking free portion of the framework uses a per frame classifier trained on number of cells (such as the classifier 902 described with reference to FIG. 9A), and an interframe similarity measure. In this example, the classifier uses a rich set of 262 hand crafted and automatically learned discriminative features. The similarity measure may be a normalized cross correlation (NCC).

CRF Model

This example seeks to estimate the numbers and shapes of cells in the embryo over time, as depicted in FIG. 1A as characteristics 108 of the cells 100. A stochastic evolution of elliptical cells with the CRF in FIG. 2B is modeled. As previously described with reference to FIGS. 2A and 2B, at each frame t there are $K_t$ segments, each with $m_k^{(t)}$ points, $k \in \{1 \ldots K_t\}$, and up to $N_{max}$ cells. The variables to be inferred are labels assigning segments to cells $l^{(t)} \in \{0, 1, \ldots N_{max}\}^{K_t}$; ellipses $e_n^{(t)} \in \mathbb{R}^5$, $n \in \{1, \ldots N_{max}\}$; number of cells $N^{(t)} \in \{1, \ldots N_{max}\}$; and division event $d^{(t)} \in \{0, 1\}$. Each ellipse $e_n^{(t)}$ is associated with its parent, $e_{Pa(n)}^{(t-1)}$. The observations are segments $s^{(t)} = \{s_k^{(t)}\}_{k=1 \ldots K_t}$ where $s_k^{(t)}$ is a collection of points $s_{k,i}^{(t)} \in \mathbb{R}^2$ with $i \in \{1 \ldots m_k^{(t)}\}$; a classifier on the number of cells $c_N^{(t)} \in \mathbb{R}^{N_{max}}$; and image similarity measure $\delta^{(t)} \in [0,1]$. Compatibility functions are either over variables that: (1) are within one time slice (observation model $\Phi$); or (2) span neighboring time slices (motion model $\Psi$). The CRF encodes the joint probability distribution over all variables as proportional to the product of all compatibility functions:

$$P(e^{(1:T)}, l^{(1:T)}, N^{(1:T)}, d^{(1:T)}, s^{(1:T)}) = \qquad (7)$$

$$\frac{1}{Z_T} \prod_{t=1}^{T} \underbrace{\Phi(e^{(t)}, l^{(t)}, N^{(t)}, s^{(t)})}_{\text{observation model}} \cdot \prod_{t=2}^{T} \underbrace{\psi(e^{(t-1:t)}, N^{(t-1:t)}, d^{(t)})}_{\text{motion model}}$$

where T is the sequence length and $Z_T$ is a normalizing constant. We are interested in the sequence $N^{(t)}$ which maximizes the marginal distribution $P(N^{(t)})$.

The observation model $\Phi$ is the product of three compatibility functions:

$$\phi(e^{(t)}, l^{(t)}, N^{(t)}, d^{(t)}, s^{(t)}, \delta^{(t)}, c_N^{(t)}) = \qquad (8)$$

$$\phi_0(e^{(t)})(\phi_1(e^{(t)}, l^{(t)}, N^{(t)}, s^{(t)}) + c_N^{(t)}(N^{(t)})\phi_2(d^{(t)}, \delta^{(t)})$$

The function $\phi_0$ encodes limits on shape. The second function combines classifier $c_N^{(t)}$ with $\phi_1$, which encodes compatibility of ellipses, segments, and labels, $$\phi_1(e^{(t)}, l^{(t)}, N^{(t)}, s^{(t)}) = \left( \prod_{t=1}^{N^{(t)}} f(\cdot,\cdot,\cdot)^{c_f} e^{-c_r r(\cdot,\cdot,\cdot)^2} \right)^{(1/N^{(t)})} \qquad (9)$$

where $f(e_i^{(t)}, l^{(t)}, s^{(t)}) \in [0,1]$ is an ellipse coverage term, $r(e_i^{(t)}, l^{(t)}, s^{(t)}) \in \mathbb{R}_+$ is segment fitting error, and $c_f$ and $c_r$ are empirically chosen.

The function $\phi_2$ relates division with similarity $\delta^{(t)}$ of adjacent images.

$$\phi_2 = (d^{(t)}, \delta^{(t)}) = \begin{cases} \delta^{(t)} & \text{if } d^{(t)} = 0 \\ 1 - \delta^{(t)} & \text{otherwise} \end{cases} \qquad (10)$$

The transition model $\Psi$ governs cell shape deformations and division:

$$\Psi(e^{(t-1:t)}, N^{(t-1:t)}, d^{(t)})_{t=2 \ldots, T} = \qquad (11)$$

$$\prod_{n=1}^{N^{(t)}} \psi_1(e_{Pa(n)}^{(t-1)}, e_n^{(t)}, d^{(t)})\psi_2(N^{(t-1:t)}, d^{(t)})$$

The function $\Psi_1$ encodes the underlying cell deformation and division process, $$\psi_1(e_{i_1}^{(t-1)}, e_{i_2}^{(t)}, d^{(t)}) = \begin{cases} e^{-\rho(e_{i_1}^{(t-1)}, e_{i_2}^{(t)})} & \text{where } d^{(t)} = 0 \text{ or } i_1 \neq P_{a(i_2)} \\ e^{-\rho(h(e_{i_1}^{(t-1)}, e_{i_2}^{(t)}))} & \text{where } d^{(t)} = 1, i_1 = P_{a(i_2)} \\ 0 & \text{otherwise} \end{cases} \qquad (12)$$

where $\rho(e_{i_1}, e_{i_2}) = (e_{i_1} - e_{i_2})^T \Lambda (e_{i_1} - e_{i_2})$ with $\Lambda$ a diagonal matrix of deformation costs, and h a non-affine transform from a mother to daughter cell shape.

In this example, the function $\Psi_2$ constrains the number of cells $N^{(t)}$ to be nondecreasing.

Approximate Inference

This example seeks the most likely sequence $N^{(t)}$ from the CRF. Approximate inference is performed in three phases: cell count classification, approximate max marginal inference and event inference.

Cell count classification is part of the tracking free portion. In this example, the cell count classification uses a multilevel AdaBoost classifier to estimate posterior probabilities of number of cells ($c_N^{(t)}$ in Eq. (8)) from a rich set of 262 hand crafted and automatically learned discriminative image features.

In this example, the max marginal inference is tracking based, and infers geometry from segments. It estimates $\hat{\Phi}_M(N^{(t)})$, the unnormalized max marginal measure of $N^{(t)}$ by optimizing to time t on a mutilated subgraph that excludes $c_{N(t)}$ and $\delta^{(t)}$:

$$\hat{\Phi}_M(N^{(t)}) = \max_{e,s,l,N^{(1:t-1)}} F(t), \text{ where}$$

$$E(t) = \prod_{\tau=1}^{t} \phi_0(e^{(\tau)})\phi_1(e^{(\tau)}, s^{(\tau)}, l^{(\tau)}, N^{(\tau)})\psi(e^{(\tau-1:\tau)}, N^{(\tau-1:\tau)}) \quad (13)$$

$$= E(t-1)\phi_0(e^{(t)})\phi_1(e^{(t)}, s^{(t)}, l^{(t)}, N^{(t)})\psi(e^{(t-1:t)}, N^{(t-1:t)}) \quad (14)$$

This example maximizes this recursion with data driven sequential Monte Carlo (DD-SMC). A data driven refinement stage between the time and measurement updates reduces the required number of particles by refining an initial particle to the incomplete set of boundary points with expectation maximization (EM). $\hat{\Phi}_M(N^{(t)})$, is then taken from the particles. Exemplary results for the approximate max marginal measures 402 (see Eqs. (13) and (14)) are shown in FIGS. 4A and 4B. Exemplary results for the classification measure 403 and the image similarity measure 405 are shown in FIG. 4B.

The event inference combines $\hat{\Phi}_M(N^{(t)})$ with the classifier $c_N^{(t)}$ and image similarity $\delta^{(t)}$ to obtain the approximate marginal distribution on number of cells $\hat{P}(N^{(t)})$. It is performed over another mutilated subgraph containing $N^{(t)}$, $d^{(t)}$, $\delta^{(t)}$ and $c_N^{(t)}$, and estimates the most likely sequence $\hat{N}^{(t)}$. This example approximates this subgraph by a chain graph whose nodes are N(t), and whose joint distribution is factorized by unary terms (Eq. (8)) and pairwise terms (Eqs. (10, 11)):

$$\hat{P}(N^{(t)}) \propto \prod_{T=1}^{t} (\hat{\Phi}_M(N^{(t)}) + c_N^{(t)}(N^{(t)}))\phi_2(d^{(t)}, \delta^{(t)})\psi_2(N^{(t-1:t)}, d^{(t)}) \quad (15)$$

This example performs belief propagation to find the marginal distributions 404 (see FIGS. 4A and 4B). The value of the estimated number 406 of cells is plotted against image frame number (see FIGS. 4A and 4B), where the transition times between different estimated numbers 406 of cells are based on the crossover points in the marginal distributions 404 for the different numbers of cells (in this example, 1-cell, 2-cell, 3-cell, and 4-cell).

Experimental Results

This example applied the algorithm to human embryo image sequences acquired from multiple IVF clinics and followed for at least 3 days. Images were acquired with a dark field digital microscope and cropped to 151×151 pixels every 5 minutes.

Tracking Performance

The algorithm was trained on 327 embryos and tested on a separate set of 389 embryos. The times of first, second, and third mitosis $t_1$, $t_2$, and $t_3$ respectively, were measured. Two expert embryologists measured ground truth for evaluation. rmsd was measured: the rms deviation between the algorithm's measurements and those of the two panelists.

Figure 22:
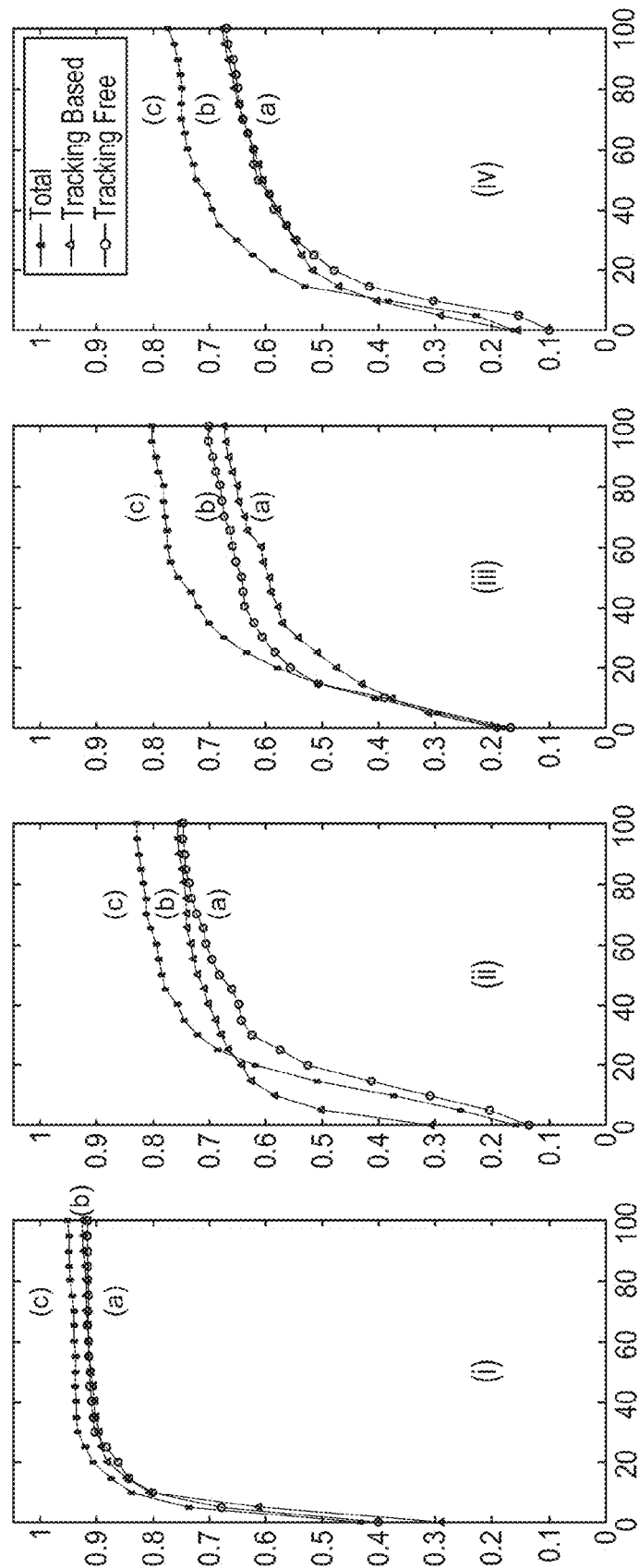
FIG. 22 illustrates exemplary results for ratio of embryos for which $rmsd < d_p + m$ on (i) transitions $t_1$, (ii) transitions $t_2$), (iii) transitions $t_3$, and (iv) all 3, when using: (a) classifier and similarity measure (tracking free), (b) DD-SMC max marginals (tracking based), and (c) all observables (combined), in accordance with an embodiment of the invention.

FIG. 22 illustrates exemplary results for the ratio of embryos for which the deviation from panelists is within a margin m of the interpanelist disagreement (rmsd<$d_p$+m) for each transition ($t_1$, $t_2$, $t_3$) and over all transitions, in accordance with an embodiment of the invention. This is shown for three combinations of observables: (a) classifier probabilities and similarity measure (tracking free), (b) DD-SMC max marginals (tracking based), and (c) all observables (combined). It can be seen that sometimes one approach works better than the others. For example in the $t_3$ transition (the most difficult to determine), tracking free can outperform tracking based, as the scene is more complex and may not be adequately modeled with simple shape and outlier assumptions. By contrast in the $t_2$ transition, shape and structure of the two cell case can be modeled better by the tracking based shape model than by bag of features in the tracking free approach. But in all cases, combining the two approaches yields substantial improvement. The fraction of datasets for which transitions were measured with an rmsd within 30 minutes of the inter panelist variation are shown in Table 5 for each of the individual transition times as well as for all transition times. On this dataset, 65.3% of embryos were tracked on all three transitions with an rmsd within 30 minutes of the interpanelist variation using the combined approach. This result can be compared with the corresponding rmsd of the tracking free and tracking based approaches in isolation, which were respectively 54.5% and 55.0%. The relative improvement over tracking free and tracking based approaches are respectively 19.8% and 18.7%. It should be noted that over 21% of these cases had an interpanelist disagreement of over 30 minutes.

This suggests that tracking based and tracking free approaches can be combined to achieve automated tracking on a significant portion of clinical data.

TABLE 5

Fraction of datasets tracked to within 30 minutes rmsd of panelists for tracking free, tracking based, and combined approaches

| approach | $t_1$ | $t_2$ | $t_3$ | all |
|---|---|---|---|---|
| tracking free | 0.899 | 0.624 | 0.606 | 0.545 |
| tracking based | 0.897 | 0.678 | 0.542 | 0.550 |
| combined | 0.933 | 0.722 | 0.673 | 0.653 |

CONCLUSION

The framework presented in this example combines multiple features and their contexts in a unified CRF framework that leverages tracking based and tracking free approaches. Automated tracking comparable to manual expert measurements in 65% of the test data is demonstrated, and can be further enhanced by leveraging and learning from more labeled data as it becomes available, as well as expanding the inference to explore larger portions of the solution space.

An embodiment of the invention relates to a computer storage product with a computer-readable medium having computer code thereon for performing various computer-implemented operations. The term "computer-readable medium" is used herein to include any medium that is capable of storing or encoding a sequence of instructions or computer codes for performing the operations described herein. The media and computer code may be those specially designed and constructed for the purposes of the invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits ("ASICs"), programmable logic devices ("PLDs"), and ROM and RAM devices. Examples of computer code include machine code, such as produced by a compiler, and files containing higher-level code that are executed by a computer using an interpreter or a compiler. For example, an embodiment of the invention may be implemented using Java, C++, or other object-oriented programming language and development tools. Additional examples of computer code include encrypted code and compressed code. Moreover, an embodiment of the invention may be downloaded as a computer program product, which may be transferred from a remote computer (e.g., a server computer) to a requesting computer (e.g., a client computer or a different server computer) via a transmission channel. Another embodiment of the invention may be implemented in hardwired circuitry in place of, or in combination with, machine-executable software instructions.

An embodiment of the invention can be implemented in hardware, such as a field programmable gate array (FPGA) or ASIC. The FPGA/ASIC may be configured by and may provide output to input/output devices.

The preceding merely illustrates the principles of the invention. It is appreciated that those skilled in the art may be able to devise various arrangements which, although not explicitly described or shown herein, embody the principles of the invention and are included within its spirit and scope. The illustrations may not necessarily be drawn to scale, and manufacturing tolerances may result in departure from the artistic renditions herein. There may be other embodiments of the present invention which are not specifically illustrated. Thus, the specification and the drawings are to be regarded as illustrative rather than restrictive. Additionally, the drawings illustrating the embodiments of the present invention may focus on certain major characteristic features for clarity. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the present invention, therefore, is not intended to be limited to the exemplary embodiments shown and described herein. Rather, the scope and spirit of the present invention is embodied by the appended claims. In addition, while the methods disclosed herein have been described with reference to particular operations performed in a particular order, it will be understood that these operations may be combined, sub-divided, or re-ordered to form an equivalent method without departing from the teachings of the invention. Accordingly, unless specifically indicated herein, the order and grouping of the operations are not limitations of the invention. All references cited herein are incorporated by reference in their entireties.

What is claimed is:

1. A method for automated, non-invasive evaluation of cell activity in human embryos, oocytes, or pluripotent cells to determine a developmental potential with an imaging system, the method comprising:

acquiring a series of time-sequential images of the cells in a multi-well culture dish with a camera of at least one time-lapse microscope of the imaging system;

selecting an image from the series of time-sequential images, wherein the selected image is preceded by a previous image in the series of time-sequential images of the cells;

extracting observable geometric information of the cells from the selected image;

generating a plurality of first hypotheses characterizing the cells as shown in the image, wherein generating the plurality of first hypotheses comprises:

determining an inferred characteristic of one or more of the cells based on a mapping of a representation of each of the one or more of the cells to the observable geometric information associated with the cells;

retrieving a plurality of parent hypotheses associated with the previous image in the series of time-sequential images of the cells;

generating a plurality of preliminary hypotheses based on the plurality of parent hypotheses; and generating the plurality of first hypotheses based on the plurality of preliminary hypotheses and based on the observable geometric information of the cells from the selected image;

selecting a first hypothesis from the plurality of first hypotheses associated with the image; and determining a characteristic of the one or more of the cells based on the inferred characteristic associated with the first hypothesis to determine an indicator of developmental potential for the cells.

2. The method of claim 1, further comprising:

generating a preliminary hypothesis characterizing the cells as shown in the image; and refining the preliminary hypothesis to obtain one or more of the plurality of first hypotheses based on the mapping.

3. The method of claim 1, wherein the observable geometric information comprises at least one of:

a plurality of cell boundary points;

a plurality of cell boundary segments;

a shape of the cells in the multi-well culture dish; and an arrangement of the cells in the multi-well culture dish.

4. The method of claim 3, wherein the inferred characteristic of one or more of the cells is determined based on explicit mapping.

5. The method of claim 4, wherein the inferred characteristic of the one or more cells can be at least one of: an inferred geometry of the one or more cells; and an inferred number of the one or more cells.

6. The method of claim 1, wherein generating a plurality of preliminary hypotheses based on the plurality of parent hypotheses further comprises:

sampling at least one aspect of the parent hypotheses; and perturbing the at least one aspect of the parent hypotheses.

7. The method of claim 6, wherein the at least one aspect of the parent hypotheses comprises a plurality of ellipses.

8. The method of claim 1, wherein the plurality of first hypotheses are generated through expectation maximization (EM) optimization.

9. The method of claim 1, wherein the plurality of first hypotheses are generated by:

generating a mapping representation of cells to boundary segments;

refining the preliminary hypotheses based on the mapping to obtain refined hypotheses; and scoring the refined hypotheses based on the observable geometric information.

10. The method of claim 9, further comprising:
selecting a second, subsequent image from the series of time-sequential images;
generating a plurality of second hypotheses characterizing the cells as shown in the second, subsequent image;
and selecting a second hypothesis from the plurality of second hypotheses,
wherein the first hypothesis is selected from the plurality of first hypotheses according to a first approximate inference over a probabilistic graphical model, and wherein the second hypothesis is selected from the plurality of second hypotheses according to a second approximate inference over the probabilistic graphical model.

11. An automated imaging system for evaluation of human embryos, oocytes, or pluripotent cells to determine a developmental potential, the system comprising:
a stage configured to receive a multi-well culture dish, wherein the multi-well culture dish comprises a plurality of micro-wells containing a plurality of human embryo cells or pluripotent cells; and
a time-lapse microscope having at least a camera, wherein the camera is configured to acquire a series of time-sequential images of the multi-well culture dish on the stage, and wherein the time-lapse microscope is configured to determine an indicator of developmental potential of at least some of the cells, wherein determining the indicator of development competence comprises:
selecting an image from the series of time-sequential images, wherein the selected image is preceded by a previous image in the series of time-sequential images of the cells;
extracting observable geometric information of the cells from the selected image;
generating a plurality of first hypotheses characterizing the cells as shown in the image, wherein generating the plurality of first hypotheses comprises:
  determining an inferred characteristic of one or more of the cells based on a mapping of a representation of each of the one or more of the cells to the observable geometric information associated with the cells;
  retrieving a plurality of parent hypotheses associated with the previous image in the series of time-sequential images of the cells;
  generating a plurality of preliminary hypotheses based on the plurality of parent hypotheses; and
  generating the plurality of first hypotheses based on the plurality of preliminary hypotheses and based on the observable geometric information of the cells from the selected image;
selecting a first hypothesis from the plurality of first hypotheses associated with the image; and
determining a characteristic of the one or more of the cells based on the inferred characteristic associated with the first hypothesis.

12. The automated imaging system of claim 11, wherein the observable geometric information comprises at least one of:
a plurality of cell boundary points;
a plurality of cell boundary segments;
a shape of the cells in the multi-well culture dish; and
an arrangement of the cells in the multi-well culture dish.

13. The automated imaging system of claim 12, wherein the inferred characteristic of one or more of the cells is determined based on explicit mapping.

14. The automated imaging system of claim 13, wherein the inferred characteristic of the one or more cells can be at least one of: an inferred geometry of the one or more cells; and an inferred number of the one or more cells.

15. The automated imaging system of claim 11, wherein generating a plurality of preliminary hypotheses based on the plurality of parent hypotheses further comprises:
sampling at least one aspect of the parent hypotheses; and
perturbing the at least one aspect of the parent hypotheses.

16. The automated imaging system of claim 15, wherein the at least one aspect of the parent hypotheses comprises a plurality of ellipses.

17. The automated imaging system of claim 11, wherein the plurality of first hypotheses are generated through expectation maximization (EM) optimization.

18. The automated imaging system of claim 11, wherein the plurality of first hypotheses are generated by:
generating a mapping representation of cells to boundary segments;
refining the preliminary hypotheses based on the mapping to obtain refined hypotheses; and
scoring the refined hypotheses based on the observable geometric information.

19. The automated imaging system of claim 18, wherein the time-lapse microscope is further configured to:
select a second, subsequent image from the series of time-sequential images;
generate a plurality of second hypotheses characterizing the cells as shown in the second, subsequent image; and
select a second hypothesis from the plurality of second hypotheses,
wherein the first hypothesis is selected from the plurality of first hypotheses according to a first approximate inference over a probabilistic graphical model, and wherein the second hypothesis is selected from the plurality of second hypotheses according to a second approximate inference over the probabilistic graphical model.

* * * * *